(12) United States Patent
Yoshida et al.

(10) Patent No.: US 8,854,736 B2
(45) Date of Patent: Oct. 7, 2014

(54) OPTICAL BODY, WINDOW MEMBER, FITTING, SOLAR SHADING DEVICE, AND BUILDING

(75) Inventors: Hironori Yoshida, Tokyo (JP); Tsutomu Nagahama, Tokyo (JP); Masashi Enomoto, Tokyo (JP)

(73) Assignee: Dexerials Corporation, Tokyo (JP)

( * ) Notice: Subject to any disclaimer, the term of this patent is extended or adjusted under 35 U.S.C. 154(b) by 275 days.

(21) Appl. No.: 13/388,856

(22) PCT Filed: Jun. 2, 2011

(86) PCT No.: PCT/JP2011/063188
§ 371 (c)(1),
(2), (4) Date: Feb. 3, 2012

(87) PCT Pub. No.: WO2011/158721
PCT Pub. Date: Dec. 22, 2011

(65) Prior Publication Data
US 2012/0154921 A1    Jun. 21, 2012

(30) Foreign Application Priority Data

Jun. 16, 2010  (JP) .................. 2010-137782

(51) Int. Cl.
| G02B 27/14 | (2006.01) |
| G02B 5/08 | (2006.01) |
| G02B 5/28 | (2006.01) |
| G02B 27/10 | (2006.01) |
| B05D 5/06 | (2006.01) |
| B32B 27/36 | (2006.01) |
| G02B 5/20 | (2006.01) |
| B32B 27/08 | (2006.01) |
| G02B 5/26 | (2006.01) |
| G02B 5/04 | (2006.01) |
| B32B 7/12 | (2006.01) |
| G02B 5/23 | (2006.01) |

(52) U.S. Cl.
CPC ................ *G02B 5/208* (2013.01); *G02B 5/282* (2013.01); *B32B 27/36* (2013.01); *B32B 2255/26* (2013.01); *C03C 2217/77* (2013.01); *B32B 27/08* (2013.01); *B32B 2255/10* (2013.01); *G02B 5/26* (2013.01); *G02B 5/23* (2013.01); *G02B 5/045* (2013.01); *B32B 2307/416* (2013.01); *B32B 7/12* (2013.01)
USPC ............ 359/634; 359/359; 359/589; 359/618; 427/163.4

(58) Field of Classification Search
CPC .......... G02B 5/20; G02B 5/122; G02B 5/124; G02B 5/128; G02B 5/28; G02B 5/08; G02B 27/00; G02B 27/10; G02B 27/14; G02B 27/12
USPC ......... 359/634, 618, 629, 529–530, 537, 548, 359/533, 359–360, 639, 601–602, 608–609, 359/589–590; 428/172; 427/162, 163.4
See application file for complete search history.

(56) References Cited

U.S. PATENT DOCUMENTS

| 4,519,675 | A | 5/1985 | Bar-Yonah |
| 6,311,437 | B1 | 11/2001 | Lorenz |
| 6,736,519 | B2 * | 5/2004 | Smith ........................ 359/530 |
| 7,939,160 | B2 * | 5/2011 | Furuya et al. ................ 428/141 |
| 7,977,875 | B2 * | 7/2011 | Adachi et al. ................ 313/506 |
| 2003/0161997 | A1 | 8/2003 | Moran |
| 2008/0291541 | A1 | 11/2008 | Padiyath et al. |
| 2009/0255568 | A1 | 10/2009 | Morgan |
| 2010/0177384 | A1 * | 7/2010 | Peroz et al. ................... 359/487 |

FOREIGN PATENT DOCUMENTS

| EP | 1 072 752 A1 | 1/2001 |
| JP | 61-006802 | 1/1986 |
| JP | 06-299139 | 10/1994 |
| JP | 09-316115 | 12/1997 |
| JP | 2001-089492 | 4/2001 |
| JP | 2005-189409 | 7/2005 |
| JP | 2007-010893 | 1/2007 |
| JP | 2007-152773 | 6/2007 |
| JP | 2007-525692 | 9/2007 |
| WO | 2005/087680 A1 | 9/2005 |

| WO | WO 2007/005357 A1 | 1/2007 |
| WO | WO 2008/049708 A1 | 5/2008 |
| WO | 2010/067640 A1 | 6/2010 |
| WO | 2011/096595 A1 | 8/2011 |

OTHER PUBLICATIONS

Feb. 26, 2013 European Search Report issued in EP 12 00 1766 w/Abstract.
Feb. 25, 2013 Supplementary European Search Report issued in EP 11 79 5628.
Jan. 29, 2014 Office Action issued in EP Application No. 11 795 628.4.
Jan. 29, 2014 Office Action issued in EP Application No. 12 001 766.0.

* cited by examiner

*Primary Examiner* — Dawayne A Pinkney
(74) *Attorney, Agent, or Firm* — Oliff PLC

(57) ABSTRACT

An optical body includes a first optical layer having a concave-convex surface, a wavelength selective reflecting layer formed on the concave-convex surface, and a second optical layer formed on the wavelength selective reflecting layer and embedding the concave-convex surface. The wavelength selective reflecting layer selectively directionally reflects light in a particular wavelength band while transmitting light other than the particular wavelength band therethrough. The concave-convex surface is made up of a plurality of triangular pillars arrayed in a one-dimensional pattern, and the triangular pillar has an apex angle $\alpha$ and a slope angle $\beta$, the apex angle $\alpha$ and the slope angle $\beta$ satisfying a predetermined relationship.

22 Claims, 32 Drawing Sheets

A

B

C

A

B

C

A

B

A

B

OPTICAL BODY, WINDOW MEMBER, FITTING, SOLAR SHADING DEVICE, AND BUILDING

CROSS REFERENCES TO RELATED APPLICATIONS

The present application is a national stage of International Application No. PCT/JP2011/063188 filed on Jun. 2, 2011 and claims priority to Japanese Patent Application No. 2010-137782 filed on Jun. 16, 2010, the disclosures of which are incorporated herein by reference.

BACKGROUND

The present invention relates to an optical body, a window member, a fitting, a solar shading device, and a building. More particularly, the present invention relates to an optical body for directionally reflecting incident light.

Recently, cases of coating a layer, which partly absorbs or reflects the sunlight, on architectural glasses for high-rise buildings and housings, vehicular window glasses, etc. have increased. Such a trend represents one of energy-saving measures with the view of preventing global warming, and it is intended to reduce a load of cooling equipment, which is increased with optical energy incoming from the sun, entering the indoor through windows, and raising the indoor temperature. The optical energy incoming with the sunlight is primarily provided in a visible range at wavelengths of 380 to 780 nm and in a near infrared range at wavelengths of 780 to 2100 nm. Because transmittance of light in the latter near infrared range through windows is unrelated to visibility of human eyes, the transmittance of the near infrared light is an important factor affecting the performance as a window that has high transparency and a high thermal shielding ability.

As methods for blocking the near infrared light while maintaining transparency in the visible range, there are a method of providing, on a window glass, a layer having a high reflectance in the near infrared range, and a method of providing, on a window glass, a layer having a high absorbance in the near infrared range.

With regards to the former method, various techniques using, as reflecting layers, an optical multilayer film, a metal-containing film, a transparent electroconductive film, etc. are already disclosed (see, e.g., International Publication No. 05/087680). However, those reflecting layers are formed on a flat window glass, and they can just specularly reflect the incident sunlight. Therefore, the light incoming from the sky and reflected specularly reaches other buildings and the ground in the outdoor where the light is absorbed and converted to heat, thus raising the ambient temperature. Accordingly, a local temperature rise occurs in the surroundings of a building in which all windows are coated with the above-mentioned type of reflecting layer. Such a local temperature rise causes the problems that, in urban areas, a heat island phenomenon is accelerated, and that the lawn grass does not grow only in areas irradiated with the reflected light.

As the latter method, various techniques using organic pigment layers are disclosed (see, e.g., Japanese Unexamined Patent Application Publication No. 06-299139, No. 09-316115, and No. 2001-89492). However, when the pigment layer is affixed to a window glass, light absorbed at the window surface is converted to heat and part of the heat is conducted as radiant heat to the indoor. This raises the problems that the shield ability of the pigment layer is insufficient, and that the glass may be cracked due to thermal stress. Further, there is another problem that the pigment layer is poor in weatherbility and is less convenient when used in high-rise buildings in which frequent replacement of the pigment layer is difficult.

SUMMARY

Technical Problem

Accordingly, an object of the present invention is to provide an optical body, a window member, a fitting, a solar shading device, and a building, the optical body selectively directionally reflecting light in a particular wavelength band while allowing passage of light other than the particular wavelength band therethrough.

Technical Solution

The inventors have conducted intensive studies with intent to solve the above-described problems in the related art. As a result, the inventors have invented an optical body in which a wavelength selective reflecting layer selectively reflecting light in a particular wavelength band is formed on a corner cube and incident light is directionally reflected by the wavelength selective reflecting layer.

The above-described optical body can retro-reflectively reflect the incident light by reflecting the incident light three times with the wavelength selective reflecting layer. However, because the number of times of reflections is large, the wavelength selective reflecting layer absorbs light in amount about three times that absorbed by a flat plate and an amount of generated heat increases. Accordingly, when the above-described optical body is used as a film for a window, people feel hot with air in a space near the window and an air conditioner is operated at a higher utilization rate, whereby an amount of $CO_2$ omission is increased.

In view of the above problem, the inventors have conducted intensive studies on an optical body, which can maintain high upward reflection performance and which can reduce the number of times of wavelength reflections to one or two. As a result, the inventors have found a technique of arraying a plurality of triangular pillars, each having an apex angle $\alpha$ and a base angle $\beta$ that satisfy a predetermined relationship, in a one-dimensional pattern to form a concave-convex surface, and forming the wavelength selective reflecting layer on the concave-convex surface.

The present invention has been made on the basis of the above-described studies.

To solve the above-described problems, a first invention provides an optical body comprising:

a first optical layer having a concave-convex surface;

a wavelength selective reflecting layer formed on the concave-convex surface; and a second optical layer formed on the wavelength selective reflecting layer and embedding the concave-convex surface, wherein the wavelength selective reflecting layer selectively directionally reflects light in a particular wavelength band while transmitting light other than the particular wavelength band therethrough, the concave-convex surface is made up of a plurality of triangular pillars arrayed in a one-dimensional pattern, and the triangular pillar has an apex angle $\alpha$ and a slope angle $\beta$, the apex angle $\alpha$ and the slope angle $\beta$ satisfying a formula (1) or (2) given below:

$$-3.6\alpha + 396 \leq \beta \leq 80 \ (85 \leq \alpha \leq 90) \qquad (1)$$

$$\alpha - 30 \leq \beta \leq -\alpha + 170 \ (90 \leq \alpha \leq 100) \qquad (2)$$

A second invention provides an optical body comprising:
a first optical layer having a concave-convex surface;
a wavelength selective reflecting layer formed on the concave-convex surface; and
a second optical layer formed on the wavelength selective reflecting layer and embedding the concave-convex surface,
wherein the wavelength selective reflecting layer selectively directionally reflects light in a particular wavelength band while transmitting light other than the particular wavelength band therethrough,
the concave-convex surface is made up of a plurality of triangular pillars arrayed in a one-dimensional pattern, and
the triangular pillar has an apex angle α and a slope angle β, the apex angle α and the slope angle β satisfying a formula (3) or (4) given below:

$$30 \leq \beta \leq \alpha - 50 \ (80 \leq \alpha \leq 90) \tag{3}$$

$$30 \leq \beta \leq -\alpha + 130 \ (90 \leq \alpha \leq 100) \tag{4}$$

In the optical body of the present invention, the concave-convex surface is formed by arraying asymmetrical triangular pillars in a one-dimensional pattern, and the wavelength selective reflecting layer is formed on the concave-convex surface. Accordingly, when the optical body of the present invention is applied to an adherend such as a window member, it can reflect the light in the particular wavelength band upward while transmitting light other than the particular wavelength band therethrough. Also, when the optical body of the present invention is applied to, e.g., a window member of a building, it can directionally reflect the light in the particular wavelength band to be kept from entering a predetermined space inside the building, for example, while allowing the light other than the particular wavelength band to be taken into the predetermined space.

Further, with the optical body of the present invention, since the apex angle α and the slope angle β of the triangular pillar satisfy the predetermined relationship, a high upward reflectance can be obtained when the optical body of the present invention is applied to an adherend such as a window member.

Advantageous Effects

According to the present invention, as described above, in the optical body capable of reflecting the light in the particular wavelength band while transmitting the light other than the particular wavelength band therethrough, an improvement in safety and energy saving can be realized by reducing heat generation attributable to absorption of the light. Further, a high upward reflectance can be obtained.

Additional features and advantages are described herein, and will be apparent from the following Detailed Description and the figures.

DETAILED DESCRIPTION

Embodiments of the present invention will be described below in the following order with reference to the drawings.
1. First embodiment (representing an example of an optical film in which asymmetrical triangular pillars are arrayed in a one-dimensional pattern)
2. Second embodiment (representing an example of an optical film, which further includes light scatterers)
3. Third embodiment (representing an example of an optical film, which further includes a self-cleaning effect layer)
4. Fourth embodiment (representing an example in which the optical film is applied to a window blind)
5. Fifth embodiment (representing an example in which the optical film is applied to a rolling screen device)
6. Sixth embodiment (representing an example in which the optical film is applied to a fitting)

Figure 1:
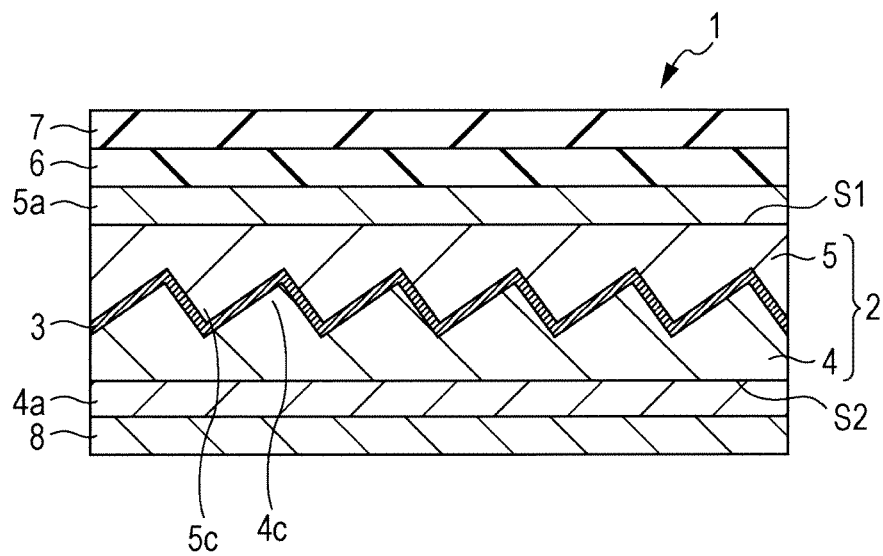
FIG. 1A is a sectional view illustrating one example of construction of an optical film according to a first embodiment.
FIG. 1B is a sectional view illustrating an example in which the optical film according to the first embodiment is affixed to an adherend.
Figure 1:
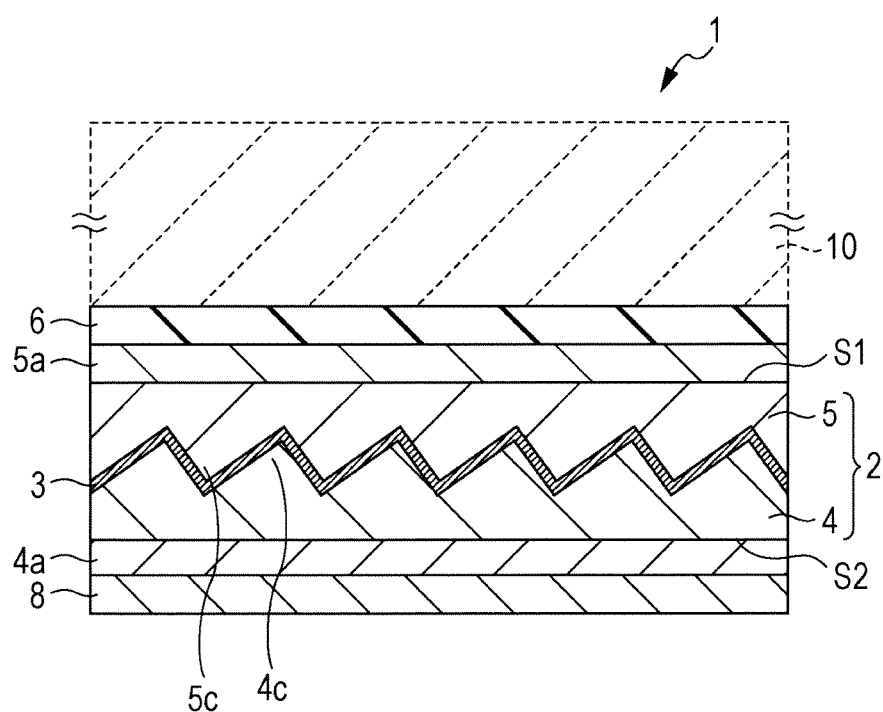

<1. First Embodiment>
[Construction of Optical Film]
FIG. 1A is a sectional view illustrating one example of construction of an optical film according to a first embodiment. FIG. 1B is a sectional view illustrating an example in which the optical film according to the first embodiment is affixed to an adherend. An optical film 1 as an optical body is an optical film having the so-called directional reflection property. As illustrated in FIG. 1A, the optical film 1 includes an optical layer 2 having an interface formed therein in a concave-convex shape, and a wavelength selective reflecting layer 3 formed at the interface in the optical layer 2. The optical layer 2 includes a first optical layer 4 having a first surface in a concave-convex shape, and a second optical layer 5 having a second surface in a concave-convex shape. The interface in the optical layer is formed by the first surface and the second surface each having the concave-convex shape, which are arranged to face each other. More specifically, the optical film 1 includes the first optical layer 4 having a concave-convex surface, the wavelength selective reflecting layer 3 formed on the concave-convex surface of the first optical layer 4, and the second optical layer 5 formed on the wavelength selective reflecting layer 3 so as to embed the concave-convex surface on which the wavelength selective reflecting layer 3 is formed. The optical film 1 has an incident surface S1 on which light, such as the sunlight, is incident, and an emergent surface S2 from which part of the light incident on the incident surface S1 emerges, the part having passed through the optical film 1. The optical film 1 is suitably applied to inner wall members, outer wall members, window members, wall materials, and so on. Further, the optical film 1 is suitably applied to a slat (solar shading member) of a window blind and a screen (solar shading member) of a rolling screen device. Moreover, the optical film 1 is suitably employed as an optical body that is disposed in a lighting portion of a fitting (i.e., an interior member or an exterior member), such as a shoji (i.e., a paper-made and/or glass-fitted sliding door).

The optical film 1 may further include a first base 4a, when necessary, on the emergent surface S2 of the optical layer 2. Also, the optical film 1 may further include a second base 5a, when necessary, on the incident surface S1 of the optical layer 2. It is to be noted that, when the optical film 1 includes the first base 4a and/or the second base 5a, later-described optical characteristics, such as transparence and transmission color, are preferably satisfied in the state where the optical film 1 includes the first base 4a and/or the second base 5a.

The optical film 1 may further include an affixing layer 6, when necessary. The affixing layer 6 is formed on one of the incident surface S1 and the emergent surface S2 of the optical film 1, which one is to be affixed to a window member 10. The optical film 1 is affixed to the indoor side or the outdoor side of the window member 10, i.e., the adherend, with the affixing layer 6 interposed therebetween. The affixing layer 6 can be formed, for example, as a bonding layer containing a bond (e.g., a UV-cured resin or a two-liquid mixed resin) as a main component, or as an adhesive layer containing an adhesive (e.g., a Pressure Sensitive Adhesive (PSA)) as a main component. When the affixing layer 6 is the adhesive layer, a peel-off layer 7 is preferably further formed on the affixing layer 6. Such an arrangement enables the optical film 1 to be easily affixed, just by peeling off the peel-off layer 7, to the adherend, e.g., the window member 10, with the affixing layer 6 interposed therebetween.

From the viewpoint of increasing adhesion between the second base 5a and the affixing layer 6 and/or the second optical layer 5, the optical film 1 may further include a primer layer (not shown) between the second base 5a and the affixing layer 6 and/or the second optical layer 5. Also, from the viewpoint of increasing the adhesion at the above-mentioned location(s), it is preferable to carry out known physical pretreatment instead of or in addition to forming the primer layer. The known physical pretreatment includes, e.g., plasma treatment or corona treatment.

The optical film 1 may further include a barrier layer (not shown) on one of the incident surface S1 and the emergent surface S2 at which the optical film 1 is affixed to the adherend, e.g., the window member 10, or between that one surface and the wavelength selective reflecting layer 3. With the presence of the barrier layer, it is possible to reduce diffusion of moisture toward the wavelength selective reflecting layer 3 from the incident surface S1 or the emergent surface S2 and to suppress deterioration of a metal, etc. contained in the wavelength selective reflecting layer 3. Accordingly, durability of the optical film 1 can be improved.

The optical film 1 may further include a hard coat layer 8 from the viewpoint of giving the surface of the optical film 1 with resistance against scratching, etc. The hard coat layer 8 is preferably formed on one of the incident surface S1 and the emergent surface S2 of the optical film 1, which one is positioned on the opposite side to the surface affixed to the adherend, e.g., the window member 10. A water-repellent or hydrophilic layer may be further formed on the incident surface S1 or the emergent surface S2 of the optical film 1 from the viewpoint of providing an antifouling property, etc. The layer having such a function may be formed, for example, directly on the optical layer 2 or on one of various functional layers such as the hard coat layer 8.

The optical film 1 preferably has flexibility from the viewpoint of enabling the optical film 1 to be easily affixed to the adherend, e.g., the window member 10. Herein, the film is to be construed as including a sheet. In other words, the optical film 1 includes an optical sheet as well.

The optical film 1 preferably has transparency. The transparency preferably falls within a later-described range of transmission image clarity. The difference in refractive index between the first optical layer 4 and the second optical layer 5 is preferably 0.010 or less, more preferably 0.008 or less, and even more preferably 0.005 or less. When the difference in refractive index exceeds 0.010, a transmission image tends to blur in appearance. When the difference in refractive index is in the range of more than 0.008 and not more than 0.010, there are no problems in daily life though depending on outdoor brightness. When the difference in refractive index is more than 0.005 and not more than 0.008, the outdoor sight can be clearly viewed although only a very bright object, such as a light source, causes a displeasing diffraction pattern. When the difference in refractive index is 0.005 or less, the diffraction pattern is hardly displeasing. One of the first optical layer 4 and the second optical layer 5, which one is to be positioned on the side affixed to, e.g., the window member 10, may contain an adhesive as a main component. Such a feature enables the optical film 1 to be affixed to, e.g., the window member 10 with the first optical layer 4 or the second optical layer 5, which contains the adhesive as a main component. In that case, the difference in refractive index with respect to the adhesive preferably falls within the above-described range.

The first optical layer 4 and the second optical layer 5 preferably have the same optical characteristics, such as the refractive index. More specifically, the first optical layer 4 and the second optical layer 5 are preferably made of the same material, e.g., the same resin material, having transparency in the visible range. By using the same material to form the first optical layer 4 and the second optical layer 5, the refractive indexes of both the optical layers are equal to each other, and hence transparency to visible light can be improved. However, care is to be paid to such a point that, even when the starting material is the same, the refractive indexes of finally formed layers may differ from each other depending on, e.g., curing conditions in a film forming process. On the other hand, when the first optical layer 4 and the second optical layer 5 are made of different materials, a transmission image tends to blur for the reason that light is refracted at the wavelength selective reflecting layer 3, which provides a boundary, due to the difference in refractive index between both the optical layers. In particular, there is a tendency that when observing an object analogous to a point light source, such as a lamp at a far distance, a diffraction pattern is conspicuously observed. Note that, in order to adjust a value of the refractive index, an additive may be mixed in the first optical layer 4 and/or the second optical layer 5.

The first optical layer 4 and the second optical layer 5 preferably have transparency in the visible range. Herein, the transparency is defined as having two meanings, i.e., as not absorbing light and not scattering light. When the term "transparency" is generally used, it often implies the former meaning alone. However, the optical film 1 according to the first embodiment preferably has the transparency in both the meanings. A currently employed retroreflector is intended to visually confirm light reflected from road signs, clothes for night workers, etc. and to provide a noticeable indication. Therefore, even when the retroreflector has, e.g., a scattering property, light reflected from an underlying reflector can be visually observed if the retroreflector is in close contact with the underlying reflector. Such a phenomenon is based on the same principle as that an image can be visually confirmed, for example, even when antiglare treatment providing a scattering property is applied to a front surface of an image display device for the purpose of imparting an antiglare property. However, the optical film 1 according to the first embodiment preferably does not scatter light for the reason that the optical film 1 is featured in transmitting light other than the directionally reflected light of particular wavelengths, and that the optical film 1 is affixed to a transmissive member transmitting light primarily at transmission wavelengths, thus allowing the transmitted light to be observed. Note that, depending on usage, the second optical layer 5 may be intentionally provided with the scattering property.

The optical film 1 is preferably used in such a way that it is affixed to a rigid member, e.g., the window member 10, which has transmissivity primarily to the transmitted light other than the particular wavelengths, with, e.g., an adhesive interposed therebetween. Examples of the window member 10 include architectural window members for high-rise buildings, housings, etc. and window members for vehicles. When the optical film 1 is applied to the architectural window members, it is preferably applied to the window member 10 that is oriented to face in some direction within a range, in particular, from east to south and further to west (e.g., within a range from southeast to southwest). This is because, by applying the optical film 1 to the window member 10 oriented as mentioned above, heat rays can be more effectively reflected. The optical film 1 can be applied to not only a single-layer window glass, but also a special glass, such as a multilayer glass. Further, the window member 10 is not limited to a glass-made member, and it may be a member made of a high polymeric material having transparency. The optical layer 2 preferably has transparency in the visible range. The reason is that, with the optical layer 2 having transparency in the visible range, when the optical film 1 is affixed to the window member 10, e.g., the window glass, visible light is allowed to pass through the optical film 1 and lighting with the sunlight can be ensured. The optical film 1 may be affixed to not only an inner surface of a glass, but also an outer surface thereof.

Further, the optical film 1 can be used in combination with an additional heat-ray cutoff film. For example, a light absorption coating may be disposed at the interface between air and the optical film 1 (i.e., on the outermost or innermost surface of the optical film 1). Still further, the optical film 1 can be used in combination with a hard coat layer, an ultraviolet cutoff layer, a surface anti-reflection layer, etc. When one or more of those functional layers are used in a combined manner, the functional layer(s) is preferably disposed at the interface between the optical film 1 and air. However, the ultraviolet cutoff layer is to be disposed on the side closer to the sun than the optical film 1. Thus, particularly when the optical film 1 is affixed to an indoor-side surface of the window glass, the ultraviolet cutoff layer is desirably disposed between the indoor-side surface of the window glass and the optical film 1. In that case, an ultraviolet absorber may be added to an affixing layer between the indoor-side surface of the window glass and the optical film 1.

Also, depending on the usage of the optical film 1, the optical film 1 may be colored to have a visually attractive design. When the visually attractive design is given to the optical film 1, it is preferable that at least one of the first optical layer 4 and the second optical layer 5 absorbs primarily light in a particular wavelength band within the visible range to such an extent as not reducing transparency.

Figure 2:
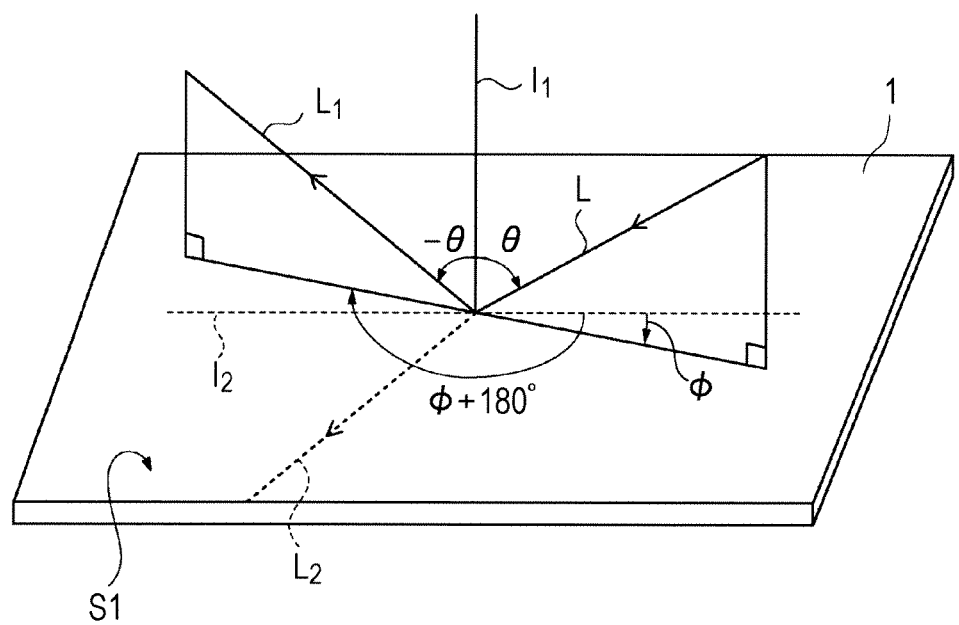
FIG. 2 is a perspective view illustrating the relationship between incident light that is incident on the optical film and reflected light that is reflected by the optical film.
Figure 3:
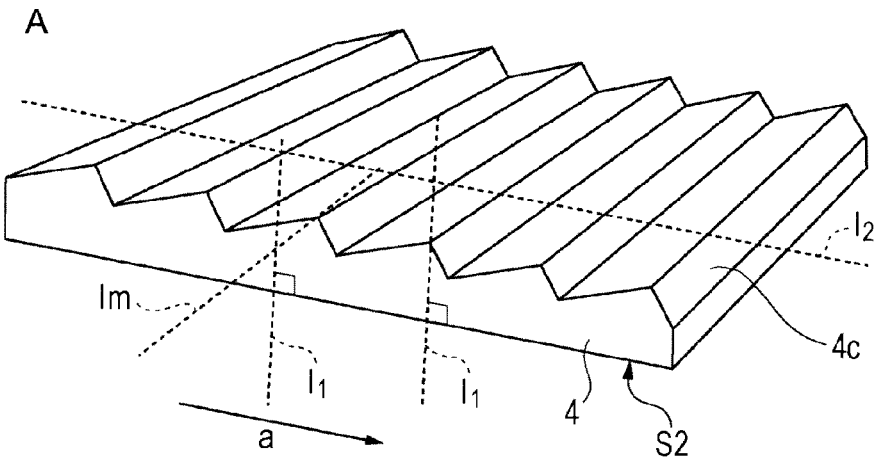
FIG. 3A is a perspective view illustrating an example of shape of triangular pillars formed in a first optical layer.
FIG. 3B is a sectional view illustrating an example of construction of the optical film including the first optical layer in which the triangular pillars illustrated in FIG. 3A are formed.
Figure 3:
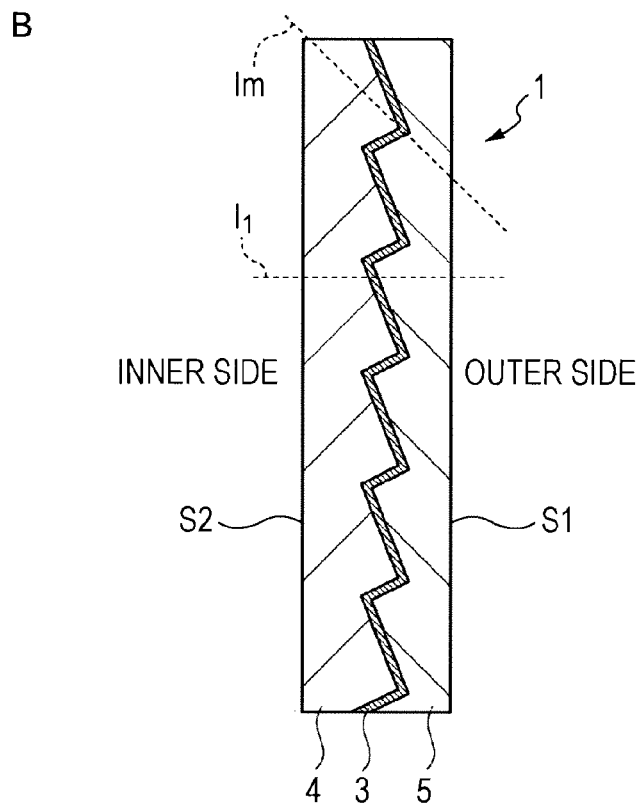

FIG. 2 is a perspective view illustrating the relationship between incident light that is incident on the optical film 1 and reflected light that is reflected by the optical film 1. The optical film 1 has the incident surface S1 on which light L is incident. It is preferable that the optical film 1 selectively directionally reflects, of the light L entering the incident surface S1 at an incident angle $(\theta, \phi)$, light $L_1$ in the particular wavelength band in a direction other than a specular reflection direction $(-\theta, \phi+180°)$, while the optical film 1 transmits light $L_2$ other than the particular wavelength band therethrough. Further, preferably, the optical film 1 has transparency to the light other than the particular wavelength band and the transparency falls within the later-described range of transmission image clarity. Note that $\theta$ is an angle formed by a perpendicular line $l_1$ with respect to the incident surface S1 and the incident light L or reflected light $L_1$. Also, $\phi$ is an angle formed by a particular linear line $l_2$ in the incident surface S1 and a component resulting from projecting the incident light L or the reflected light $L_1$ to the incident surface S1. Herein, the particular linear line $l_2$ in the incident surface implies an axis in which the reflection intensity in the direction $\phi$ is maximized when the optical film 1 is rotated about an axis provided by the perpendicular line $l_1$ with respect to the incident surface S1 of the optical film 1 while the incident angle $(\theta, \phi)$ is held fixed (see FIG. 3). When there are plural axes (directions) in which the reflection intensity is maximized, one of those axes is selected as the linear line $l_2$. Further, an angle $\theta$ rotated clockwise from the perpendicular line $l_1$ as a reference is defined as "+$\theta$", and an angle $\theta$ rotated counterclockwise from the perpendicular line $l_1$ is defined as "−$\theta$". An angle $\phi$ rotated clockwise from the linear line $l_2$ as a reference is defined as "+$\phi$", and an angle $\phi$ rotated counterclockwise from the linear line $l_2$ is defined as "−$\phi$".

The light in the particular wavelength band, which is to be selectively directionally reflected, and the particular light to be transmitted are set differently depending on the usage of the optical film 1. For example, when the optical film 1 is applied to the window member 10, it is preferable that the light in the particular wavelength band, which is to be selectively directionally reflected, is near infrared light and the transmitted light other than the particular wavelength band is visible light. In more detail, the light in the particular wavelength band, which is to be selectively directionally reflected, is preferably near infrared light primarily falling in a wavelength range of 780 nm to 2100 nm. By reflecting the near infrared light, a temperature rise inside a building can be suppressed when the optical body is affixed to the window member such as the window glass. Accordingly, a cooling load can be reduced and energy saving can be achieved. Herein, the term "directional reflection" implies that light is reflected in a particular direction other than the specular reflection direction and the intensity of the reflected light is sufficiently stronger than the intensity of light diffusely reflected with no directionality. Also, the expression "reflect" implies that the reflectance in a particular wavelength band, e.g., in the near infrared range, is preferably 30% or more, more preferably 50% or more, and even more preferably 80% or more. Further, the expression "transmit" implies that the transmittance in a particular wavelength band, e.g., in the visible light range, is preferably 30% or more, more preferably 50% or more, and even more preferably 70% or more.

In the optical film 1, a direction $\phi_o$ in which the incident light is directionally reflected is preferably in the range of −90° or more to 90° or less. The reason is that, on such a condition, when the optical film 1 is affixed to the window member 10, it can return, of the light incoming from the sky, the light in the particular wavelength band toward the sky. When there are no high-rise buildings in the surroundings, the optical film 1 directionally reflecting the incident light in the above-mentioned range is usefully employed. Further, the direction of the directional reflection is preferably in the vicinity of $(\theta, -\phi)$. The expression "vicinity" implies that a deviation in the direction of the directional reflection is preferably within 5 degrees, more preferably within 3 degrees, and even more preferably within 2 degrees with respect to $(\theta, -\phi)$. The reason is that, by setting the direction of the directional reflection as described above, when the optical film 1 is affixed to the window member 10, it can efficiently return, of the light incoming from the sky above buildings standing side by side at substantially the same height, the light in the particular wavelength band toward the sky above the other buildings. In order to realize such directional reflection, the concave-convex surface of the first optical layer 4 or the second optical layer 5 is preferably formed by arraying pillars, extending in one direction, in a one-dimensional pattern. The light incoming in the direction $(\theta, \phi))$ $(-90°<\phi<90°)$ can be reflected in a direction $(\theta_o, -\phi)$ $(0°<\theta_o<90°)$ in accordance with a slope angle of the pillar.

In the optical film 1, the light in the particular wavelength range is preferably directionally reflected in a direction in the vicinity of the direction of retroreflection. In other words, the direction of the reflection of the light in the particular wavelength range, of the light incident on the incident surface S1 at the incident angle $(\theta, \phi))$, is preferably in the vicinity of $(\theta, \phi)$. On that condition, when the optical film 1 is affixed to the window member 10, it can return, of the light incoming from the sky, the light in the particular wavelength band toward the sky. Herein, the expression "vicinity" implies that a deviation in the direction of the directional reflection is preferably within 5 degrees, more preferably within 3 degrees, and even more preferably within 2 degrees. The reason is that, by satisfying such a range, when the optical film 1 is affixed to the window member 10, it can efficiently return, of the light incoming from the sky, the light in the particular wavelength band toward the sky. Moreover, in the case of, e.g., an infrared sensor or an infrared image pickup device where an infrared light emitting unit and a light receiving unit are adjacent to each other, the direction of retroreflection is to be set aligned with the incident direction. However, when sensing in a particular direction is not performed as in the present invention, the direction of retroreflection and the incident direction are not required to be exactly aligned with each other.

In the optical film 1, a value of the transmission image clarity in the wavelength band where the optical film 1 has transmissivity is preferably 50 or larger, more preferably 60 or larger, and even more preferably 75 or larger when an optical comb of 0.5 mm is used. When the value of the transmission image clarity is smaller than 50, a transmission image tends to blur in appearance. When the value of the transmission image clarity is not smaller than 50 and smaller than 60, there are no problems in daily life though depending on outdoor brightness. When the value of the transmission image clarity is not smaller than 60 and smaller than 75, the outdoor sight can be clearly viewed although only a very bright object, such as a light source, causes a displeasing diffraction pattern. When the value of the transmission image clarity is not smaller than 75, a diffraction pattern is hardly displeasing. Further, a total of values of the transmission image clarity measured using optical combs of 0.125 mm, 0.5 mm, 1.0 mm and 2.0 mm is preferably 230 or larger, more preferably 270 or larger, and even more preferably 350 or larger. When the total value of the transmission image clarity is smaller than 230, a transmission image tends to blur in appearance. When the total value of the transmission image clarity is not smaller than 230 and smaller than 270, there are no problems in daily life though depending on outdoor brightness. When the total value of the transmission image clarity is not smaller than 270 and smaller than 350, the outdoor sight can be clearly viewed although only a very bright object, such as a light source, causes a displeasing diffraction pattern. When the total value of the transmission image clarity is not smaller than 350, the diffraction pattern is hardly displeasing. Herein, the value of the transmission image clarity is measured in conformity with JIS K7105 by using ICM-1T made by Suga Test Instruments Co., Ltd. Note that when the wavelength to be transmitted differs from that of the D65 light source, the measurement is preferably performed after calibration using a filter having the wavelength to be transmitted.

In the optical film 1, haze occurred in the wavelength band where the optical film 1 has transmissivity is preferably 6% or less, more preferably 4% or less, and even more preferably 2% or less. The reason is that, if the haze exceeds 6%, the transmitted light is scattered and a view is obscured. Herein, the haze is measured in accordance with the measurement method stipulated in JIS K7136 by using HM-150 made by Murakami Color Research Laboratory Co., Ltd. Note that when the wavelength to be transmitted differs from that of the D65 light source, the measurement is preferably performed after calibration using a filter having the wavelength to be transmitted. The incident surface S1, preferably both the incident surface S1 and the emergent surface S2, of the optical film 1 have smoothness at such a level as not degrading the transmission image clarity. More specifically, arithmetic mean roughness Ra of the incident surface S1 and the emergent surface S2 is preferably 0.08 μm or less, more preferably 0.06 μm or less, and even more preferably 0.04 μm or less. Note that the arithmetic mean roughness Ra is obtained as a roughness parameter by measuring the surface roughness of the incident surface and deriving a roughness curve from a two-dimensional profile curve. Measurement conditions are set in conformity with JIS B0601:2001. A measuring apparatus and measurement conditions are as follows:

measuring apparatus: full-automated fine shape measuring machine SURFCODER ET4000A (made by Kosaka Laboratory Ltd.), λc=0.8 mm, evaluation length: 4 mm, cutoff: ×5, and data sampling interval: 0.5 μm.

The light transmitted through the optical film 1 is preferably as close as possible to neutral in color. Even when the transmitted light is colored, the color preferably has a pale tone in, e.g., blue, blue-green or green that provides a cool feeling. From the viewpoint of obtaining such a color tone, it is desired that chromaticity coordinates x and y of the transmitted light and the reflected light, the transmitted light being output from the emergent surface S2 after entering the incident surface S1 and passing through the optical layer 2 and the wavelength selective reflecting layer 3, satisfy respective ranges of preferably $0.20<x<0.35$ and $0.20<y<0.40$, more preferably $0.25<x<0.32$ and $0.25<y<0.37$, and even more preferably $0.30<x<0.32$ and $0.30<y<0.35$, when the measurement is conducted for irradiation using the D65 light source, for example. Further, from the viewpoint of avoiding the color tone from becoming reddish, it is desired that the chromaticity coordinates x and y satisfy the relationship of preferably $y>x-0.02$ and more preferably $y>x$. In addition, change in color tone of the reflected light depending on the incident angle is undesired because, when the optical film is applied to, e.g., building windows, the color tone is different depending on a viewing place and an appearing color is changed upon walking. From the viewpoint of suppressing the above-mentioned change in the color tone of the reflected light, each of an absolute value of difference between chromaticity coordinates x and an absolute value of difference between chromaticity coordinates y of the light, which is incident on the incident surface S1 or the emergent surface S2 at the incident angle θ of 5° or larger and 60° or smaller and which is specularly reflected by the optical film 1, is preferably 0.05 or smaller, more preferably 0.03 or smaller, and even more preferably 0.01 or smaller at each of both the principal surfaces of the optical film 1. The above-described limitations on numerical ranges regarding the chromaticity coordinates x and y of the reflected light are desirably satisfied for both the incident surface S1 and the emergent surface S2.

In order to suppress the color change in the vicinity of the specular reflection, it is preferable that the optical film 1 does not include a plane having an inclination angle of preferably 5° or smaller and more preferably 10° or smaller. Further, when the wavelength selective reflecting layer 3 is covered with a resin, the incident light is refracted upon entering the resin from air, and hence the change of the color tone in the vicinity of the specularly reflected light can be suppressed over a wider range of incident angle. Additionally, when the color of light reflected in some direction other than the specular reflection causes a problem, the optical film 1 is preferably arranged such that it does not directionally reflect the light in the direction causing the problem.

The first optical layer 4, the second optical layer 5, and the wavelength selective reflecting layer 3, which constitute the optical film 1, will be described in order below.

(First Optical Layer and Second Optical Layer)

The first optical layer 4 serves to, for example, support and protect the wavelength selective reflecting layer 3. The first optical layer 4 is made of a layer containing, e.g., a resin as a main component from the viewpoint of giving the optical film 1 with flexibility. For example, one of two principal surfaces of the first optical layer 4 is a smooth surface and the other is a concave-convex surface (first surface). The wavelength selective reflecting layer 3 is formed on that concave-convex surface.

The second optical layer 5 serves to protect the wavelength selective reflecting layer 3 by embedding the first surface (concave-convex surface) of the first optical layer 4 on which the wavelength selective reflecting layer 3 is formed. The second optical layer 5 is made of a layer containing, e.g., a resin as a main component from the viewpoint of giving the optical film 1 with flexibility. For example, one of two principal surfaces of the second optical layer 5 is a smooth surface and the other is a concave-convex surface (second surface). The concave-convex surface of the first optical layer 4 and the concave-convex surface of the second optical layer 5 are reversed to each other in a concave-convex relation.

The concave-convex surface of the first optical layer 4 is formed, for example, by a plurality of asymmetrical triangular pillars 4c that are arrayed in a one-dimensional pattern. The concave-convex surface of the second optical layer 5 is formed, for example, by a plurality of asymmetrical triangular pillars 5c that are arrayed in a one-dimensional pattern. Because the triangular pillars 4c of the first optical layer 4 and the triangular pillars 5c of the second optical layer 5 differ only in that the concave-convex relation is reversed to each other, the following description is made just about the triangular pillars 4c of the first optical layer 4.

In the optical film 1, a pitch P of the triangular pillars 4c is preferably not smaller than 5 µm and not larger than 5 mm, more preferably not smaller than 5 µm and smaller than 250 µm, and even more preferably not smaller than 20 µm and not larger than 200 µm. If the pitch of the triangular pillars 4c is smaller than 5 µm, it is generally difficult to form the triangular pillars 4c in the desired shape. Further, because there is generally a difficulty in making steep a wavelength selection characteristic of the wavelength selective reflecting layer 3, the wavelength selective reflecting layer 3 may reflect light in part of transmission wavelengths. If such reflection occurs, diffraction is generated and high-order reflections are also visually observed, whereby transparency tends to be felt poor. On the other hand, if the pitch of the triangular pillars 4c exceeds 5 mm, a necessary film thickness is increased and flexibility is lost from the optical film 1, taking into consideration the shape of the triangular pillars 4c required for the directional reflection. The loss of flexibility causes a difficulty in affixing the optical film 1 to a rigid body, such as the window member 10. Also, by setting the pitch of the triangular pillars 4c to be smaller than 250 µm, flexibility is further increased to such an extent that the optical film 1 can be easily manufactured in a roll-to-roll manner and batch production is not necessary. When the optical element according to the present invention is applied to building components such as windows, the optical element is required to have a length of about several meters and roll-to-roll production is more suitable than the batch production. Moreover, when the pitch is set to be not smaller than 20 µm and not larger than 200 µm, productivity can be further increased.

In addition, the shape of the triangular pillars 4c formed in the surface of the first optical layer 4 is not limited to one type, and the triangular pillars 4c may be formed in plural types of shapes in the surface of the first optical layer 4. When the triangular pillars 4c having the plural types of shapes are formed in the surface of the first optical layer 4, a predetermined pattern including the triangular pillars 4c having the plural types of shapes may be cyclically repeated. Alternatively, the plural types of triangular pillars 4c may be formed at random (non-cyclically) depending on the desired characteristics.

FIG. 3A is a perspective view illustrating an example of shape of the triangular pillars formed in the first optical layer. FIG. 3B is a sectional view illustrating an example of construction of the optical film including the first optical layer in which the triangular pillars illustrated in FIG. 3A are formed. The triangular pillars 4c are in the form of asymmetrical triangular pillars extending in one direction, and those triangular pillars 4c are arrayed side by side in one direction, i.e., in a one-dimensional pattern. With the triangular pillar 4c having such a shape, the incident light can be returned toward the sky after being reflected once or twice. Accordingly, in comparison with the case using corner cubes where the incident light is returned to the sky after being reflected three times, the amount of light absorbed by the wavelength selective reflecting layer 3 can be reduced and heat generation can be suppressed. Since the wavelength selective reflecting layer 3 is formed on the triangular pillars 4c, the wavelength selective reflecting layer 3 has the same shape as the surface shape of the triangular pillars 4c.

As illustrated in FIG. 3A, the triangular pillars 4c are each a triangular pillar having an asymmetrical shape with respect to a perpendicular line $l_1$ that is perpendicular to the incident surface S1 or the emergent surface S2 of the optical film 1. In such a case, a principal axis $l_m$ of the triangular pillar 4c is inclined from the perpendicular line $l_1$ as a reference in an array direction a of the triangular pillars 4c. Herein, the principal axis $l_m$ of the triangular pillar 4c implies a linear line passing a midpoint of a bottom side of a cross-section of the triangular pillar and an apex of the triangular pillar. When the optical film 1 is affixed to the window member 10 arranged substantially vertically to the ground, the principal axis $l_m$ of the triangular pillar 4c is inclined to the upper side (sky side) or the lower side (ground side) of the window member 10 from the perpendicular line $l_1$ as a reference. In the example illustrated in FIG. 3B, the principal axis $l_m$ of the triangular pillar 4c is inclined to the lower side (ground side) of the window member 10 from the perpendicular line $l_1$ as a reference.

Figure 4:
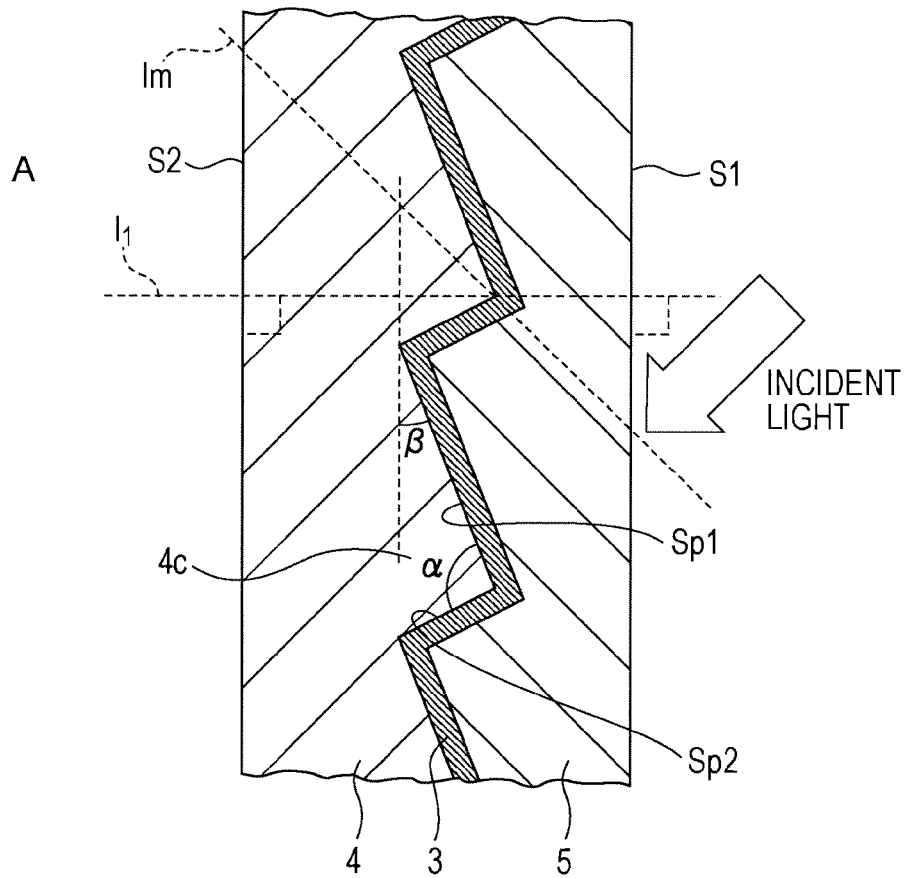
FIG. 4A is an enlarged sectional view illustrating, in enlarged scale, a part of the optical film illustrated in FIG. 3B.
FIG. 4B is an enlarged sectional view illustrating, in enlarged scale, a wavelength selective reflecting layer illustrated in FIG. 3B.
Figure 4:
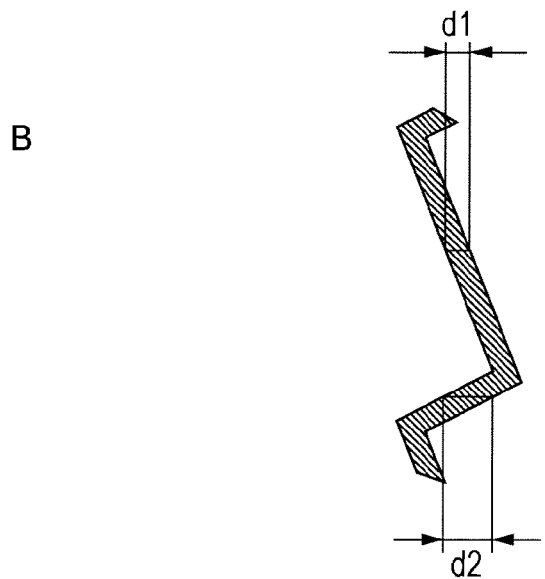

FIG. 4A is an enlarged sectional view illustrating, in enlarged scale, a part of the optical film illustrated in FIG. 3B. FIG. 4B is an enlarged sectional view illustrating, in enlarged scale, the wavelength selective reflecting layer illustrated in FIG. 3B. The triangular pillar 4c has a first sloped surface Sp1 and a second sloped surface Sp2 each providing a triangular pillar surface, i.e., a film-formed surface, on which the wavelength selective reflecting layer 3 is formed. The first sloped surface Sp1 becomes a surface positioned on the upper side (sky side) when the optical film 1 is affixed to the adherend, e.g., the window member 10, and the second sloped surface Sp2 becomes a surface positioned on the lower side (ground side) when the optical film 1 is affixed to the adherend, e.g., the window member 10. In the following description, film thicknesses of the wavelength selective reflecting layer 3 formed on the first sloped surface Sp1 and the second sloped surface Sp2 are called a first film thickness d1 and a second film thickness d2 of the wavelength selective reflecting layer 3, respectively.

The triangular pillar 4c has an apex angle α that is formed by the first sloped surface Sp1 and the second sloped surface Sp2, and a slope angle β of the first sloped surface Sp1 with respect to the incident surface S1 or the emergent surface S2. The slope angle β provides a slope angle positioned on the upper side (sky side) when the optical film 1 is affixed to the adherend, e.g., the window member 10. The optical film 1 is affixed to the adherend, e.g., the window member 10 or a building, in such a state that the slope angle β of the triangular pillar 4c is positioned upward of the apex angle α thereof. The apex of the triangular pillar 4c may be rounded to have a curvature radius R. When the apex of the triangular pillar 4c is rounded to have a curvature radius R as mentioned above, the apex angle R is defined as an opening angle formed by two sides of the apex at a position before the apex is curved at the curvature radius R.

The apex angle α and the slope angle β satisfy any one of the following formula (1) to (4). The reason is that, by satisfying any one of those formulae, a higher upward reflectance can be obtained.

$$-3.6\alpha+396 \leq \beta \leq 80 \ (85 \leq \alpha \leq 90) \quad (1)$$

$$\alpha-30 \leq \beta \leq -\alpha+170 \ (90 \leq \alpha \leq 100) \quad (2)$$

$$30 \leq \beta \leq \alpha-50 \ (80 \leq \alpha \leq 90) \quad (3)$$

$$30 \leq \beta \leq -\alpha+130 \ (90 \leq \alpha \leq 100) \quad (4)$$

When the apex angle α and the slope angle β satisfy the formula (1) or (2), the first film thickness d1 and the second film thickness d2 are preferably substantially the same. This is because improvement of transmission performance and reflection performance can be expected on such a condition. Herein, the expression "the film thicknesses are substantially the same" implies that a proportion of the second film thickness d2 to the first film thickness d1, i.e., ((d1/d2)×100) [%], is ±10% or less.

When the apex angle α and the slope angle β satisfy the formula (3) or (4), the first film thickness d1 and the second film thickness d2 may differ from each other. In such a case, if the wavelength selective reflecting layer 3 on one sloped surface is thin, it cannot reflect light and transmits the light therethrough. Therefore, the thickness of the wavelength selective reflecting layer 3 is preferably set to be 7 nm or more. On the other hand, if the thickness of the wavelength selective reflecting layer 3 exceeds 14 nm, flooding of the reflected light occurs. Therefore, the thickness of the wavelength selective reflecting layer 3 is preferably set to be 14 nm or less. In other words, a ratio between both the film thicknesses is preferably 200% or less.

The first optical layer 4 preferably contains, as a main component, a resin of the type exhibiting a small reduction in its storage modulus at 100° C. and not providing a significant difference in storage modulus between 25° C. and 100° C. In more detail, the first optical layer 4 preferably contains a resin having the storage modulus of $3 \times 10^9$ Pa or less at 25° C. and the storage modulus of $3 \times 10^7$ Pa or more at 100° C. Note that the first optical layer 4 is preferably made of one type of resin, but it may contain two or more types of resins. Further, the first optical layer 4 may be mixed with an additive, when necessary.

When the first optical layer 4 contains, as a main component, the resin of the type exhibiting a small reduction in its storage modulus at 100° C. and not providing a significant difference in storage modulus between 25° C. and 100° C. as described above, the first optical layer 4 can substantially maintain the interface shape as per design even when a process under application of heat or both of heat and pressure is carried out after forming the concave-convex surface (first surface) of the first optical layer 4. On the other hand, if the first optical layer 4 contains, as a main component, a resin of the type exhibiting a large reduction in its storage modulus at 100° C. and providing a significant difference in storage modulus between 25° C. and 100° C., the interface shape is deformed from the designed shape to such a large extent that the optical film 1 may be curled.

Here, the process under application of heat includes not only a process of directly applying heat to the optical film 1 or components thereof, such as annealing, but also a process in which temperature at the surface of a formed film is locally raised and heat is indirectly applied to the optical film 1 or components thereof, for example, during formation of a thin film and during curing of a resin composition, and a process in which the temperature of a die/mold is raised upon irradiation with an energy ray and heat is indirectly applied to the optical film. Further, the effect resulting from restricting the numerical range of the storage modulus as described above is not limited to the case using the particular type of resin and can be similarly obtained when a thermoplastic resin, a thermosetting resin, and an energy-ray irradiation resin are used.

The storage modulus of the first optical layer 4 can be confirmed, for example, as follows. When the surface of the first optical layer 4 is exposed, the storage modulus of the first optical layer 4 can be confirmed by measuring the storage modulus of the exposed surface with a micro-hardness tester. Also, when the first base 4a, etc. are formed on the surface of the first optical layer 4, the storage modulus of the first optical layer 4 can be confirmed by peeling off the first base 4a, etc. to make the surface of the first optical layer 4 exposed, and then measuring the storage modulus of the exposed surface with a micro-hardness tester.

A reduction in the modulus at high temperature can be suppressed, for example, by a method of adjusting, e.g., the length and the kind of a side chain when the thermoplastic resin is used, and by a method of adjusting, e.g., the number of cross-linking points and the molecular structure of a cross-linking material when the thermosetting resin and the energy-ray irradiation resin are used. However, it is preferable that the characteristics demanded for the resin material itself are not degraded with such a structural change. Depending on the type of the cross-linking agent, for example, the modulus at about room temperature may be increased to such an extent that a film becomes brittle, or that the film is curved or curled due to large shrinkage. It is, therefore, preferable to properly select the type of the cross-linking agent depending on the demanded characteristics.

When the first optical layer 4 contains a crystalline high-polymeric material as a main component, it preferably contains, as a main component, a resin having the glass transition point higher than a maximum temperature during a manufacturing process and exhibiting a small reduction in the storage modulus at the maximum temperature during the manufacturing process. On the other hand, if a resin having the glass transition point in the range of the room temperature 25° C. or higher to the maximum temperature during the manufacturing process or lower and exhibiting a large reduction in the storage modulus at the maximum temperature during the manufacturing process is used, a difficulty occurs in holding the ideal interface shape as per design during the manufacturing process.

When the first optical layer 4 contains an amorphous high-polymeric material as a main component, it preferably contains, as a main component, a resin having the melting point higher than the maximum temperature during the manufacturing process and exhibiting a small reduction in the storage modulus at the maximum temperature during the manufacturing process. On the other hand, if a resin having the melting point in the range of the room temperature 25° C. or higher to the maximum temperature during the manufacturing process or lower and exhibiting a large reduction in the storage modulus at the maximum temperature during the manufacturing process is used, a difficulty occurs in maintaining the ideal interface shape as per design during the manufacturing process.

Herein, the maximum temperature during the manufacturing process implies a maximum temperature at the concave-convex surface (first surface) of the first optical layer 4 during the manufacturing process. Preferably, the second optical layer 5 also satisfies the above-mentioned numerical range of the storage modulus and the above-mentioned temperature range of the glass transition point.

Thus, at least one of the first optical layer 4 and the second optical layer 5 preferably contains the resin having the storage modulus of $3\times10^9$ Pa or less at 25° C. The reason is that, on such a condition, flexibility can be given to the optical film 1 at the room temperature 25° C. and the optical film 1 can be manufactured with the roll-to-roll process.

The first base 4a and the second base 5a have transparency in an exemplary case. Each base is preferably in the form of a film from the viewpoint of giving the optical film 1 with flexibility, but the form of the base is not particularly limited to the film. The first base 4a and the second base 5a can be each formed by using, e.g., known high-polymeric materials. Examples of the known high-polymeric materials include triacetylcellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resin (PMMA), polycarbonate (PC), epoxy resin, urea resin, urethane resin, and melamine resin. However, the materials of each base are not limited to the above-mentioned particular examples. The thickness of each of the first base 4a and the second base 5a is preferably 38 to 100 μm from the viewpoint of productivity, but it is not limited to such a particular range. The first base 4a and the second base 5a are preferably transmissive to an energy ray. The reason is that, in such a case, an energy-ray curable resin interposed between the first base 4a or the second base 5a and the wavelength selective reflecting layer 3 can be cured, as described later, by irradiating the energy-ray curable resin with the energy ray from the side including the first base 4a or the second base 5a.

The first optical layer 4 and the second optical layer 5 have transparency in an exemplary case. The first optical layer 4 and the second optical layer 5 are each obtained, for example, by curing a resin composition. As the resin composition, an energy-ray curable resin capable of being cured upon irradiation with light or an electron ray, or a thermosetting resin capable of being cured upon application of heat is preferably used from the viewpoint of easiness in production. As the energy-ray curable resin, a photosensitive resin composition capable of being cured upon irradiation with light is preferable, and an ultraviolet curable resin composition capable of being cured upon irradiation with an ultraviolet ray is most preferable. From the viewpoint of increasing adhesion between the first optical layer 4 or the second optical layer 5 and the wavelength selective reflecting layer 3, the resin composition preferably further contains a compound containing phosphoric acid, a compound containing succinic acid, and a compound containing butyrolactone. The compound containing phosphoric acid may be, e.g., (meth)acrylate containing phosphoric acid, preferably a (meth)acryl monomer or oligomer having phosphoric acid in a functional group. The compound containing succinic acid may be, e.g., (meth)acrylate containing succinic acid, preferably a (meth)acryl monomer or oligomer having succinic acid in a functional group. The compound containing butyrolactone may be, e.g., (meth)acrylate containing butyrolactone, preferably a (meth)acryl monomer or oligomer having butyrolactone in a functional group.

The ultraviolet curable resin composition contains, e.g., (meth)acrylate and a photopolymerization initiator. Also, the ultraviolet curable resin composition may further contain, when necessary, a photo-stabilizer, a flame retardant, a leveling agent, an anti-oxidant, etc.

As the acrylate, a monomer and/or an oligomer having two or more (meth)acryloyl groups is preferably used. Examples of such a monomer and/or oligomer include urethane (meth)acrylate, epoxy (meth)acrylate, polyester (meth)acrylate, polyol (meth)acrylate, polyether (meth)acrylate, and melamine (meth)acrylate. Herein, the (meth)acryloyl group implies any one of an acryloyl group and a methacryloyl group. Herein, the oligomer implies a molecule having molecular weight of 500 or more to 60000 or less.

The photopolymerization initiator used here can be selected, as appropriate, from among known materials. As examples of the known materials, benzophenone derivatives, acetophenone derivatives, anthraquinone derivatives, etc. can be used alone or in combination. An amount of the photopolymerization initiator mixed is preferably 0.1% by mass or more and 10% by mass or less of the solid content. If the amount of the photopolymerization initiator mixed is less than 0.1% by mass, photo-curability is reduced to such a level as being not suitable for industrial production from the practical point of view. On the other hand, if the amount of the photopolymerization initiator mixed exceeds 10% by mass, an odor tends to remain in a coated film when an amount of light for the irradiation is insufficient. Herein, the solid content implies all components constituting the hard coat layer 12 after being cured. In practice, for example, the acrylate, the photopolymerization initiator, etc. are called the solid content.

Preferably, the resin has such a property that a structure can be transferred to the resin upon, e.g., irradiation with the energy ray or application of heat. Any type of resin, such as a vinyl-based resin, an epoxy-based resin, a thermoplastic resin, can be used insofar as the resin satisfies the above-described requirements for the refractive index.

An oligomer may be added to the resin to reduce curing shrinkage. The resin may contain, e.g., polyisocyanate as a curing agent. Further, in consideration of adhesion between the first optical layer 4 or the second optical layer 5 and the adjacent layer, the resin may be mixed with one or more of monomers having a hydroxyl group, a carboxyl group and a phosphoric group, polyols, coupling agents such as carboxylic acid, silane, aluminum and titanium, various chelating agents, etc.

The resin composition preferably further contains a cross-linking agent. In particular, a cyclic cross-linking agent is preferably used as the cross-linking agent. The reason is that, by using the cross-linking agent, the resin can be made heat-resistant without greatly changing the storage modulus at the room temperature. If the storage modulus at the room temperature is greatly changed, the optical film 1 becomes brittle and a difficulty occurs in fabricating the optical film 1 with, e.g., the roll-to-roll process. Examples of the cyclic cross-linking agent include dioxaneglycol diacrylate, tricyclodecanedimethanol diacrylate, tricyclodecanedimethanol dimethacrylate, ethylene oxide-modified isocyanurate diacrylate, ethylene oxide-modified isocyanurate triacrylate, and caprolactone-modified tris(acryloxyethyl)isocyanurate.

Preferably, the first base 4a or the second base 5a has water vapor permeability lower than that of the first optical layer 4 or the second optical layer 5, respectively. For example, when the first optical layer 4 is formed by using the energy-ray curable resin, e.g., urethane acrylate, the first base 4a is preferably formed by using a resin, e.g., polyethylene terephthalate (PET), which has water vapor permeability lower than that of the first optical layer 4 and which is transmissive to the energy ray. As a result, diffusion of moisture into the wavelength selective reflecting layer 3 from the incident surface S1 or the emergent surface S2 can be reduced and deterioration of a metal, etc. contained in the wavelength selective reflecting layer 3 can be suppressed. Hence, durability of the optical film 1 can be improved. Note that the water vapor permeability of PET having a thickness of 75 μm is about 10 g/m²/day (40° C., 90% RH).

Preferably, at least one of the first optical layer 4 and the second optical layer 5 contains a functional group having high polarity, and the content of such a functional group differs between the first optical layer 4 and the second optical layer 5. Preferably, both the first optical layer 4 and the second optical layer 5 contain a phosphoric compound (e.g., phosphoric ester), and the content of the phosphoric compound differs between the first optical layer 4 and the second optical layer 5. The difference in the content of the phosphoric compound between the first optical layer 4 and the second optical layer 5 is preferably two or more times, more preferably five or more times, and even more preferably ten or more times.

When at least one of the first optical layer 4 and the second optical layer 5 contains the phosphoric compound, the wavelength selective reflecting layer 3 preferably contains an oxide, a nitride, or an oxynitride in its surface adjoining with the first optical layer 4 or the second optical layer 5 that contains the phosphoric compound. It is particularly preferable that the wavelength selective reflecting layer 3 includes a layer, which contains zinc oxide (ZnO) or niobium oxide, in its surface adjoining with the first optical layer 4 or the second optical layer 5 that contains the phosphoric compound. Such a feature is to increase adhesion between one of those optical layers and the wavelength selective reflecting layer 3. Another reason is that an anticorrosion effect is increased when the wavelength selective reflecting layer 3 contains a metal, such as Ag. Additionally, the wavelength selective reflecting layer 3 may contain a dopant, such as Al or Ga. This is because the dopant improves film quality and smoothness when a metal oxide layer is formed by, e.g., sputtering.

From the viewpoint of giving a visually attractive design to the optical film 1, the window member 10, etc., at least one of the first optical layer 4 and the second optical layer 5 preferably has a characteristic of absorbing light in a particular wavelength band within the visible range. A pigment dispersed in the resin may be either an organic pigment or an inorganic pigment. In particular, an inorganic pigment having high weatherbility in itself is preferable. Practical examples of the inorganic pigment include zircone gray (Co- and Ni-doped $ZrSiO_4$), praseodymium yellow (Pr-doped $ZrSiO_4$), chrome-titania yellow (Cr- and Sb-doped $TiO_2$ or Cr- and W-doped $TiO_2$), chrome green (such as $Cr_2O_2$), peacock blue ($(CoZn)O(AlCr)_2O_2$), Victoria green ($(Al, Cr)_2O_2$), deep blue ($CoO.Al_2O_3.SiO_2$), vanadium-zirconium blue (V-doped $ZrSiO_4$), chrome-tin pink (Cr-doped $CaO.SnO_2.SiO_2$), manganese pink (Mn-doped $Al_2O_2$), and salmon pink (Fe-doped $ZrSiO_4$). Examples of the organic pigment include an azo-based pigment and a phthalocyanine pigment.

(Wavelength Selective Reflecting Layer)

For example, the wavelength selective reflecting layer 3 directionally reflects, of the light entering the incident surface at the incident angle (θ, φ), the light in the particular wavelength band, while transmitting the light other than the particular wavelength band therethrough. The wavelength selective reflecting layer 3 is, for example, a multilayer film, a transparent electroconductive layer, or a functional layer. Also, the wavelength selective reflecting layer 3 may be a combination of two or more of a multilayer film, a transparent electroconductive layer, and a functional layer. A mean film thickness of the wavelength selective reflecting layer 3 is preferably 20 μm, more preferably 5 μm or less, and even more preferably 1 μm or less. If the mean film thickness of the wavelength selective reflecting layer 3 exceeds 20 μm, the length of an optical path in which the transmitted light is refracted is increased, and the transmission image tends to distort in appearance. The reflecting layer can be formed, for example, by sputtering, vapor deposition, dip coating, or die coating.

The multilayer film, the transparent electroconductive layer, and the functional layer will be described below one by one.

(Multilayer Film)

The multilayer film is, for example, a multilayer film formed by alternately stacking a low refractive index layer and a high refractive index layer, which differ in refractive index from each other. As an alternative, the multilayer film is, for example, a multilayer film formed by alternately stacking a metal layer having a high reflectance in the infrared range, and a high refractive index layer having a high refractive index in the visible range and serving as an anti-reflection layer. An optical transparent layer or a transparent conductive layer can be used as the high refractive index layer.

The metal layer having a high reflectance in the infrared range contains, as a main component, e.g., Au, Ag, Cu, Al, Ni, Cr, Ti, Pd, Co, Si, Ta, W, Mo or Ge alone, or an alloy containing two or more selected from among those elements. Of those examples, Ag-, Cu-, Al-, Si- or Ge-based materials are preferable in consideration of practicability. When an alloy is used as the material of the metal layer, the metal layer preferably contains, as a main component, e.g., AlCu, AlTi, AlCr, AlCo, AlNdCu, AlMgSi, AgPdCu, AgPdTi, AgCuTi, AgPdCa, AgPdMg, AgPdFe, Ag, or SiB. Further, to retard corrosion of the metal layer, another material, such as Ti or Nd, is preferably added to the metal layer. In particular, when Ag is used as the material of the metal layer, it is preferable to add the above-mentioned material.

The optical transparent layer is an optical transparent layer having a high refractive index in the visible range and serving as an anti-reflection layer. The optical transparent layer contains, as a main component, e.g., a high-dielectric material, such as niobium oxide, tantalum oxide, or titanium oxide. The transparent conductive layer contains, as a main component, e.g., ZnO-based oxide or indium-doped tin oxide. Note that the ZnO-based oxide can be, for example, at least one selected from a group including zinc oxide (ZnO), gallium (Ga)- and aluminum (Al)-doped zinc oxide (GAZO), Al-doped zinc oxide (AZO), and gallium (Ga)-doped zinc oxide (GZO).

The refractive index of the high refractive index layer included in the multilayer film is preferably in the range of 1.7 or more to 2.6 or less. It is more preferably 1.8 or more to 2.6 or less, and even more preferably 1.9 or more to 2.6 or less. The reason is that, by setting the refractive index as mentioned above, anti-reflection can be realized in the visible light range with a film, which is so thin as not to cause cracking. Herein, the refractive index is measured at a wavelength of 550 nm. The high refractive index layer is a layer containing, as a main component, a metal oxide, for example. As an example of the metal oxide, the metal oxide other than zinc oxide is preferably used in some cases from the viewpoint of relaxing stresses in the layer and suppressing the occurrence of cracks. In particular, at least one selected from a group including niobium oxide (e.g., niobium pentoxide), tantalum oxide (e.g., tantalum pentoxide), and titanium oxide is preferably used. The film thickness of the high refractive index layer is preferably 10 nm or more and 120 nm or less, more preferably 10 nm or more and 100 nm or less, and even more preferably 10 nm or more and 80 nm or less. If the film thickness is less than 10 nm, the high refractive index layer is more apt to reflect the visible light. On the other hand, if the film thickness exceeds 120, the high refractive index layer is more apt to reduce transmittance and to cause cracking.

The multilayer film is not limited to a thin film made of an inorganic material, and it may be formed by stacking a thin film made of a high polymeric material, or a layer containing fine particles, etc. dispersed in a high polymer. Further, a thin buffer layer made of, e.g., Ti and having a thickness of several nanometers may be formed at the interface between the formed optical transparent layer and another adjacent layer for the purpose of preventing oxidation degradation of a metal in the underlying layer when the optical transparent layer is formed. Herein, the buffer layer implies a layer that is self-oxidized to suppress oxidation of e.g., a metal layer as an underlying layer when an overlying layer is formed.

(Transparent Electroconductive Layer)

The transparent electroconductive layer is a transparent electroconductive layer containing, as a main component, an electroconductive material having transparency in the visible range. The transparent electroconductive layer contains, as a main component, e.g., a transparent electroconductive material, such as tin oxide, zinc oxide, a material containing carbon nano-tubes, indium-doped tin oxide, indium-doped zinc oxide, and antimony-doped tin oxide. Alternatively, the transparent electroconductive layer may be formed as a layer containing nano-particles of the above-mentioned materials, or nano-particles, nano-rods or nano-wires of an electroconductive material, e.g., a metal, which are dispersed in a resin at a high density.

(Functional Layer)

The functional layer contains, as a main component, a chromic material of which reflection performance, for example, is reversibly changed upon application of an external stimulus. The chromic material is a material reversibly changing its structure upon application of an external stimulus, such as heat, light, or intrusive molecules. Examples of the chromic material usable here include a photochromic material, a thermochromic material, a gaschromic material, and an electrochromic material.

The photochromic material is a material reversibly changing its structure by the action of light. The photochromic material can reversibly change various physical properties, such as reflectance and color, upon irradiation with light, e.g., an ultraviolet ray. For example, transition metal oxides, such as $TiO_2$, $WO_3$, $MoO_3$, and $Nb_2O_5$ doped with Cr, Fe or Ni, can be used as the photochromic material. Further, wavelength selectivity can be improved by stacking a layer of the photochromic material and a layer having a different refractive index from that of the former layer.

The thermochromic material is a material reversibly changing its structure by the action of heat. The photochromic material can reversibly change various physical properties, such as reflectance and color, upon application of heat. For example, $VO_2$ can be used as the thermochromic material. Other elements, such as W, Mo and F, may also be added for the purpose of controlling the transition temperature and the transition curve. Further, a multilayer structure may be formed by sandwiching a thin film containing, as a main component, the thermochromic material, e.g., $VO_2$, between anti-reflection layers each containing, as a main component, a high refractive index material, e.g., $TiO_2$ or ITO.

Alternatively, a photonic lattice, such as a cholesteric liquid crystal, can also be used as the thermochromic material. The cholesteric liquid crystal can selectively reflect light of a wavelength corresponding to an interlayer distance, and the interlayer distance is changed depending on temperature. Therefore, the physical properties, such as reflectance and color, of the cholesteric liquid crystal can be reversibly changed upon application of heat. In this connection, a reflection band can be widened by using several types of cholesteric liquid crystal layers having different interlayer distances.

The electrochromic material is a material capable of reversibly changing various physical characteristics, such as reflectance and color, by the action of electricity. The electrochromic material can be provided, for example, as a material reversibly changing its structure upon application of voltage. More specifically, a reflective light control material changing its reflection characteristic with doping or undoping of a proton, for example, can be used as the electrochromic material. The reflective light control material is a material capable of selectively controlling its optical property to a transparent state, a mirror state, and/or an intermediate state therebetween upon application of an external stimulus. Examples of the reflective light control material usable here include an alloy material containing, as a main component, a magnesium-nickel alloy material or a magnesium-titanium alloy material, $WO_3$, and materials in which needle crystals having selective reflective power are enclosed in microcapsules.

In practice, the functional layer can be constituted, for example, by stacking, on the second optical layer, the above-described alloy layer, a catalyst layer containing, e.g., Pd, a thin buffer layer made of, e.g., Al, an electrolyte layer made of, e.g., $Ta_2O_5$, an ion storage layer made of, e.g., $WO_3$ containing protons, and the transparent electroconductive layer. Alternatively, the functional layer can be constituted, for example, by stacking, on the second optical layer, the transparent electroconductive layer, the electrolyte layer, an electrochromic layer made of, e.g., $WO_3$, and the transparent electroconductive layer. In such a structure, when a voltage is applied between the transparent electroconductive layer and an opposed electrode, protons contained in the electrolyte layer are doped into or undoped from the alloy layer. As a result, the transmittance of the alloy layer is changed. Also, in order to increase the wavelength selectivity, the electrochromic material is desirably stacked with a high refractive index material, such as $TiO_2$ or ITO. Additionally, as another usable structure, the transparent electroconductive layer, an optical transparent layer including microcapsules dispersed therein, and a transparent electrode may be stacked on the second optical layer. In that structure, when a voltage is applied between both the transparent electrodes, a transmissive state can be obtained in which needle crystals in the microcapsules are uniformly oriented, and when the voltage is eliminated, the needle crystals are oriented at random and a wavelength-selective reflective state can be obtained.

[Function of Optical Film]

Figure 5:
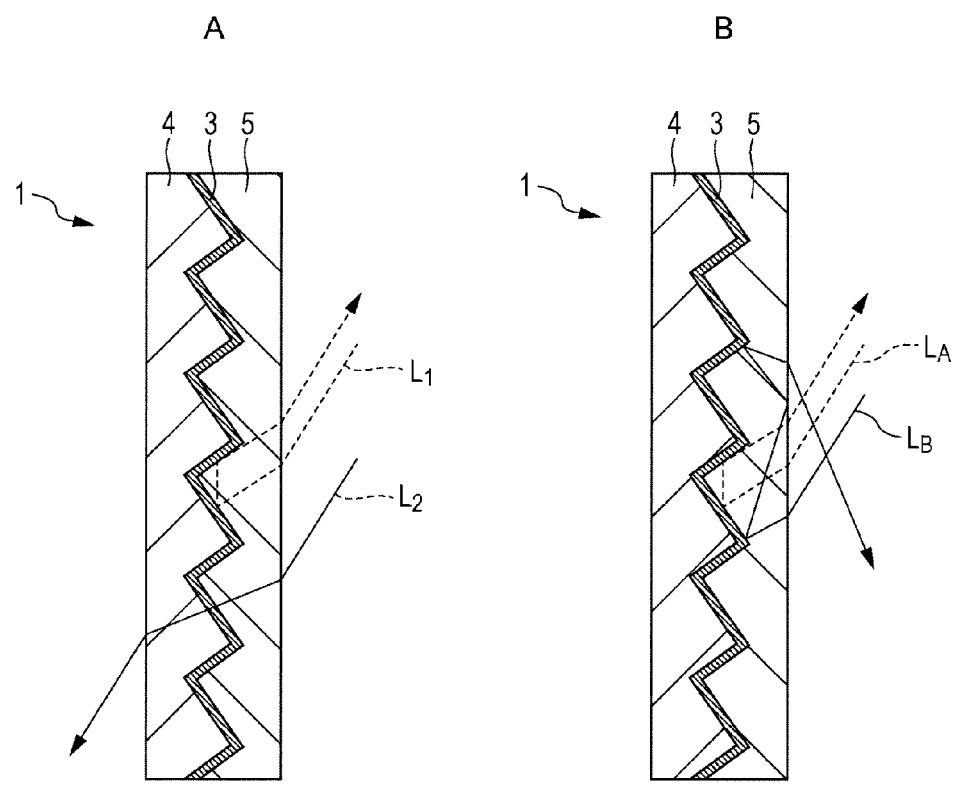
FIGS. 5A and 5B are each a sectional view to explain one example of function of the optical film according to the first embodiment.

FIGS. 5A and 5B are each a sectional view to explain one example of function of the optical film. As illustrated in FIG. 5A, of the sunlight entering the optical film 1, part of a near infrared ray $L_1$ is directionally reflected toward the sky in a substantially reversed relation to the direction of the incident light, whereas visible light $L_2$ passes through the optical film 1.

Further, as illustrated in FIG. 5B, the light entering the optical film 1 and reflected by the reflecting layer surface of the wavelength selective reflecting layer 3 is separated into a component $L_A$ reflected toward the sky and a component $L_B$ not reflected toward the sky at a proportion depending on the incident angle. Further, the component $L_B$ not reflected toward the sky is totally reflected at the interface between the second optical layer 4 and air and is then finally reflected in a direction differing from the incident direction.

Figure 6:
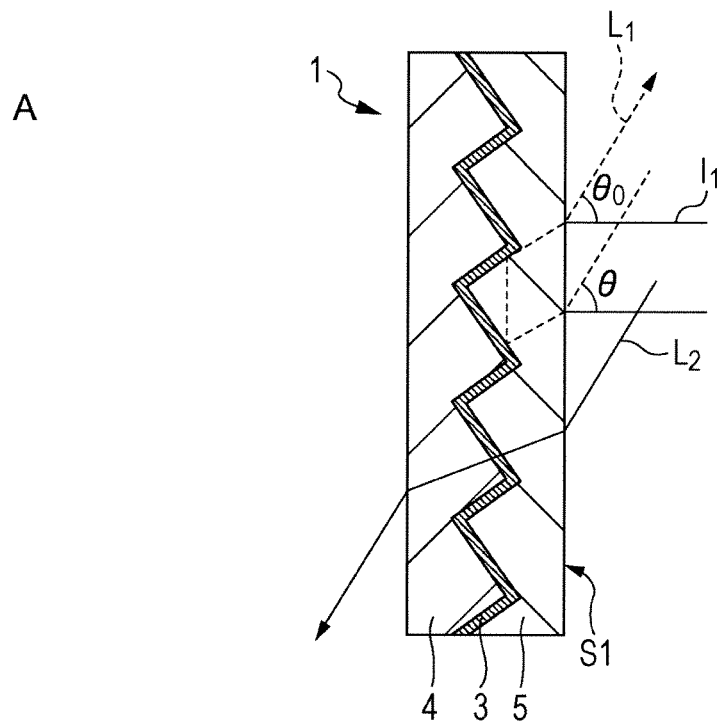
FIG. 6A is a sectional view to explain one example of function of the optical film according to the first embodiment.
FIG. 6B is a plan view to explain one example of function of the optical film according to the first embodiment.
Figure 6:
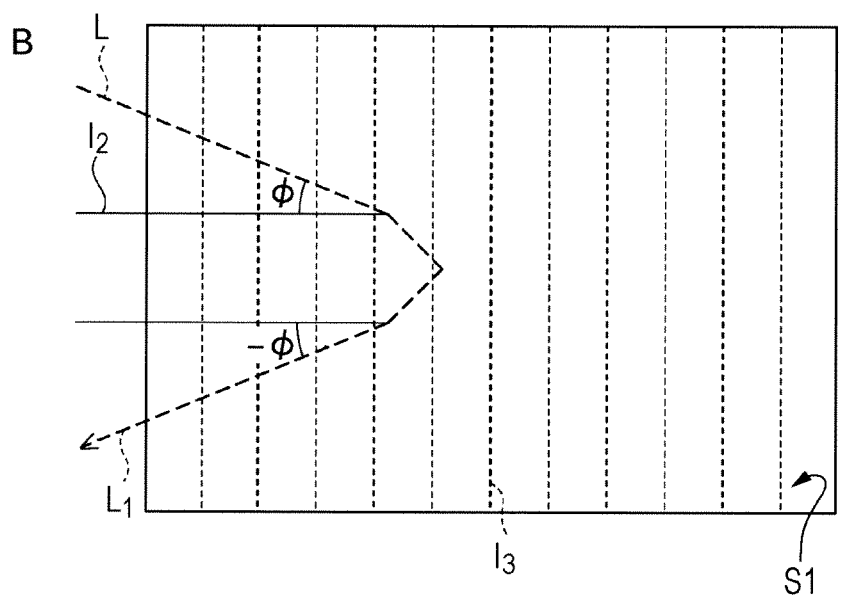

FIG. 6 illustrates the relationship among a ridgeline $l_3$ of the triangular pillar 4c, the incident light L, and the reflected light $L_1$. It is preferable that, of the light L entering the incident surface S1 at an incident angle (θ, φ), the optical film 1 selectively directionally reflects the light $L_1$ in the particular wavelength band in a direction ($θ_0$, −φ) (0°<$θ_0$<90°) while transmitting the light $L_2$ other than the particular wavelength band therethrough. The reason is that, by satisfying the above relationship, the optical film 1 can reflect the light in the particular wavelength band toward the sky. Note that θ is an angle formed by a perpendicular line $l_1$ with respect to the incident surface S1 and the incident light L or the reflected light $L_1$. Also, φ is an angle formed in the incident surface S1 by a linear line $l_2$, which is orthogonal to the ridgeline $l_3$ of the triangular pillar 4c, and a component resulting from projecting the incident light L or the reflected light $L_1$ to the incident surface S1. Further, an angle θ rotated clockwise from the perpendicular line $l_1$ as a reference is defined as "+θ", and an angle θ rotated counterclockwise from the perpendicular line $l_1$ is defined as "−θ". An angle φ rotated clockwise from the linear line $l_2$ as a reference is defined as "+φ", and an angle φ rotated counterclockwise from the linear line $l_2$ is defined as "−φ".

[Entire Shape of Optical Film]

Figure 30:
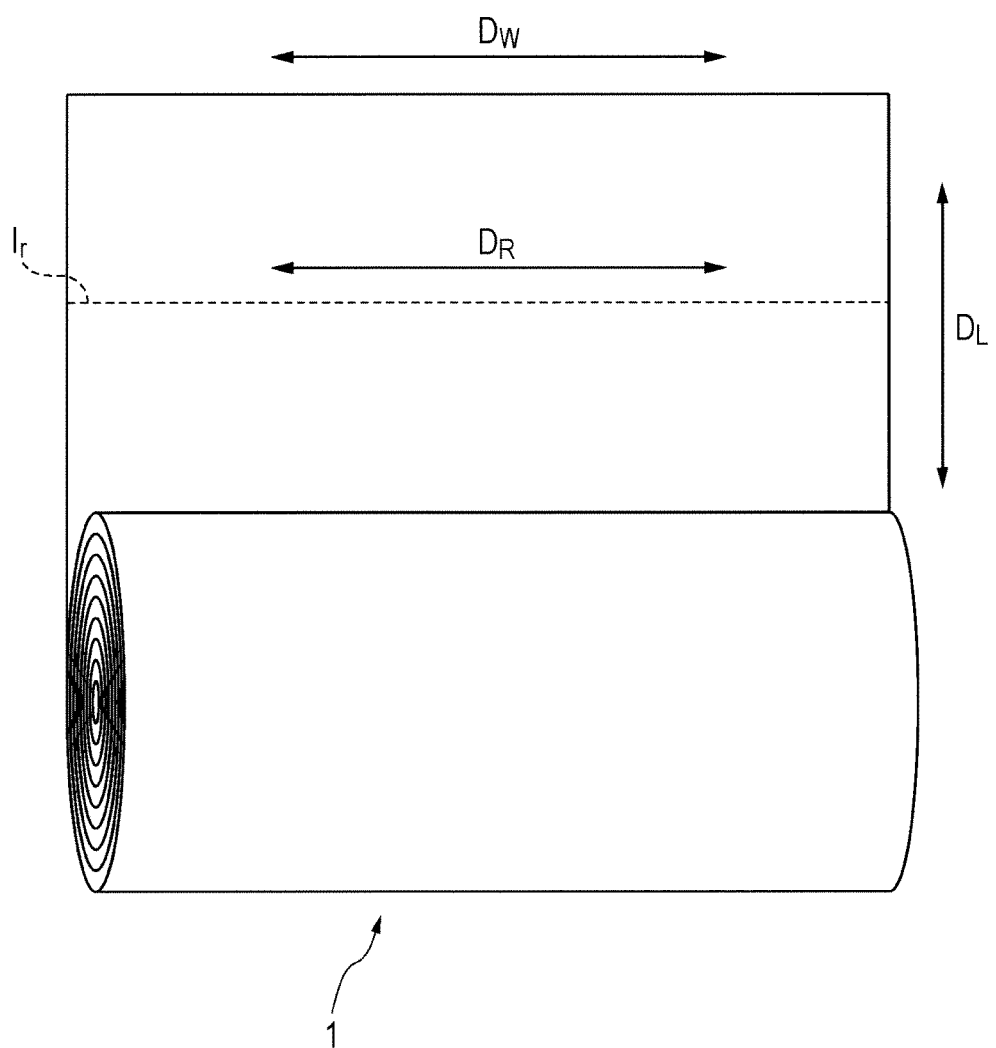
FIG. 30 is a perspective view illustrating one example of an entire shape of the optical film according to the first embodiment.

FIG. 30 is a perspective view illustrating one example of an entire shape of the optical film according to the first embodiment. As illustrated in FIG. 30, the optical film 1 preferably has a belt-like shape or a rectangular shape in its entirety. With the optical film 1 having such a shape, the optical film 1 can be easily fabricated with the roll-to-roll process. Further, by winding the optical film 1 into the form of a roll, the optical film 1 can be more easily handled. In the following description, the lengthwise direction of the optical film 1 having the belt-like shape or the rectangular shape is called a lengthwise direction $D_L$, and the widthwise (transverse) direction thereof is called a widthwise direction D. Also, the direction of a ridgeline $l_r$ of the triangular pillar 4c formed in the first optical layer 4 is called a ridgeline direction $D_R$.

The triangular pillars 4c are preferably formed in the first optical layer 4 such that the ridgeline $l_r$ of each triangular pillar 4c is parallel to the widthwise direction $D_W$ of the optical film 1. The ridgeline direction $D_R$ of the triangular pillar 4c and the lengthwise direction $D_L$ of the optical film 1 are preferably in an orthogonal relation. On such a condition, the reflection function of the optical film 1 can be effectively developed just by affixing the optical film 1 having the belt-like shape or the rectangular shape to, e.g., the window member of the building in such a relationship that the height direction of the building and the lengthwise direction $D_L$ of the optical film 1 having the belt-like shape or the rectangular shape are substantially parallel to each other.

[Method of Affixing Optical Film]

Figure 31:
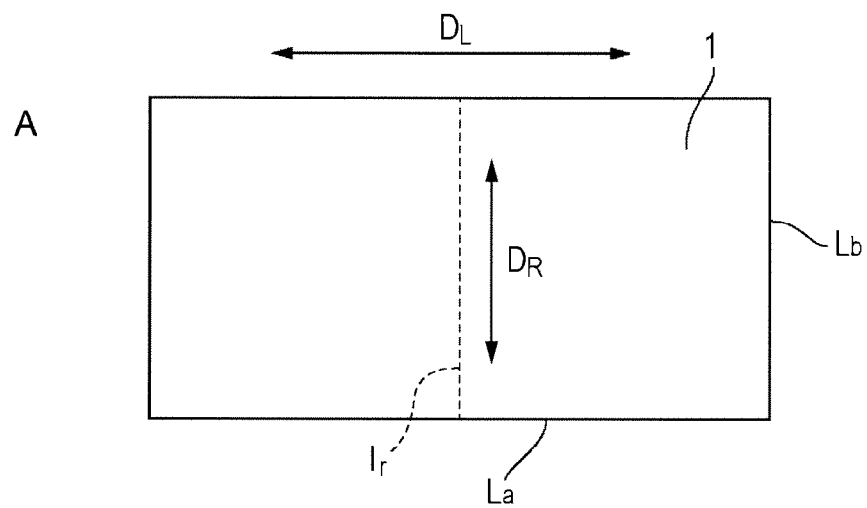
FIGS. 31A and 31B are illustrations to explain one example of manner of affixing the optical film according to the first embodiment of the present invention.
Figure 31:
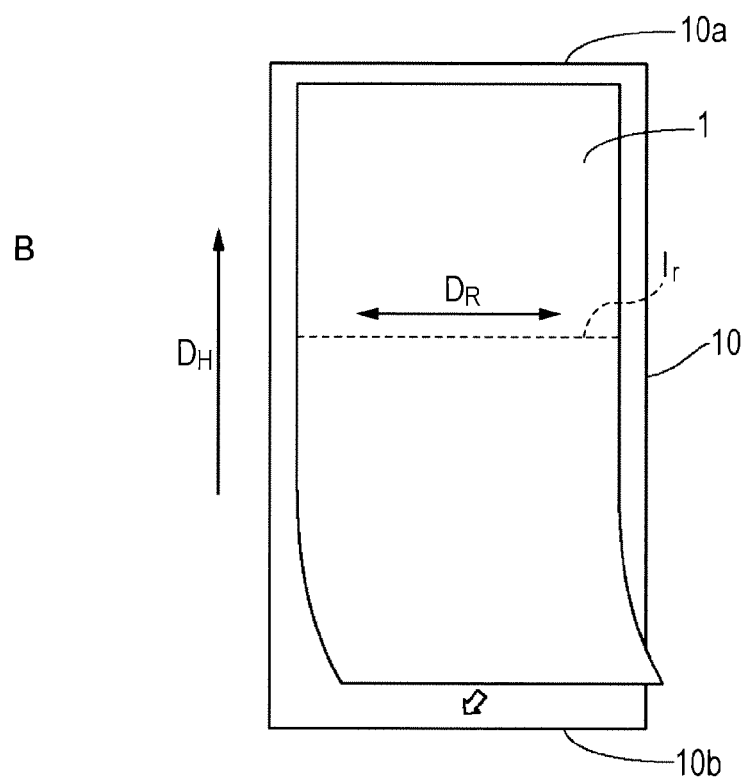

FIGS. 31A and 31B are illustrations to explain one example of a method of affixing the optical film according to the first embodiment of the present invention. The window member 10 provided in recent high-rise structures, such as buildings, generally has a rectangular shape having a vertical size larger than a horizontal size. Therefore, the following description is made in connection with an example in which the optical film 1 is affixed to the window member 10 having such a general shape.

First, the belt-shaped optical film 1 is let out from a roll of the wound optical film (i.e., from the so-called stock roll) 1 and is cut as appropriate corresponding to the shape of the window member 10 to which the optical film 1 is to be affixed, thereby obtaining the optical film 1 having a rectangular shape. As illustrated in FIG. 31A, the rectangular optical film 1 has a pair of opposing long sides $L_a$ and a pair of opposing short sides $L_b$. The long sides $L_a$ of the rectangular optical film 1 are substantially orthogonal to the ridgeline direction $D_R$ of the triangular pillar 4c in the incident surface of the optical film 1. In other words, the lengthwise direction $D_L$ of the rectangular optical film 1 is substantially orthogonal to the ridgeline direction $D_R$ of the triangular pillar 4c in the incident surface of the optical film 1.

Next, one short side $L_b$ of the cut optical film 1 is aligned with a short side 10a positioned at an upper end of the rectangular window member 10. Next, the rectangular optical film 1 is gradually affixed to the window member 10 in a direction from the upper end toward the lower end thereof with, e.g., the affixing layer 6 interposed therebetween. The other short side $L_b$ of the optical film 1 is thereby aligned with a short side 10b positioned at the other end of the rectangular window member 10. Next, when necessary, the surface of the optical film 1 affixed to the window member 10 is pressed, for example, to purge out bubbles trapped between the window member 10 and the optical film 1. As a result, the rectangular optical film 1 is affixed to the window member 10 in such a state that the ridgeline direction $D_R$ of the triangular pillar 4c in the incident surface of the optical film 1 is substantially parallel to the height direction $D_H$ of a building, e.g., a high-rise building.

[Affixing Direction of Optical Film]

Figure 32:
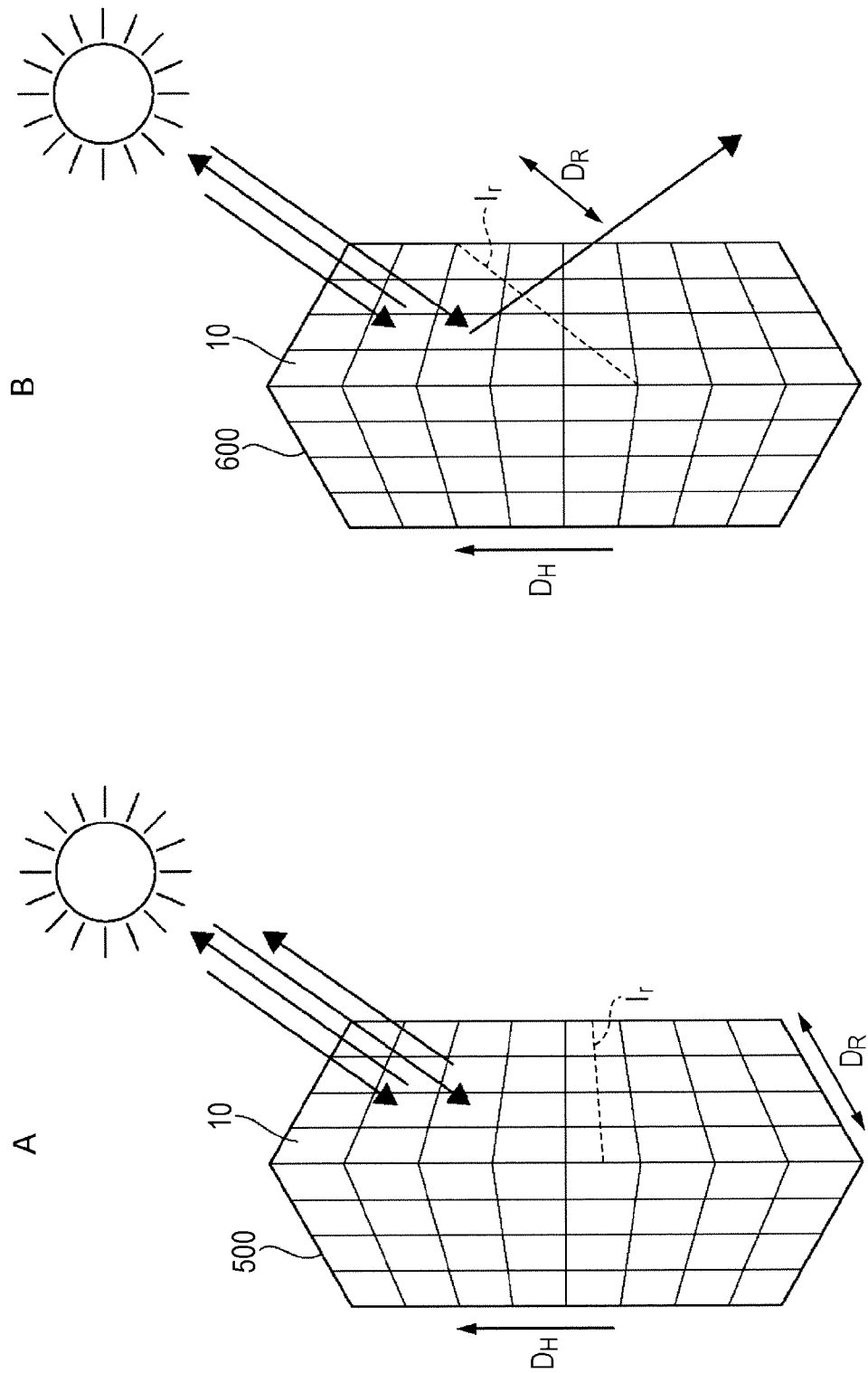
FIGS. 32A and 32B are illustrations to explain the difference in reflection function of the optical film depending on the affixing direction thereof.

FIGS. 32A and 32B are illustrations to explain the difference in reflection function of the optical film 1 depending on the affixing direction of the optical film.

FIG. 32A illustrates an example of a building 500 in which the optical film 1 is affixed to the window member 10 such that the ridgeline direction $D_R$ of the triangular pillar 4c in the incident surface of the optical film 1 is substantially orthogonal to the height direction $D_H$ of the building. In other words, FIG. 32A illustrates the case where the optical film 1 is affixed to the window member 10 in accordance with the above-described method of affixing the optical film. When the optical film 1 is affixed to the window member 10 as described above, the reflection function of the optical film 1 can be effectively developed. Accordingly, the light entering the window member 10 from the upward can be reflected in a larger amount to the upward. Thus, the upward reflection of the window member 10 can be increased.

FIG. 32B illustrates an example of a building 600 in which the optical film 1 is affixed to the window member 10 such that the ridgeline direction $D_R$ of the triangular pillar 4c in the incident surface of the optical film 1 is obliquely oriented with respect to the height direction $D_H$ of the building instead of being orthogonal thereto. When the optical film 1 is affixed to the window member 10 as described above, the reflection function of the optical film 1 cannot be effectively developed. Accordingly, a proportion at which the light entering the window member 10 from the upward is reflected to the downward is increased. Thus, the upward reflection of the window member 10 is reduced.

[Apparatus for Manufacturing Optical Film]

Figure 7:
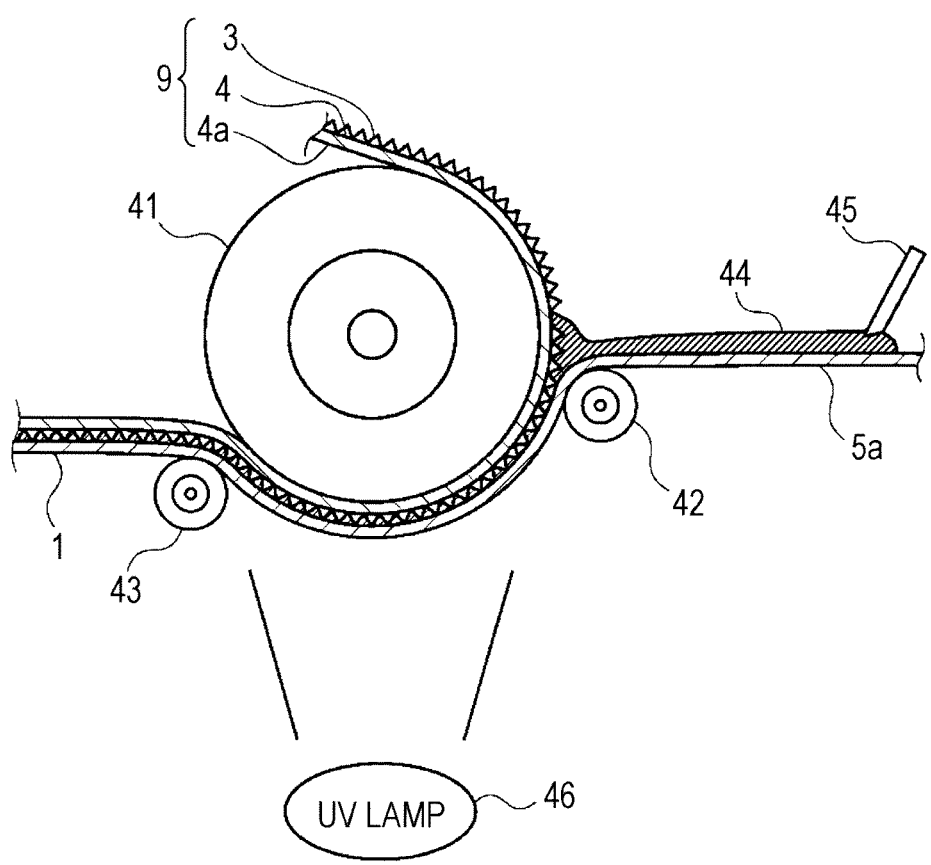
FIG. 7 is a schematic view illustrating one example of construction of a manufacturing apparatus for manufacturing the optical film according to the first embodiment.
Figure 8:
FIGS. 8A to 8C illustrate steps to explain one example of a method of manufacturing the optical film according to the first embodiment.
Figure 8:
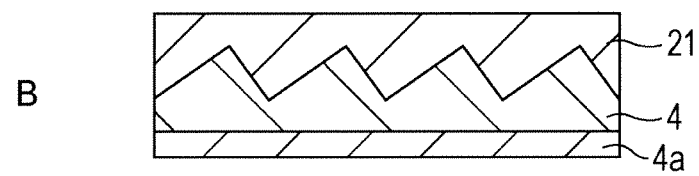
Figure 8:
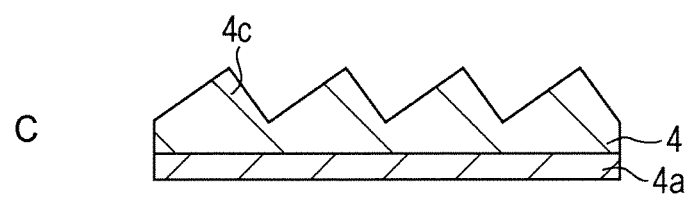
Figure 9:
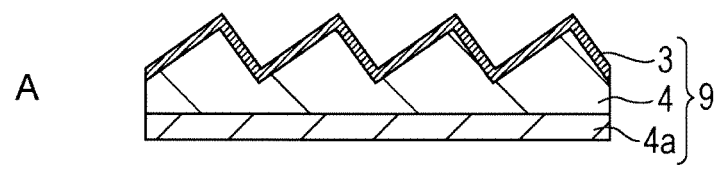
FIGS. 9A to 9C illustrate steps to explain one example of the method of manufacturing the optical film according to the first embodiment.
Figure 9:
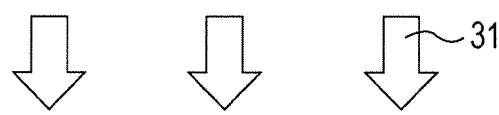
Figure 9:
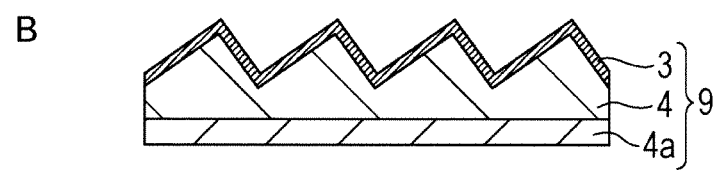
Figure 9:
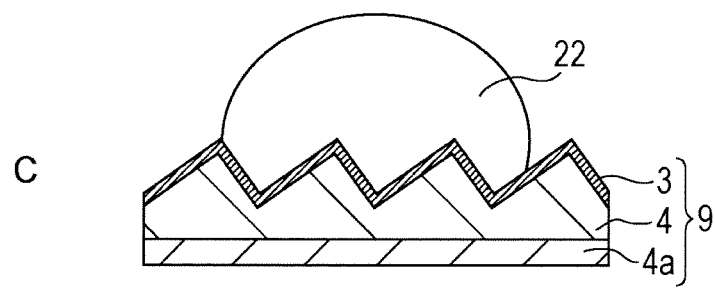
Figure 10:
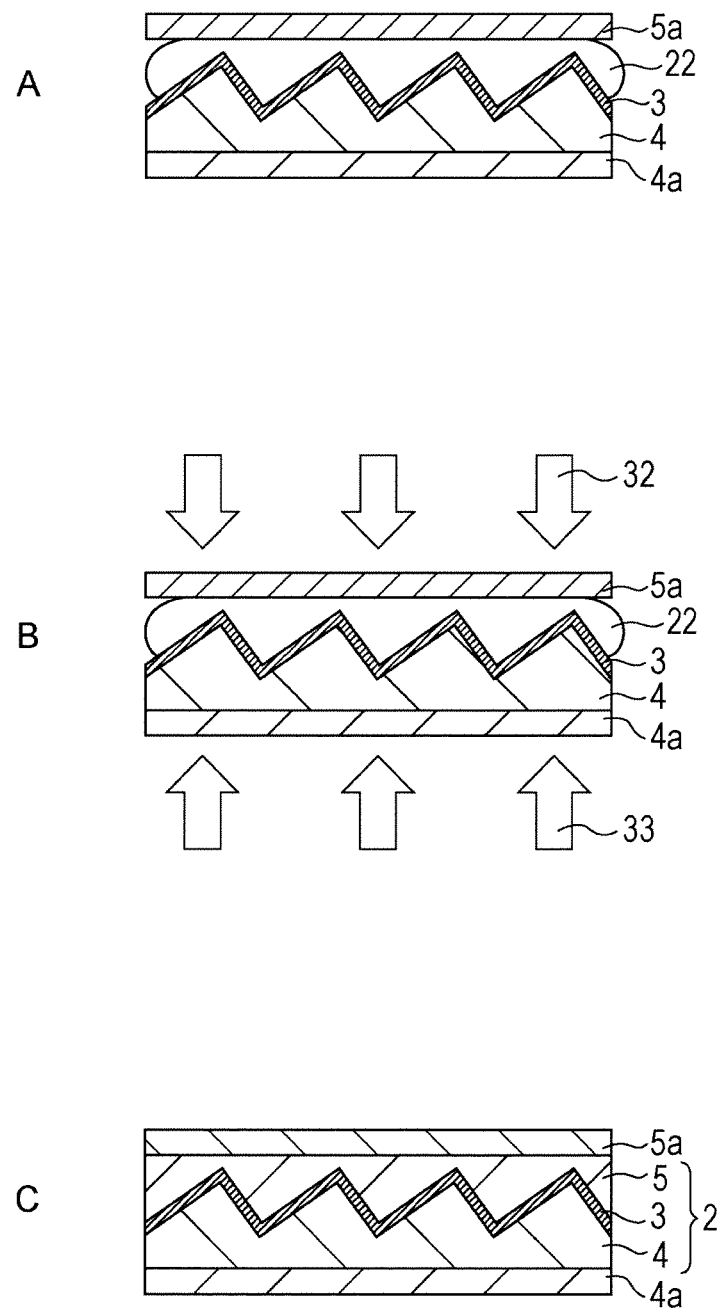
FIGS. 10A to 10C illustrate steps to explain one example of the method of manufacturing the optical film according to the first embodiment.

FIG. 7 is a schematic view illustrating one example of construction of an apparatus for manufacturing the optical film according to the first embodiment. As illustrated in FIG. 7, the manufacturing apparatus includes laminating rolls 41 and 42, a guide roll 43, a coating device 45, and an irradiation device 46.

The laminating rolls 41 and 42 are arranged to be able to nip a reflecting-layer affixed optical layer 9 and the second base 5*a* therebetween. Herein, the reflecting-layer affixed optical layer 9 is a layer obtained by forming the wavelength selective reflecting layer 3 on one principal surface of the first optical layer 4. Note that the reflecting-layer affixed optical layer 9 may further include the first base 4*a* disposed on the other principal surface of the first optical layer 4 on the opposite side to the one principal surface thereof on which the wavelength selective reflecting layer 3 is formed. In the illustrated example, the wavelength selective reflecting layer 3 is formed on the one principal surface of the first optical layer 4, and the first base 4*a* is formed on the other principal surface of the first optical layer 4. The guide roll 43 is arranged in a conveying path inside the manufacturing apparatus to be able to convey the optical film 1 having a belt-like shape. Materials of the laminating rolls 41 and 42 and the guide roll 43 are not limited to particular ones. A metal such as stainless steel, rubber, silicone, etc. can be optionally used, as appropriate, depending on the desired roll characteristics.

The coating device 45 can be prepared as a device including a coating means, e.g., a coater. As the coater, ordinary coaters including a gravure coater, a wire bar, and a die can be optionally used, as appropriate, in consideration of physical properties of the resin composition to be coated, etc. The irradiation device 46 is an irradiation device for emitting an ionizing ray, e.g., an electron ray, an ultraviolet ray, a visible ray, or a gamma ray. In the illustrated example, a UV lamp emitting an ultraviolet ray is used as the irradiation device 46.

[Method of Manufacturing Optical Film]

One example of a method of manufacturing the optical film according to the first embodiment will be described below with reference to FIGS. 7 to 10. Note that, in consideration of productivity, part or the whole of a manufacturing process described below is preferably performed in the roll-to-roll manner except for a step of fabricating a die/mold.

First, as illustrated in FIG. 8A, a die/mold having the same concave-convex shape as that of the triangular pillars 4*c*, or a die/mold (replica) having a shape reversed to the concave-convex shape of the former die/mold is formed by, e.g., bite machining or laser machining. Next, as illustrated in FIG. 8B, the concave-convex shape of the die/mold is transferred to a resin material in the form of a film by utilizing, e.g., a fusion extrusion process or a transfer process. The transfer process can be practiced, for example, by a method of pouring an energy-ray curable resin into the mold and irradiating the poured resin with an energy ray to cure the resin, a method of applying heat and pressure to a resin, thereby transferring the shape to the resin, or a method (laminating transfer process) of supplying a resin film from a roll and transferring the shape of the die to the resin film under application of heat. Through the above-described steps, as illustrated in FIG. 8C, the first optical layer 4 having the triangular pillars 4*c* on one principal surface thereof is formed.

Further, as illustrated in FIG. 8C, the first optical layer 4 may be formed on the first base 4*a*. That case can be practiced, for example, by a process of supplying the first base 4*a* in the form of film from a roll, coating an energy-ray curable resin on the first base, pressing the resin against the die to transfer the shape of the die to the resin, and irradiating the resin with an energy ray to cure it. Preferably, the resin further contains a cross-linking agent. The reason is that the cross-linking agent makes the resin heat-resistant without changing the storage modulus at the room temperature to a large extent.

Next, as illustrated in FIG. 9A, the wavelength selective reflecting layer 3 is formed on the one principal surface of the first optical layer 4. The wavelength selective reflecting layer 3 can be formed, for example, by sputtering, evaporation, CVD (Chemical Vapor Deposition), dip coating, die coating, wet coating, or spray coating. Preferably, a practical method is optionally selected from those film forming methods depending on the shape of the triangular pillar 4*c*, etc. Next, as illustrated in FIG. 9B, the wavelength selective reflecting layer 3 is subjected to annealing as indicated by 31, when necessary. The temperature of the annealing is in the range of, e.g., 100° C. or higher to 250° C. or lower.

Next, as illustrated in FIG. 9C, a resin 22 in a not-yet-cured state is coated over the wavelength selective reflecting layer 3. For example, an energy-ray curable resin or a thermosetting resin may be used as the resin 22. The energy-ray curable resin used here is preferably an ultraviolet-ray curable resin. Next, as illustrated in FIG. 10A, a laminate is formed by placing the second base 5*a* over the resin 22. Next, as illustrated in FIG. 10B, the resin 22 is cured by applying, e.g., an energy ray 32 or heat 32, while pressure 33 is applied to the laminate. Examples of the energy ray 32 usable here include an electron ray, an ultraviolet ray, a visible ray, a gamma ray, and an electron ray. The ultraviolet ray is preferable from the viewpoint of production equipment. Preferably, an integrated irradiation amount is selected, as appropriate, in consideration of the curing characteristic of the resin, suppression of yellowing of the resin and base, etc. The pressure applied to the laminate is preferably in the range of 0.01 MPa or higher to 1 MPa or lower. If the applied pressure is lower than 0.01 MPa, a problem may occur in traveling of the film. On the other hand, if the applied pressure exceeds 1 MPa, a metal roll is to be used as the nip roll, and the applied pressure is more apt to fluctuate, thus leading to an unsatisfactory result. Through the above-described steps, as illustrated in FIG. 10C, the second optical layer 5 is formed on the wavelength selective reflecting layer 3 and the optical film 1 is obtained.

A method of forming the optical film 1 by using the manufacturing apparatus, illustrated in FIG. 7, is now described in more detail. First, the second base 5*a* is let out from a base supply roll (not shown), and the let-out second base 5*a* passes under the coating device 45. Next, an ionizing-ray curable resin 44 is coated by the coating device 45 onto the second base 5*a* passing under the coating device 45. Next, the second base 5*a* coated with the ionizing-ray curable resin 44 is conveyed toward the laminating rolls. On the other hand, the reflecting-layer affixed optical layer 9 is let out from an optical layer supply roll (not shown) and is conveyed toward the laminating rolls 41 and 42.

Next, the second base 5*a* and the reflecting-layer affixed optical layer 9, each having been conveyed as described above, are sandwiched between the laminating rolls 41 and 42 while avoiding bubbles from being trapped between the second base 5*a* and the reflecting-layer affixed optical layer 9, whereby the reflecting-layer affixed optical layer 9 is laminated on the second base 5*a*. Next, the second base 5*a* including the laminated reflecting-layer affixed optical layer 9 is conveyed along an outer circumferential surface of the laminating roll 41 while the irradiation device 46 irradiates the ionizing-ray curable resin 44 with the ionizing ray from the side including the second base 5*a*, thereby curing the ionizing-ray curable resin 44. As a result, the second base 5*a* and the reflecting-layer affixed optical layer 9 are affixed to each other with the ionizing-ray curable resin 44 interposed therebetween, and the objective optical film 1 having a long size is fabricated. Next, the fabricated belt-shaped optical film 1 is taken up by a take-up roll (not shown). Eventually, a stock roll in the rolled form of the belt-shaped optical film 1 is obtained.

Given that the process temperature in the above-described process of forming the second optical layer is t° C., the cured first optical layer 4 preferably has the storage modulus of $3 \times 10^7$ Pa or more at $(t-20)°$ C. Herein, the process temperature t is, for example, the heating temperature of the laminating roll 41. The first optical layer 4 is conveyed, for example, in such a state that the first optical layer 4 is formed on the first base 4a and is conveyed along the laminating roll 41 with the first base 4a interposed therebetween. It is, therefore, empirically confirmed that the actual temperature of the first optical layer 4 is about $(t-20)°$ C. Accordingly, by setting the storage modulus of the first optical layer 4 to be $3 \times 10^7$ Pa or more at $(t-20)°$ C., the concave-convex shape of the interface inside the optical layer can be prevented from deforming due to application of heat or both of heat and pressure.

Further, the first optical layer 4 preferably has the storage modulus of $3 \times 10^9$ Pa or less at 25° C. With such a property, the optical film 1 can be given with flexibility at the room temperature. Hence, the optical film 1 can be fabricated, for example, by using the roll-to-roll manufacturing process.

Moreover, in consideration of the heat resistance of the resin used as the optical layer or the base, the process temperature t is preferably 200° C. or lower. However, when a resin having higher heat resistance is used, the process temperature t can be set to 200° C. or higher.

According to the first embodiment, in the optical film 1 capable of reflecting the light in the particular wavelength band while transmitting the light other than the particular wavelength band therethrough, the number of times of reflections by the wavelength selective reflecting layer 3 can be reduced to one or two. As a result, heat generation due to absorption of light by the wavelength selective reflecting layer 3 can be reduced, and an improvement in safety and energy-saving (e.g., reduction in the amount of $CO_2$ emission) can be realized.

Further, since the plural asymmetrical triangular pillars 4c are arrayed in the one-dimensional pattern and the apex angle α and the slope angle β of the triangular pillars 4c are set to satisfy any one of the above-mentioned formula (1) to (4), a high upward reflectance can be obtained. In addition, the film thickness can be reduced in comparison with the case where corner cubes are used instead of the triangular pillars 4c. As a result, the optical film 1 can be fabricated at a lower cost.

Given below are examples of temperature on the indoor side of glass when the following glasses are actually fitted to a window; (1) a bare glass (i.e., a glass in a state without any film affixed thereto), (2) a glass having a heat-ray reflective flat plate structure, (3) a glass having a corner-cube retroreflection structure (heat-ray retroreflective structure), and (4) a glass to which the optical film according to the first embodiment is affixed.

Bare glass: 32° C.
Glass of heat-ray reflective flat plate structure: 34° C.
Glass of heat-ray retroreflective structure: 35° C.
Glass to which the optical film according to the first embodiment is affixed: 34.5° C.
(Note that the temperature is a mean temperature after reaching thermal equilibrium.)

As seen from the above examples, the glass having the corner-cube retroreflection structure tends to have temperature higher than that of the bare glass and the glass having the heat-ray reflective flat plate structure. In contrast, the glass to which the optical film according to the first embodiment is affixed tends to have temperature lower than that of the glass having the corner-cube retroreflection structure.

<Modifications>

Modifications of the above-described embodiment will be described below.

[First Modification]

Figure 11:
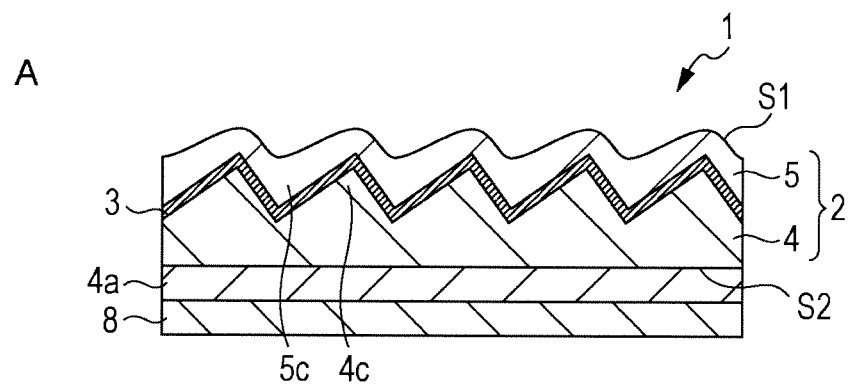
FIG. 11A is a sectional view illustrating a first modification of the first embodiment.
FIG. 11B is a sectional view illustrating a second modification of the first embodiment.
Figure 11:
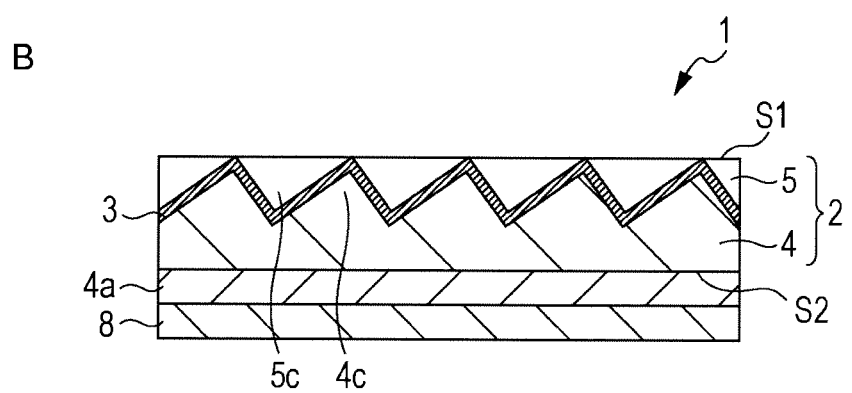

FIG. 11A is a sectional view illustrating a first modification of the first embodiment. As illustrated in FIG. 11A, an optical film 1 according to the first modification has an incident surface S1 in a concave-convex shape. The concave-convex shape of the incident surface S1 is formed to follow the concave-convex shape of the first optical layer 4, for example, such that positions of top portions of convexes and positions of bottom portions of concaves are aligned between both the concave-convex shapes. The concave-convex shape of the incident surface S1 is preferably gentler than that of the first optical layer 4.

[Second Modification]

FIG. 11B is a sectional view illustrating a second modification of the first embodiment. As illustrated in FIG. 11B, an optical film 1 according to the second modification is formed such that top portions of convexes in the concave-convex surface of the first optical layer 4, on which the wavelength selective reflecting layer 3 is formed, are substantially flush with the incident surface S1 of the first optical layer 4.

<2. Second Embodiment>

A second embodiment differs from the first embodiment in that the former directionally reflects light in a particular wavelength band while scattering light other than the particular wavelength band. An optical film 1 includes a light scatterer for scattering the incident light. The light scatterer is disposed, for example, in at least one of positions on the surface of the optical layer 2, inside the optical layer 2, and between the wavelength selective reflecting layer 3 and the optical layer 2. Preferably, the light scatterer is disposed in at least one of positions between the wavelength selective reflecting layer 3 and the first optical layer 4, inside the first optical layer 4, and on the surface of the first optical layer 4. When the optical film 1 is affixed to a support such as a window member, it can be affixed to either the indoor side or the outdoor side of the support. When the optical film 1 is affixed to the outdoor side, the light scatterer for scattering the light other than the particular wavelength band is preferably disposed only between the wavelength selective reflecting layer 3 and the support such as the window member. The reason is that if the light scatterer is present between the wavelength selective reflecting layer 3 and the incident surface, the directional reflection characteristic is lost. Also, when the optical film 1 is affixed to the indoor side, the light scatterer is preferably disposed between the emergent surface of the optical film 1 on the side opposite to the affixed surface thereof and the wavelength selective reflecting layer 3.

Figure 12:
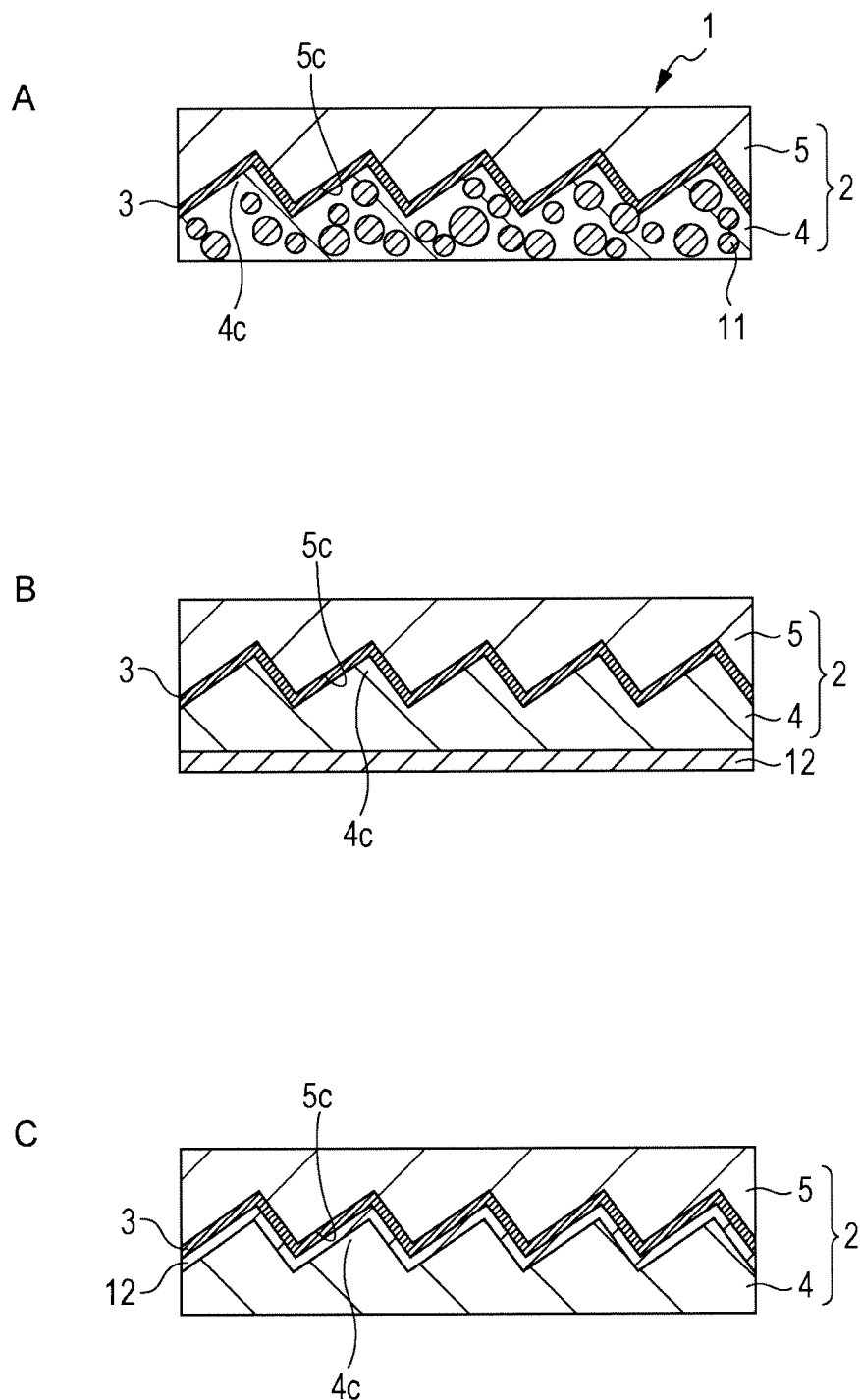
FIG. 12A is a perspective view illustrating a first example of construction of an optical film according to a second embodiment.
FIG. 12B is a perspective view illustrating a second example of construction of the optical film according to the second embodiment.
FIG. 12C is a perspective view illustrating a third example of construction of the optical film according to the second embodiment.

FIG. 12A is a sectional view illustrating a first example of construction of the optical film 1 according to the second embodiment. As illustrated in FIG. 12A, the first optical layer 4 includes a resin and fine particles 11. The fine particles 11 have a refractive index differing from that of the resin, which is a main component material of the first optical layer 4. For example, at least one kind of organic fine particles and inorganic fine particles can be used as the fine particles 11. Also, hollow fine particles may be used as the fine particles 11. Examples of the fine particles 11 include inorganic fine particles made of, e.g., silica or alumina, and organic fine particles made of, e.g., styrene, acryl, or a copolymer of the formers. Among those examples, silica fine particles are particularly preferable.

FIG. 12B is a sectional view illustrating a second example of construction of the optical film 1 according to the second embodiment. As illustrated in FIG. 12B, the optical film 1 further includes a light diffusion layer 12 on the surface of the first optical layer 4. The light diffusion layer 12 includes, for example, a resin and fine particles. The fine particles can be ones similar to those used in the above-described first example.

FIG. 12C is a sectional view illustrating a third example of construction of the optical film 1 according to the second embodiment. As illustrated in FIG. 12C, the optical film 1 further includes a light diffusion layer 12 between the wavelength selective reflecting layer 3 and the first optical layer 4. The light diffusion layer 12 includes, for example, a resin and fine particles. The fine particles can be ones similar to those used in the above-described first example.

According to the second embodiment, it is possible to directionally reflect the light in the particular wavelength band, e.g., an infrared ray, and to scatter the light other than the specific wavelength band, e.g., visible light.

Hence, a visually attractive design can be given to the optical film 1 by making the optical film 1 clouded.

<3. Third Embodiment>

Figure 13:
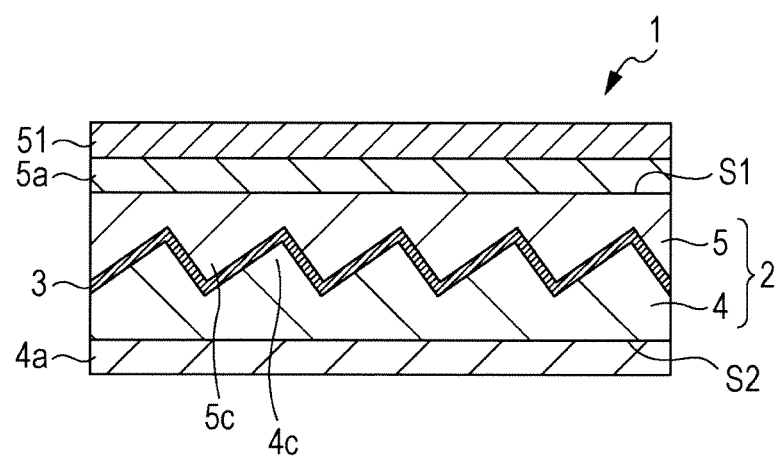
FIG. 13 is a sectional view illustrating one example of construction of an optical film according to a third embodiment.

FIG. 13 is a sectional view illustrating one example of construction of an optical film according to a third embodiment. The third embodiment differs from the first embodiment in that the former further includes a self-cleaning effect layer 51, which develops a cleaning effect in itself, on an exposed surface of the optical film 1 on the opposite side to one of the incident surface S1 and the emergent surface S2 of the optical film 1, which one is affixed to the adherend. The self-cleaning effect layer 51 includes, e.g., a photocatalyst. For example, $TiO_2$ can be used as the photocatalyst.

As described above, the optical film 1 is featured in being semi-transmissive to the incident light. When the optical film 1 is used outdoors or in a dirty room, for example, light is scattered due to dirt and dust adhering to the surface of the optical film 1, whereby transmissivity and reflectivity are lost. Therefore, the surface of the optical film 1 is preferably optically transparent at all times. Thus, it is preferable that the surface of the optical film 1 is superior in the water-repellent or hydrophilic property, for example, and the surface can automatically develop the self-cleaning effect.

According to the third embodiment, since the optical film 1 includes the self-cleaning effect layer 51, the water-repellent or hydrophilic property, for example, can be given to the incident surface. Hence, it is possible to avoid dirt and dust from adhering to the incident surface and to suppress degradation of the directional reflection characteristic.

<4. Fourth Embodiment>

While the first embodiment has been described above, by way of example, in connection with case of applying the present invention to, e.g., the window member, the present invention is not limited to the above-described example and can be further applied to various interior and exterior members, etc. other than the window member. Further, the present invention is applicable to not only fixedly installed interior and exterior members, such as walls and roofs, but also to a device capable of adjusting an amount of the transmitted and/or reflected sunlight by moving an interior or external member depending on changes in amount of the sunlight, which are caused with the shift of seasons and the elapse of time, etc., and of taking the adjusted amount of the sunlight into an indoor space, etc. In a fourth embodiment, one example of such a device is described in connection with a solar shading device (window blind) that can adjust a degree at which a group made up of plural solar shading members cuts off the incident light, by changing an angle of the solar shading member group.

Figure 14:
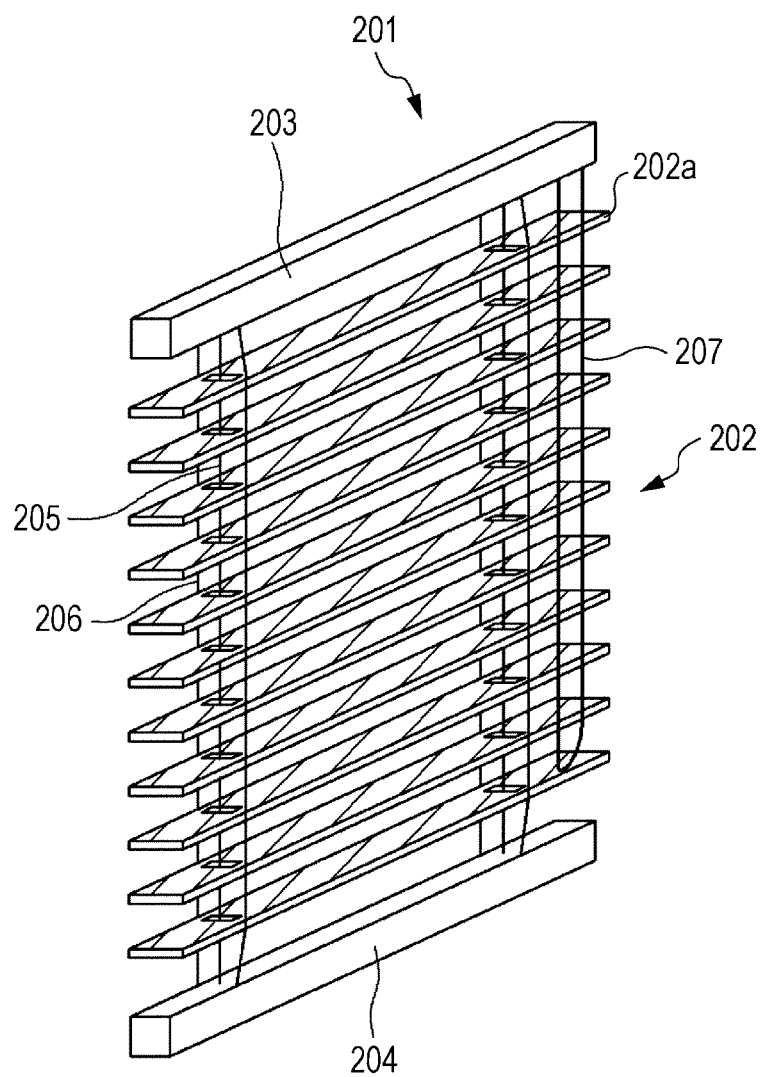
FIG. 14 is a perspective view illustrating one example of construction of a window blind according to a fourth embodiment.

FIG. 14 is a perspective view illustrating one example of construction of a window blind according to the fourth embodiment. As illustrated in FIG. 14, the window blind serving as the solar shading device includes a head box 203, a slat group (solar shading member group) 202 made up of plural slats (blades) 202a, and a bottom rail 204. The head box 203 is disposed above the slat group 202 made up of the plural slats 202a. Ladder chords 206 and rise-and-fall chords 205 are extended downward from the head box 203, and the bottom rail 204 is suspended at lower ends of those chords. The slats 202a as the solar shading members are each in a slender rectangular shape, for example, and are supported by the ladder chords 206, extending downward from the head box 203, at predetermined intervals in a suspended state. Further, the head box 203 is provided with an operating means (not shown), such as a rod, for adjusting an angle of the slat group 202 made up of the plural slats 202a.

The head box 203 provides a driving means for rotating the slat group 202 made up of the plural slats 202a in accordance with operation of the operating means, such as the rod, thereby adjusting the amount of light taken into an indoor space, for example. Further, the head box 203 has the function of a driving means (raising and lowering means) for raising and lowering the slat group 202, as appropriate, in accordance with operation of an operating means, e.g., a rise-and-fall operating chord 207.

Figure 15:
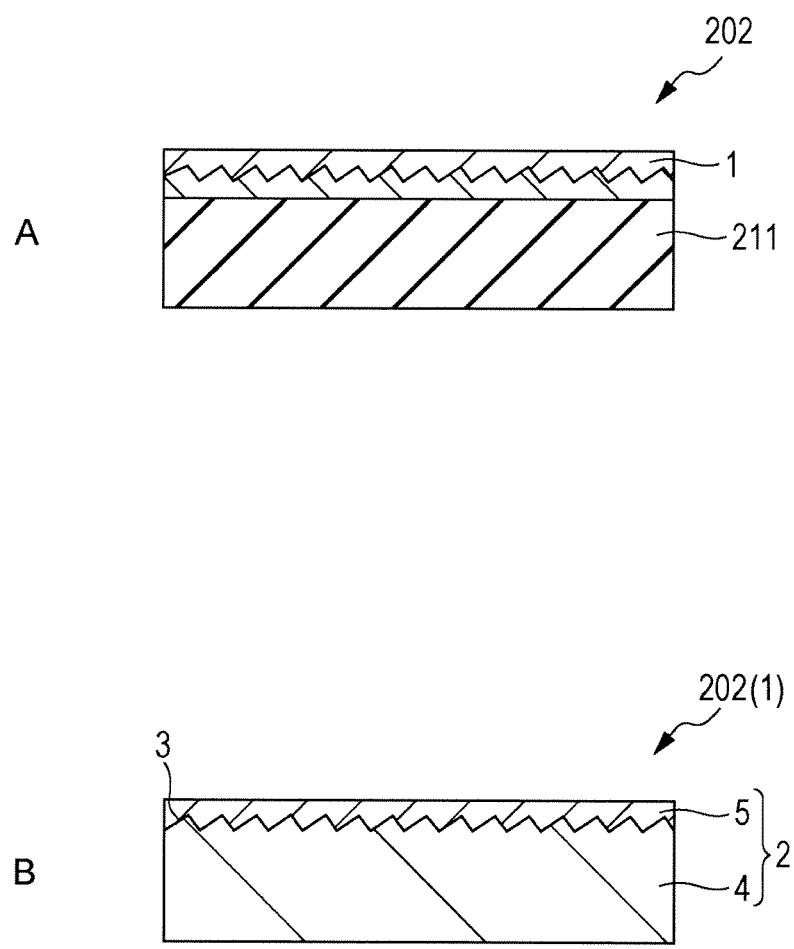
FIG. 15A is a sectional view illustrating a first example of construction of a slat.
FIG. 15B is a sectional view illustrating a second example of construction of the slat.

FIG. 15A is a sectional view illustrating a first example of construction of the slat. As illustrated in FIG. 15A, the slat 202 includes a base 211 and an optical film 1. The optical film 1 is preferably disposed on one of two principal surfaces of the base 211, the one principal surface being positioned on the side including an incident surface on which extraneous light is incident when the slat group 202 is in a closed state (e.g., on the side facing a window member). The optical film 1 and the base 211 are affixed to each other with an affixing layer, e.g., a bonding layer or an adhesive layer.

The base 211 can take the shape of, e.g., a sheet, a film, or a plate. The base 211 can be made of, e.g., glass, resin material, paper, or cloth. In consideration of the case of taking visible light into a predetermined indoor space, for example, a resin material having transparency is preferably used. The glass, the resin material, the paper, or the cloth used here may be the same as that generally known in ordinary rolling screens. The optical film 1 used here may be one type or a combination of two or more types of the optical films 1 according to the above-described first to third embodiments.

FIG. 15B is a sectional view illustrating a second example of construction of the slat. In the second example, as illustrated in FIG. 15B, the optical film 1 is used as the slat 202a. Preferably, the optical film 1 has such a level of rigidity that the optical film 1 can be supported by the ladder chords 206 and can maintain its shape in a supported state.

<5. Fifth Embodiment>

A fifth embodiment will be described in connection with a rolling screen device, i.e., another example of the solar shading device capable of adjusting a degree at which a solar shading member cuts off the incident light, by winding or unwinding the solar shading member.

Figure 16:
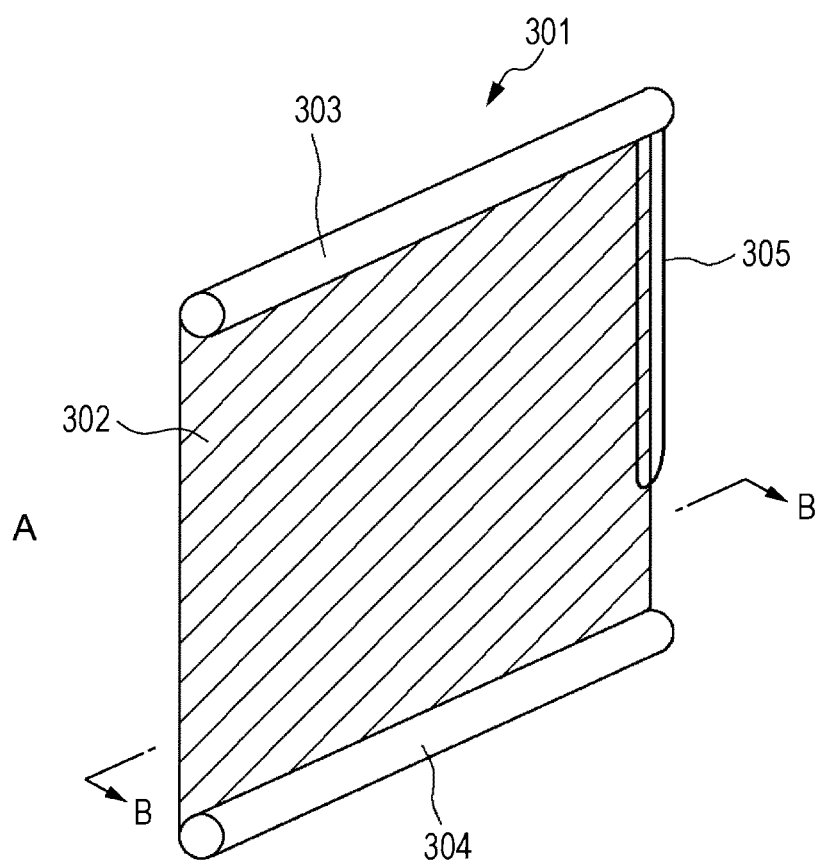
FIG. 16A is a perspective view illustrating one example of construction of a rolling screen device according to a seventh embodiment.
FIG. 16B is a sectional view illustrating one example of construction of a screen.
Figure 16:
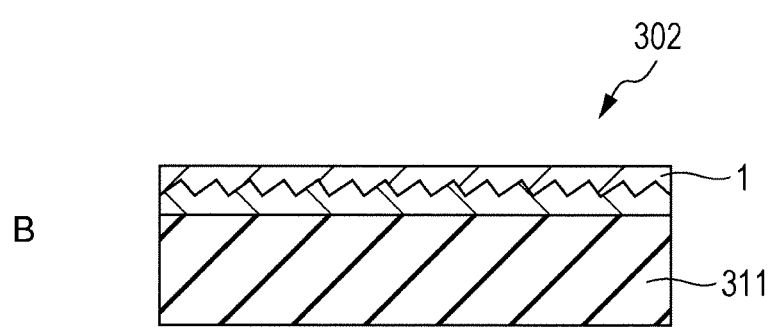

FIG. 16A is a perspective view illustrating one example of construction of a rolling screen device according to the fifth embodiment. As illustrated in FIG. 16A, a rolling screen device 301 serving as the solar shading device includes a screen 302, a head box 303, and a core member 304. The head box 303 is constructed to be able to raise and fall the screen 302 with operation of an operating member, such as a chain 305. The head box 303 includes therein a winding shaft for taking up and letting out the screen 302, and one end of the screen 302 is coupled to the winding shaft. Further, the core member 304 is coupled to the other end of the screen 302. Preferably, the screen 302 has flexibility. The shape of the screen 302 is not limited to particular one and is preferably selected depending on the shape of, e.g., a window member to which the rolling screen device 301 is applied. For example, the shape of the screen 302 is selected to be rectangular.

FIG. 16B is a sectional view illustrating one example of construction of the screen 302. As illustrated in FIG. 16B, the screen 302 includes a base 311 and an optical film 1. The screen 302 preferably has flexibility. The optical film 1 is preferably disposed on one of two principal surfaces of the base 211, the one principal surface being positioned on the side including an incident surface on which extraneous light is incident (e.g., on the side facing the window member). The optical film 1 and the base 311 are affixed to each other with an affixing layer, a bonding layer or an adhesive layer. Note that the construction of the screen 302 is not limited to the illustrated example and the optical film 1 may be used as the screen 302.

The base 311 can take the shape of, e.g., a sheet, a film, or a plate. The base 311 can be made of, e.g., glass, resin material, paper, or cloth. In consideration of the case of taking visible light into a predetermined indoor space, for example, a resin material having transparency is preferably used. The glass, the resin material, the paper, or the cloth used here may be the same as that generally known in ordinary rolling screens. The optical film 1 used here may be one type or a combination of two or more types of the optical films 1 according to the above-described first to third embodiments.

<6. Sixth Embodiment>

A sixth embodiment will be described in connection with the case of applying the present invention to a fitting (e.g., an interior or exterior member) that includes a lighting portion provided by an optical body having the directional reflection property.

Figure 17:
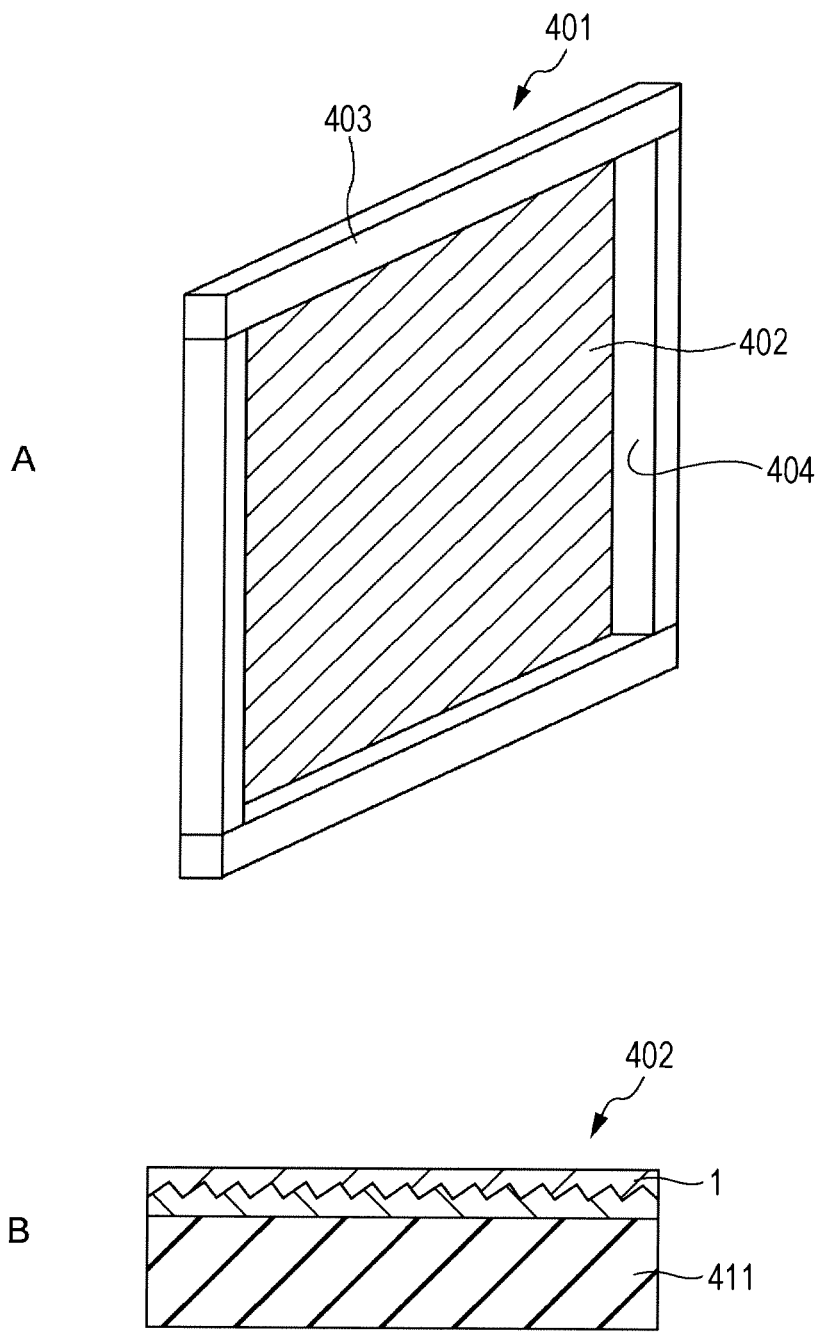
FIG. 17A is a perspective view illustrating one example of construction of a fitting according to an eighth embodiment.
FIG. 17B is a sectional view illustrating one example of construction of an optical body.
Figure 24:
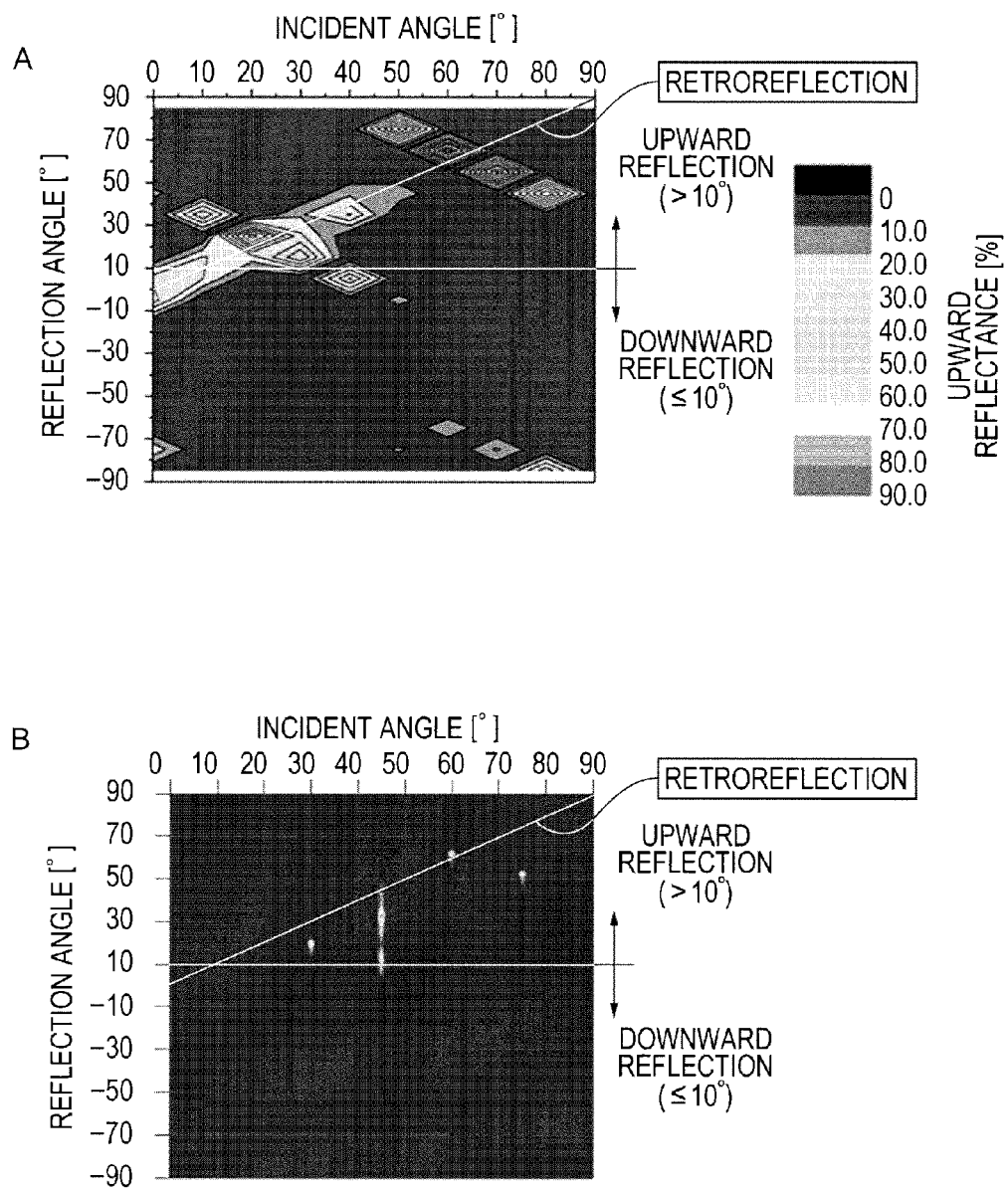
FIG. 24A is a plot illustrating the calculation result of reflectance with simulation in TEST EXAMPLE 6.
FIG. 24B is a plot illustrating the measurement result of reflectance of an optical film of EXAMPLE 2.

FIG. 17A is a perspective view illustrating one example of construction of a fitting according to the sixth embodiment. As illustrated in FIG. 24A, a fitting 401 includes an optical body 402 provided in a lighting portion 404. More specifically, the fitting 401 includes the optical body 402 and a frame member 403 that is disposed in a peripheral portion of the optical body 402. The optical body 402 is fixedly held by the frame member 403, but it can be removed, when necessary, by disassembling the frame member 403. While one example of the fitting 401 is a shoji (i.e., a paper-made and/or glass-fitted sliding door), the present invention is not limited to such an example and the present invention can be applied to various types of fittings that include lighting portions.

FIG. 17B is a sectional view illustrating one example of construction of the optical body. As illustrated in FIG. 17B, the optical body 402 includes a base 411 and an optical film 1. The optical film 1 is disposed on one of two principal surfaces of the base 411, the one principal surface being positioned on the side including an incident surface on which extraneous light is incident (e.g., on the side facing the window member). The optical film 1 and the base 311 are affixed to each other with an affixing layer, e.g., a bonding layer or an adhesive layer. Note that the construction of the shoji 402 is not limited to the illustrated example and the optical film 1 may be used as the optical body 402.

The base 411 is in the form of, e.g., a sheet, a film, or a base plate each having flexibility. The base 411 can be made of, e.g., glass, resin material, paper, or cloth. In consideration of the case of taking visible light into a predetermined indoor place, for example, a resin material having transparency is preferably used. The glass, the resin material, the paper, or the cloth used here may be the same as that generally known as optical bodies in ordinary fittings. The optical film 1 used here may be one type or a combination of two or more types of the optical films 1 according to the above-described first to third embodiments.

EXAMPLES

The present invention will be described in more detail below in connection with TEST EXAMPLES and EXAMPLES, but the present invention is not limited to only the following TEST EXAMPLES and EXAMPLES.

Figure 18:
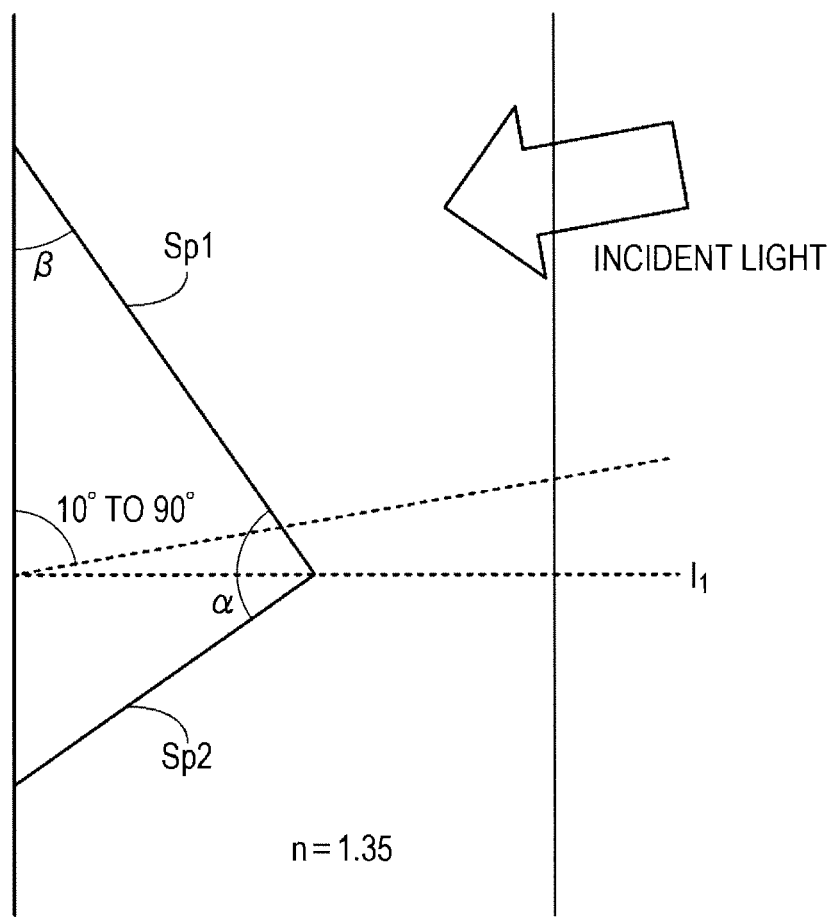
FIG. 18 is an illustration to explain the definition of upward reflectance.

FIG. 18 is an illustration to explain the definition of upward reflectance.

In the following TEST EXAMPLES and EXAMPLES, the upward reflectance is defined by the following formula:

$$\text{upward reflectance } Ru = [(\text{total power of light reflected in upward direction})/(\text{total power of incident light})] \times 100$$

where power of incident light=(power of light reflected in upward direction)+(power of light reflected in downward direction), upward direction: reflection angle $(\theta, \phi)=(90°, \phi)$) to $(10°, \phi)$, downward direction: reflection angle $(\theta, \phi)=(-90°, \phi)$ to $(10°, \theta)$), and direction of $\theta=10°$ is included in the upward direction.

In the following TEST EXAMPLES and EXAMPLES, assuming a state that the optical film is affixed to the adherend, e.g., the window member, as illustrated in FIG. 18, a first surface Sp1 of two surfaces forming the triangular pillar, which is positioned on the upper side, is called an upper surface Sp1, and a second surface Sp2, which is positioned on the lower side, is called a lower surface Sp2.

Further, a film thickness of a totally reflecting layer or a wavelength selective reflecting layer formed on the upper surface Sp1 (i.e., the first film thickness d1 in FIG. 4B) is called a film thickness d1 on an upper sloped surface, and a film thickness of a totally reflecting layer or a wavelength selective reflecting layer formed on the lower surface Sp2 (i.e., the second film thickness d2 in FIG. 4B) is called a film thickness d2 on a lower sloped surface.

In the following TEST EXAMPLES and EXAMPLES, prism patterns 1 to 3 imply the following patterns, respectively.

(Prism Pattern 1)

Figure 19:
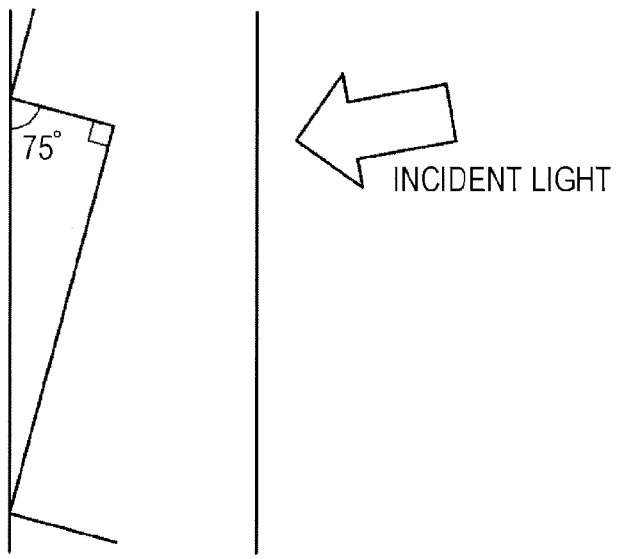
FIGS. 19A to 19C are illustrations to explain setting conditions for simulation.
Figure 19:
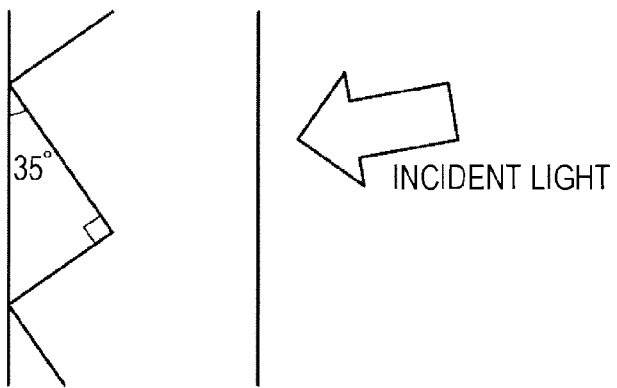
Figure 19:
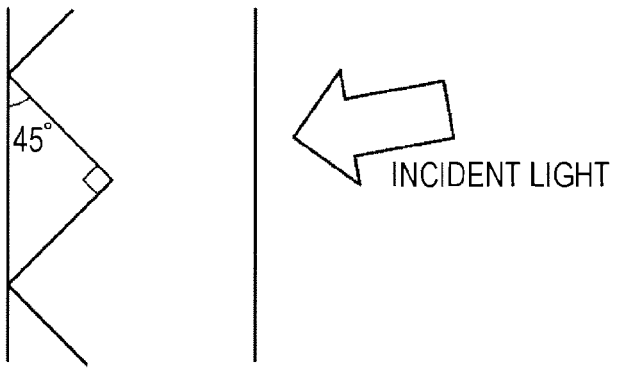

FIG. 19A is a sectional view illustrating the shape of the prism pattern 1. The prism pattern 1 is a pattern that is formed by packing asymmetrical triangular pillars in the closest-packed state under setting conditions given below:

Pitch: 100 μm
Apex angle α: 90°
Slope angle β: 75°
Symmetry: not symmetric (Prism Pattern 2)

FIG. 19B is a sectional view illustrating the shape of the prism pattern 2. The prism pattern 2 is a pattern that is formed by packing asymmetrical triangular pillars in the closest-packed state under setting conditions given below:

Pitch: 100 μm
Apex angle α: 90°
Slope angle β: 35°
Symmetry: not symmetric (Prism Pattern 3)

FIG. 19C is a sectional view illustrating the shape of the prism pattern 3. The prism pattern 3 is a pattern that is formed by packing asymmetrical triangular pillars in the closest-packed state under setting conditions given below:
Pitch: 100 μm
Apex angle α: 90°
Slope angle β: 45°
Symmetry: symmetric In the following TEST EXAMPLES and EXAMPLES, the wavelength selective reflecting layer and the totally reflecting layer imply reflecting layers defined below.

(Wavelength Selective Reflecting Layer)

The wavelength selective reflecting layer is a reflecting layer that reflects only infrared light in a wavelength band of 780 to 2100 nm, and that transmits light other than such a wavelength band therethrough.

(Totally Reflecting Layer)

The totally reflecting layer is a reflecting layer that reflects all (100%) of the incident light regardless of the wavelength band.

TEST EXAMPLES and EXAMPLES will be described in the following order.
1. Relationship of apex angle α and slope angle β versus upward reflectance
2. Relationship of incident angle versus upward reflectance
3. Relationship of incident angle and reflection angle versus upward reflectance
   3-1. Calculation with simulation
   3-2. Measurement with actual samples
4. Relationship of slope angle versus film thickness of wavelength selective reflecting layer
5. Relationship of wavelength versus upward reflectance
6. Relationship of incident angle versus upward reflectance
7. Relationship of wavelength and incident angle versus upward reflectance <1. Relationship of Apex Angle α and Slope Angle β Versus Upward Reflectance>

Test Example 1

An upward reflectance was determined with simulation that was performed as described below by using the illumination design analysis software Light Tools made by ORA (Optical Research Associates).

First, a directional reflecting surface made up of asymmetrical triangular pillars in the closest-packed state was set. Setting conditions for the directional reflecting surface were as follows:
Pitch: 100 μm
Apex angle α: 20 to 160°
Slope angle β: 10 to 80°
Type of reflecting layer: wavelength selective reflecting layer
Film thickness: film thickness d1 on the upper sloped surface and film thickness on the lower sloped surface d2 were constant Next, an imaginary sunlight source (color temperature of 6500K and wavelengths of 380 to 1200 nm) was set as a light source P, and an upward reflectance was determined with light being incident on the directional reflecting surface from the direction of the incident angle $(\theta_0, \phi) = (60°, 0°)$. The result is depicted in FIG. 20.

Figure 20:
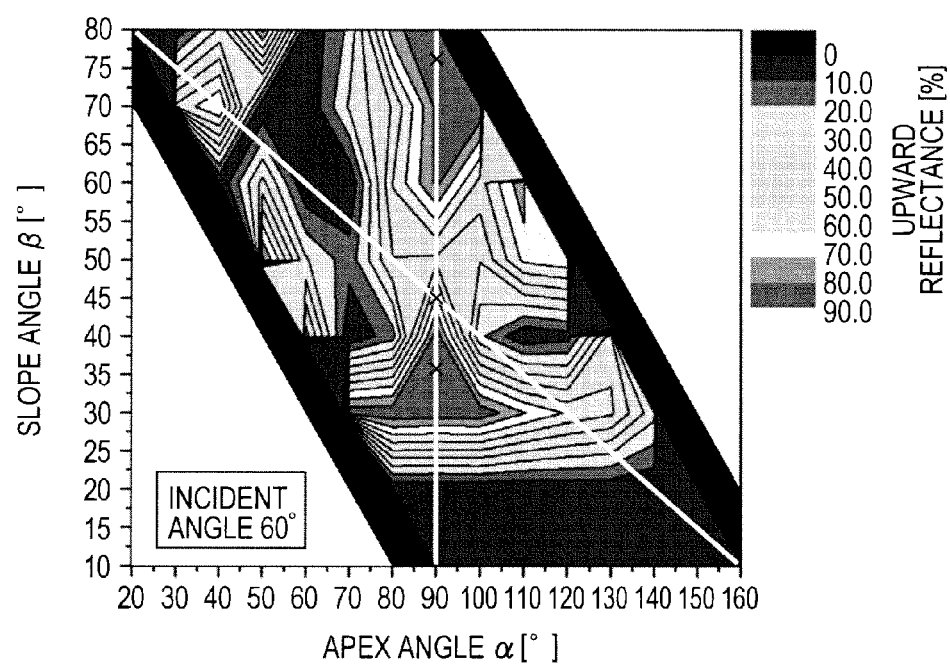
FIG. 20 is a plot illustrating the calculation result of upward reflectance with simulation in TEST EXAMPLE 1.

FIG. 20 is a plot illustrating the calculation result of the upward reflectance with the simulation in TEST EXAMPLE 1. Note that, in FIG. 20, marks "x" put on a straight line representing α=90 indicate respective coordinates that correspond to the apex angle α and the slope angle β of the prism patterns 1 to 3 illustrated in FIGS. 19A to 19C.

The following points are understood from FIG. 20.

When the apex angle α and the slope angle β satisfy any one of the following formulae (1) to (4), the upward reflectance of 80% or more can be ensured:

$$-3.6\alpha + 396 \leq \beta \leq 80 \ (85 \leq \alpha \leq 90) \quad (1)$$

$$\alpha - 30 \leq \beta \leq -\alpha + 170 \ (90 \leq \alpha \leq 100) \quad (2)$$

$$30 \leq \beta \leq \alpha - 50 \ (80 \leq \alpha \leq 90) \quad (3)$$

$$30 \leq \beta \leq -\alpha + 130 \ (90 \leq \alpha \leq 100) \quad (4)$$

2. Relationship of Incident Angle Versus Upward Reflectance>

Test Example 2

An upward reflectance was determined with simulation that was performed as described below by using the illumination design analysis software Light Tools made by ORA.

Figure 21:
FIG. 21A is a graph illustrating the calculation result of upward reflectance with simulation in TEST EXAMPLE 2.
FIG. 21B is a graph illustrating the calculation result of upward reflectance with simulation in TEST EXAMPLE 2.
FIG. 21C is a graph illustrating the calculation result of upward reflectance with simulation in TEST EXAMPLE 2.
Figure 21:
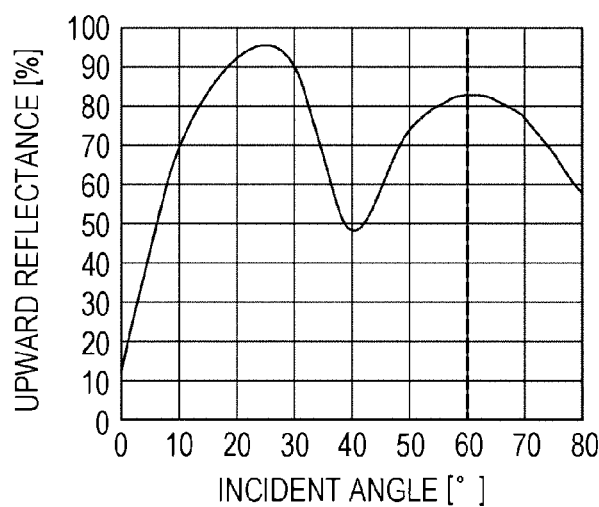
Figure 21:

First, a directional reflecting surface having setting conditions, given below, was set:
Type of prism pattern: prism pattern 1
Type of reflecting layer: wavelength selective reflecting layer
Film thickness: film thickness d1 on the upper sloped surface and film thickness on the lower sloped surface d2 were constant Next, an imaginary sunlight source (color temperature of 6500K and wavelengths of 380 to 1200 nm) was set as a light source P, and an upward reflectance was determined while the incident angle $(\theta_0, \phi)$ was changed in the range of (0°, 0°) to (80°, 0°). The result is depicted in FIG. 21A.

Test Example 3

An upward reflectance was determined in a similar manner to that in TEST EXAMPLE 2 except for modifying the setting conditions of the directional reflecting surface as follows. The result is depicted in FIG. 21B.
Type of prism pattern: prism pattern 2
Type of reflecting layer: wavelength selective reflecting layer
Film thickness: film thickness d1 on the upper sloped surface and film thickness on the lower sloped surface d2 were constant Test Example 4

An upward reflectance was determined in a similar manner to that in TEST EXAMPLE 2 except for modifying the setting conditions of the directional reflecting surface as follows. The result is depicted in FIG. 21C.
Type of prism pattern: prism pattern 3
Type of reflecting layer: wavelength selective reflecting layer
Film thickness: film thickness d1 on the upper sloped surface and film thickness on the lower sloped surface d2 were constant FIGS. 21A to 21C are graphs illustrating the respective calculation results of the upward reflectance with the simulations in TEST EXAMPLES 2, 3 and 4. In FIGS. 21A to 21C, the upward reflectance at the incident angle 60° corresponds to relevant one of the coordinates indicated by the marks "x" in FIG. 20.

The following points are understood from FIGS. 21A to 21C.

All TEST EXAMPLES 2 to 4 exhibit a similar tendency that the upward reflectance abruptly increases at the incident angle in the range of 0° to about 20° as the incident angle increases, and that the upward reflectance gradually reduces at the incident angle in the range of about 20° to about 70° as the incident angle increases.

However, there is a tendency that, in TEST EXAMPLE 2, a reduction rate of the upward reflectance at the incident angle in the range of about 20° to about 70° is held small, whereas, in TEST EXAMPLE 4, the upward reflectance significantly reduces at the incident angle in the range of about 20° to about 70°. Further, TEST EXAMPLE 3 exhibits such a tendency that the upward reflectance abruptly reduces near the incident angle 40°.

<3. Relationship of Incident Angle and Reflection Angle Versus Upward Reflectance>
<3-1. Calculation with Simulation>

Test Example 5

An upward reflectance was determined with simulation that was performed as described below by using the illumination design analysis software Light Tools made by ORA.

Figure 22:
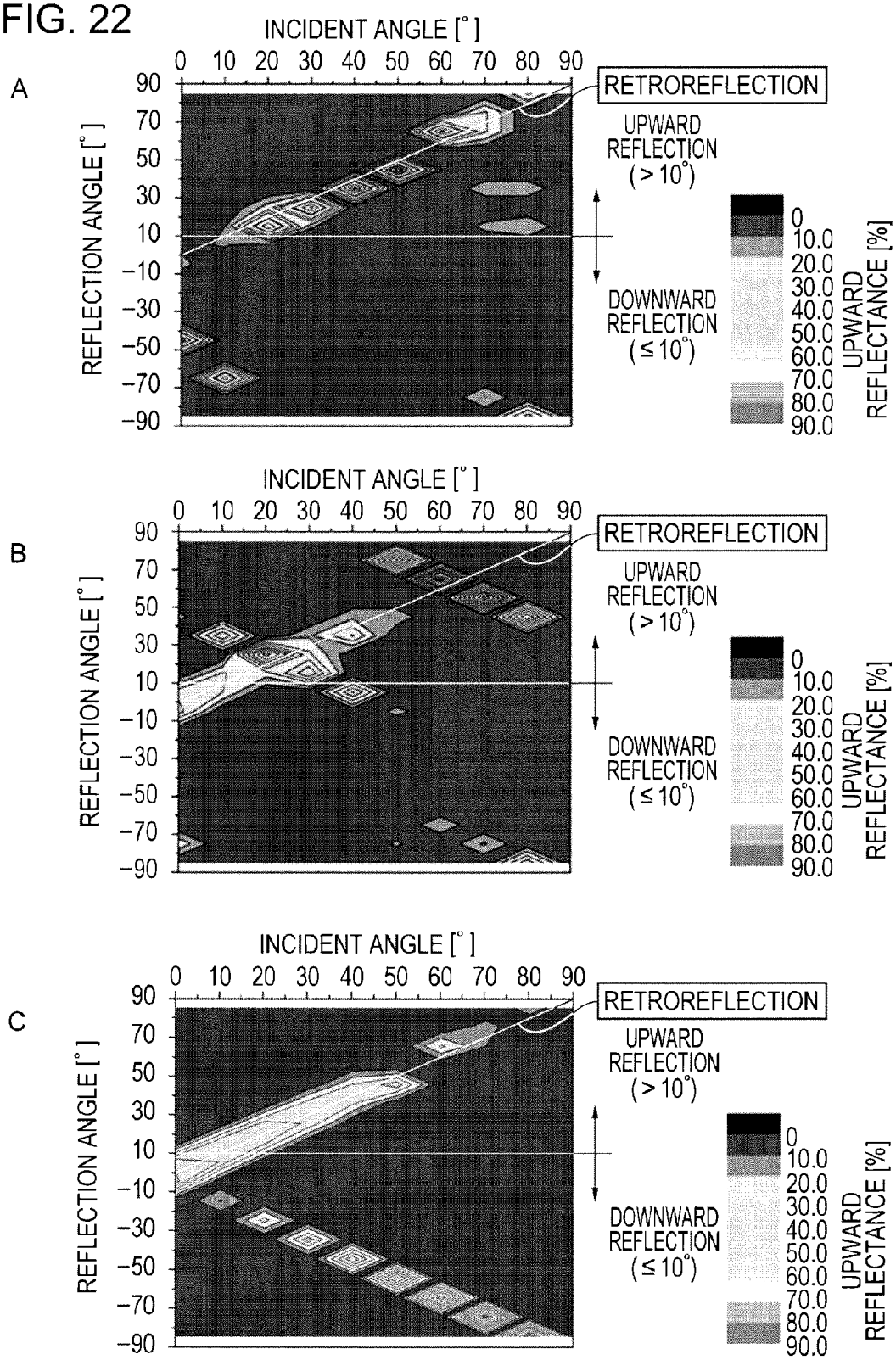
FIG. 22A is a plot illustrating the calculation result of reflectance with simulation in TEST EXAMPLE 5.
FIG. 22B is a plot illustrating the calculation result of reflectance with simulation in TEST EXAMPLE 6.
FIG. 22C is a plot illustrating the calculation result of reflectance with simulation in TEST EXAMPLE 7.

First, a directional reflecting surface having the following setting conditions was set:
Type of prism pattern: prism pattern 1
Type of reflecting layer: totally reflecting layer
Film thickness: film thickness d1 on the upper sloped surface and film thickness on the lower sloped surface d2 were constant Next, an imaginary sunlight source (color temperature of 6500K and wavelengths of 380 to 1200 nm) was set as a light source P, and an upward reflectance was determined while the incident angle ($\theta_0$, $\phi$) was changed in the range of (0°, 0°) to (80°, 0°). The result is depicted in FIG. 22A.

Test Example 6

An upward reflectance was determined in a similar manner to that in TEST EXAMPLE 5 except for modifying the setting conditions of the directional reflecting surface as follows. The result is depicted in FIG. 22B.
Type of prism pattern: prism pattern 2
Type of reflecting layer: totally reflecting layer
Film thickness: film thickness d1 on the upper sloped surface and film thickness on the lower sloped surface d2 were constant Test Example 7

An upward reflectance was determined in a similar manner to that in TEST EXAMPLE 5 except for modifying the setting conditions of the directional reflecting surface as follows. The result is depicted in FIG. 22C.
Type of prism pattern: prism pattern 3
Type of reflecting layer: totally reflecting layer
Film thickness: film thickness d1 on the upper sloped surface and film thickness on the lower sloped surface d2 were constant The following points are understood from FIGS. 22A to 22C.

In TEST EXAMPLES 5 to 7, the incident light is retroreflected upward. However, a proportion of the retroreflection can be increased in TEST EXAMPLES 5 and 6 where the directional reflecting surface is formed by the asymmetrical triangular pillars in comparison with that in TEST EXAMPLE 7 where the directional reflecting surface is formed by the symmetrical triangular pillars.

In TEST EXAMPLE 7 where the directional reflecting surface is formed by the symmetrical triangular pillars, a downward reflectance is increased in comparison with those in TEST EXAMPLES 5 and 6 where the directional reflecting surface is formed by the asymmetrical triangular pillars.
<3-2. Measurement with Actual Samples>

Example 1

First, grooves each having a two-dimensional shape reversed to that of the triangular pillar, illustrated in FIG. 19A, were formed in a Ni—P-made die by cutting with a byte. Next, a mixed resin (trade name DPHA made by NIPPON KAYAKU Co., Ltd.) of dipentaerythritol hexaacrylate and dipentaerythritol pentaacrylate was coated over the Ni—P-made die, and a PET film (A4300 made by Toyobo Co., Ltd.) having a thickness of 75 μm was placed on the mixed resin. Next, the mixed resin was cured by irradiating the mixed resin with UV light from the side including the PET film.

Next, a laminate of the resin and the PET film was peeled off from the Ni—P-made die, thereby obtaining a resin layer (first optical layer) having a shaped surface on which the plural triangular pillars, each illustrated in FIG. 19A, were arrayed in a one-dimensional pattern. Next, an AlTi layer (target composition: Al/Ti=98.5 at %/1.5 at %), serving as the totally reflecting layer, was formed in a thickness of 100 nm on the above-mentioned shaped surface by vacuum sputtering.

Next, the above-mentioned mixed resin was coated over the alternating multilayer film again. After placing a PET film on the mixed resin and purging out bubbles, a resin layer (second optical layer) was formed on the alternating multilayer film by irradiating the mixed resin with UV light to cure the same. As a result, an optical film as an objective directional reflector was obtained.

Example 2

An optical film was obtained in a similar manner to that in EXAMPLE 1 except for that grooves each having a two-dimensional shape reversed to that of the triangular pillar, illustrated in FIG. 19B, were formed on a Ni—P-made die by cutting with a byte.
(Reflection Distribution)

Figure 23:
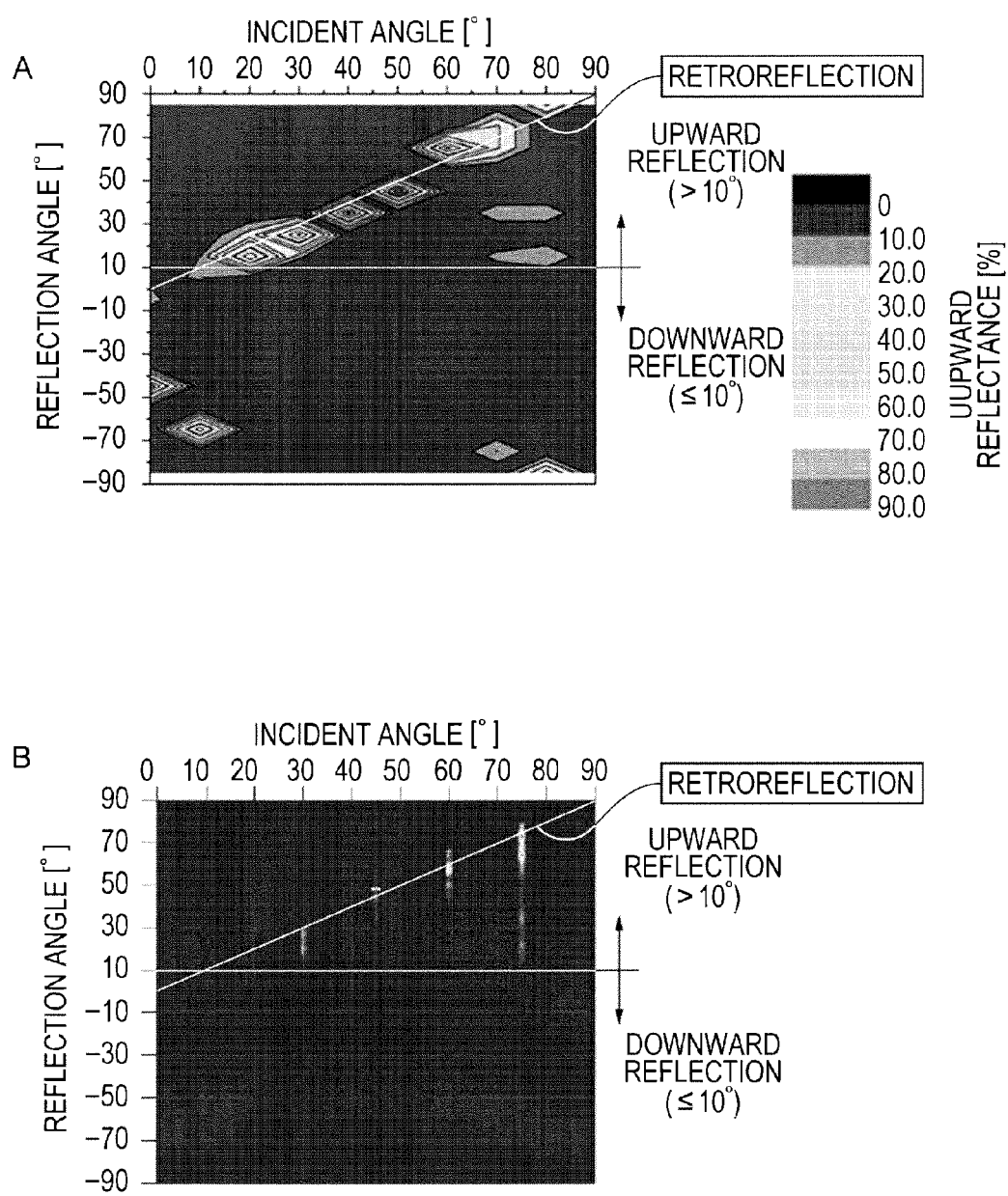
FIG. 23A is a plot illustrating the calculation result of reflectance with simulation in TEST EXAMPLE 5.
FIG. 23B is a plot illustrating the measurement result of reflectance of an optical film of EXAMPLE 1.

A reflection distribution was measured for each of incident angles 15°, 30°, 45°, 60° and 75° by using a spectroscopic GONIO photometer made by Lambda Vision Inc. The results are depicted in FIGS. 23B and 24B. Note that FIGS. 23A and 24A depict the calculation results (i.e., the calculation results in TEST EXAMPLES 5 and 6) with simulations that were performed under the same setting conditions as those for the directional reflecting surfaces in EXAMPLES 1 and 2.

As seen from FIGS. 23A to 24B, the measurement results of the upward reflectance in EXAMPLES 1 and 2 obtained by using the actual samples have a similar tendency to the calculation results in TEST EXAMPLES 5 and 6 obtained by performing the simulations.
<4. Relationship of Slope Angle Versus Film Thickness of Wavelength Selective Reflecting Layer>

Example 3

First, grooves each having a two-dimensional shape reversed to that of the triangular pillar, illustrated in FIG. 19A, were formed on a Ni—P-made die by cutting with a byte. Next, a mixed resin (trade name DPHA made by NIPPON KAYAKU Co., Ltd.) of dipentaerythritol hexaacrylate and dipentaerythritol pentaacrylate was coated over the Ni—P-made die, and a PET film (A4300 made by Toyobo Co., Ltd.) having a thickness of 75 μm was placed on the mixed resin. Next, the mixed resin was cured by irradiating the mixed resin with UV light from the side including the PET film.

Next, a laminate of the resin and the PET film was peeled off from the Ni—P-made die, thereby obtaining a resin layer (first optical layer) having a shaped surface on which the plural triangular pillars, each illustrated in FIG. 19A, were arrayed in a one-dimensional pattern. Next, a multilayer film made up of the following layers was formed on the above-mentioned shaped surface by vacuum sputtering. As a result, an optical film as an objective directional reflector was obtained.

First layer: GAZO layer
Second layer: AgNdCu layer
Third layer: GAZO layer
Fourth layer: AgNdCu layer
Fifth layer: GAZO layer Example 4

An optical film was obtained in a similar manner to that in EXAMPLE 1 except for that grooves each having a two-dimensional shape reversed to that of the triangular pillar, illustrated in FIG. 19B, were formed on a Ni—P-made die by cutting with a byte.

Comparative Example 1

An optical film was obtained in a similar manner to that in EXAMPLE 1 except for that grooves each having a two-dimensional shape reversed to that of the triangular pillar, illustrated in FIG. 19C, were formed on a Ni—P-made die by cutting with a byte.

Comparative Example 2

Figure 25:
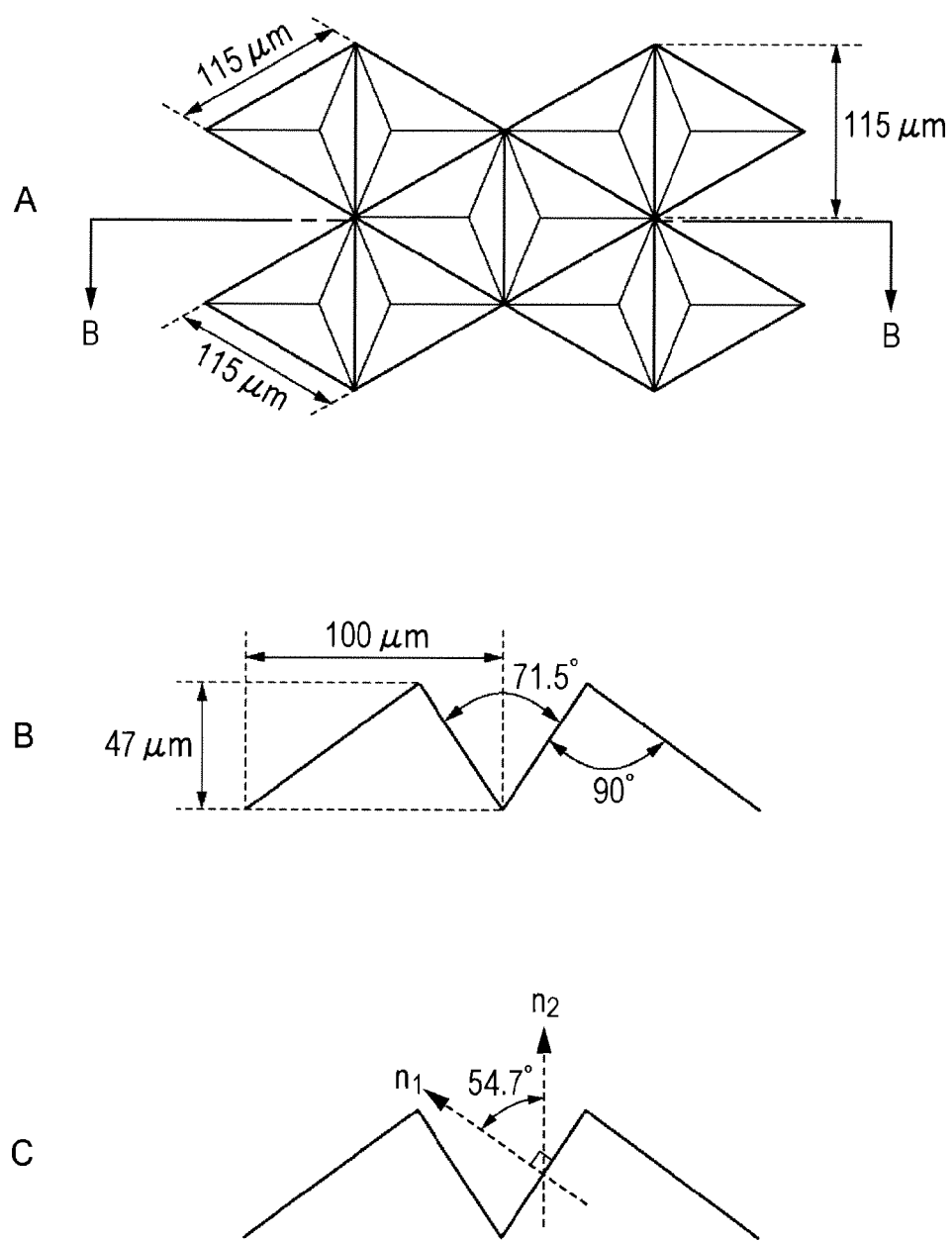
FIG. 25A is a plan view illustrating a corner cube shape of a master that is used to fabricate an optical film of COMPARATIVE EXAMPLE 2.
FIGS. 25B and 25C are each a side view illustrating the corner cube shape of the master that is used to fabricate the optical film of COMPARATIVE EXAMPLE 2.

First, corner cubes, illustrated in FIGS. 25A to 25C, were formed on a Ni—P-made die by cutting with a byte. Next, urethane acrylate (ARONIX made by TOAGOSEI CO., LTD., refractive index of 1.533 after being cured) was coated over the Ni—P-made die, and a PET film (A4300 made by Toyobo Co., Ltd.) having a thickness of 75 μm was placed on the coated resin. The resin was cured by irradiating the resin with UV light from the side including the PET film.

Next, a laminate of the resin and the PET was peeled off from the Ni—P-made die, thereby obtaining a resin layer (first optical layer) having a shaped surface on which many corner cubes were two-dimensionally arrayed. Next, a multilayer film was formed on the shaped surface by vacuum sputtering under the same film forming conditions as those in EXAMPLE 3. As a result, an optical film as an objective directional reflector was obtained.

(Method of Measuring Film Thickness)

Figure 26:
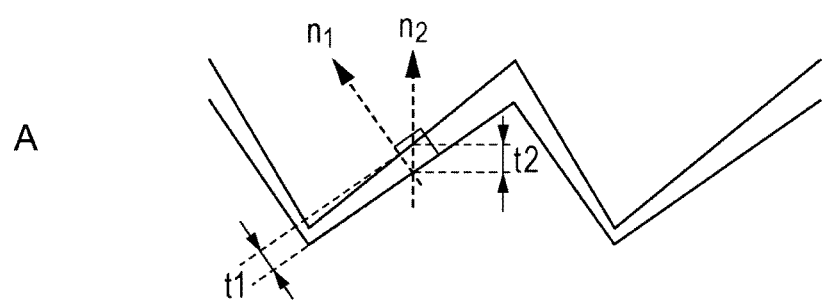
FIG. 26A is an illustration to explain a method of measuring a mean film thickness of each layer in a wavelength selective reflecting layer in EXAMPLES 3 and 4 and COMPARATIVE EXAMPLE 1.
FIG. 26B is an illustration to explain a method of measuring a mean film thickness of each layer in a wavelength selective reflecting layer in COMPARATIVE EXAMPLE 2.
Figure 26:
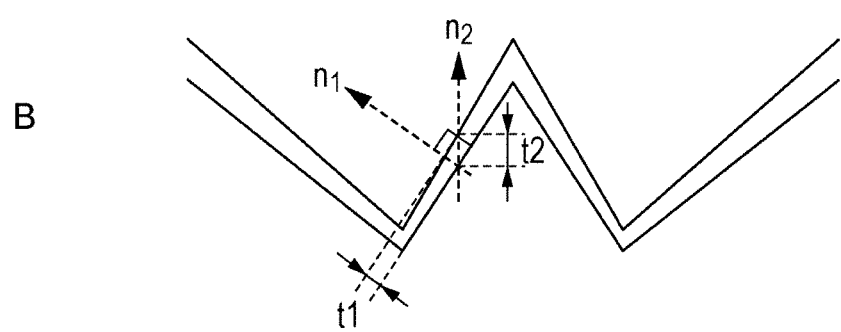

FIG. 26A is an illustration to explain a method of measuring a mean film thickness of each layer in the wavelength selective reflecting layer in EXAMPLES 3 and 4 and COMPARATIVE EXAMPLE 1.

The mean film thickness of each layer in the wavelength selective reflecting layer in EXAMPLES 3 and 4 COMPARATIVE EXAMPLE 1 was measured as follows. First, the optical film was cut in a direction perpendicular to the ridge-line of the triangular pillar by using an FIB (Focused Ion Beam) to form a cross-section. Then, a film thickness t2 of each layer in a direction n2 was measured at a midpoint of each of two sides forming a triangular shape of the cross-section by using a TEM (Transmission Electron Microscope). The measurement was repeated at arbitrary 10 points on the optical film, and measured values were simply averaged (arithmetically averaged), thereby obtaining the mean film thickness. The reason why the film thickness is measured by specifying the measurement position as described above resides in that, when the film thickness of the wavelength selective reflecting layer formed on the triangular pillar is measured, the film thickness differs depending on a position on the sloped surface of the triangular pillar as illustrated in FIG. 26A. Note that, in FIG. 26A, n1 and n2 represent the following directions:

Direction n1: direction perpendicular to the sloped surface of the triangular pillar formed in the PET film Direction n2: direction perpendicular to the principal surface of the PET film (i.e., direction of thickness of the PET film)

FIG. 26B is an illustration to explain a method of measuring a mean film thickness of each layer in the wavelength selective reflecting layer in COMPARATIVE EXAMPLE 2.

The mean film thickness of each layer in the wavelength-selective reflecting layer in COMPARATIVE EXAMPLE 2 was measured as follows. First, the optical film was cut along a plane including one of sides forming the corner cube by using an FIB to form a cross-section. Then, a mean film thickness t2 of each layer in a direction n2 was measured at a midpoint of a perpendicular line with respect to a triangle forming the corner cube by using a TEM. The measurement was repeated at arbitrary 10 points on the optical film, and measured values were simply averaged (arithmetically averaged), thereby obtaining the mean film thickness. Herein, the term "perpendicular line with respect to a triangle" implies a perpendicular line that is drawn from the apex of a triangle, which forms a pyramidal surface of a triangular pyramid, to a subtense (i.e., a bottom side of the triangular pyramid). The reason why the film thickness is measured by specifying the measurement position as described above resides in that, when the film thickness of the wavelength selective reflecting layer formed on the corner cube is measured, the film thickness differs depending on a position on the triangle forming the corner cube as illustrated in FIG. 26B. Note that, in FIG. 26B, n1 and n2 represent the following directions:

Direction n1: direction perpendicular to the sloped surface of the corner cube formed in the PET film Direction n2: direction perpendicular to the principal surface of the PET film (i.e., direction of thickness of the PET film)

Figure 27:
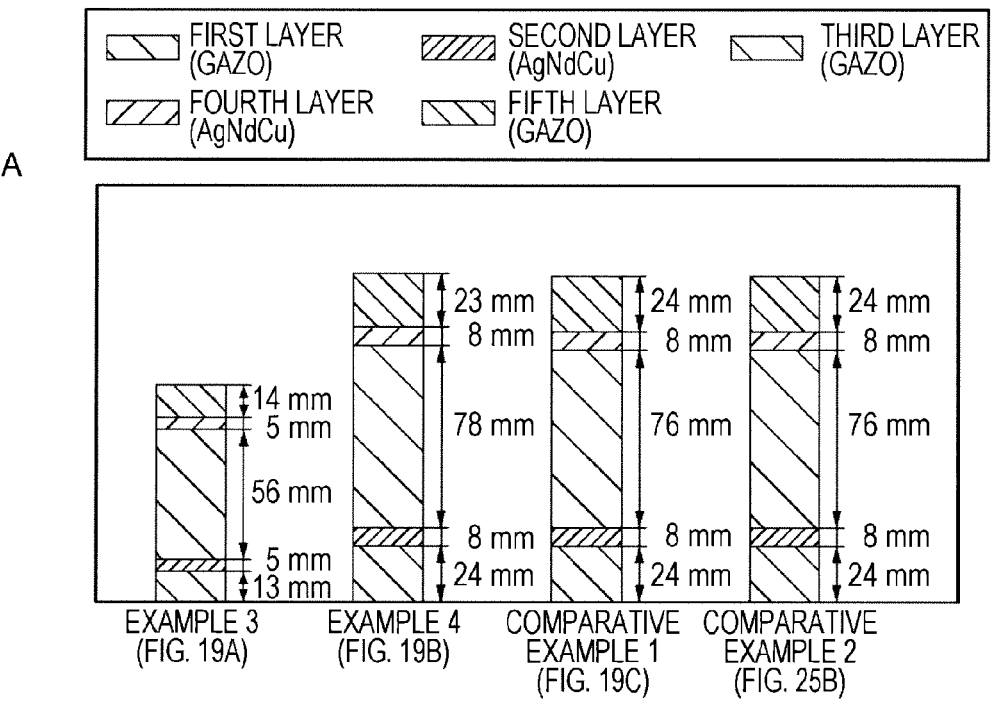
FIG. 27A illustrates mean film thicknesses of the layers in the wavelength selective reflecting layer formed on an upward surface in each of EXAMPLES 3 and 4 and COMPARATIVE EXAMPLES 1 and 2.
FIG. 27B illustrates mean film thicknesses of the layers in the wavelength selective reflecting layer formed on a downward surface in each of EXAMPLES 3 and 4 and COMPARATIVE EXAMPLES 1 and 2.
Figure 27:
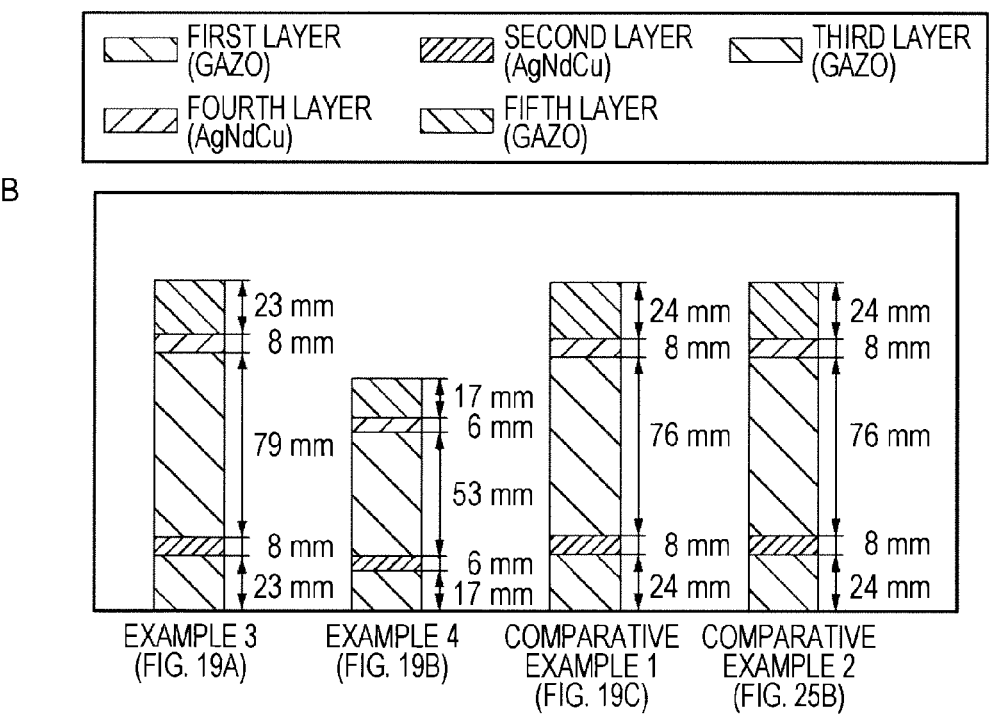

FIG. 27A illustrates mean film thicknesses (film thicknesses d1 on the upward sloped surface) of the layers in the wavelength selective reflecting layer formed on the upward sloped surface Sp1 (see FIG. 18) in each of EXAMPLES 3 and 4 and COMPARATIVE EXAMPLES 1 and 2. FIG. 27B illustrates mean film thicknesses (film thicknesses d2 on the downward sloped surface) of the layers in the wavelength selective reflecting layer formed on the downward sloped surface Sp2 (see FIG. 18) in each of EXAMPLES 1 and 2 and COMPARATIVE EXAMPLES 1 and 2.

The following points are understood from FIGS. 27A and 27B.

In EXAMPLES 3 and 4 in which the directional reflecting surface is formed by the asymmetrical triangular pillars, the mean film thickness of the wavelength selective reflecting layer on the upper reflecting layer Sp1 or the lower reflecting layer Sp2 can be reduced.

On the other hand, in COMPARATIVE EXAMPLE 1 in which the directional reflecting surface is formed by the symmetrical triangular pillars, the mean film thicknesses of the wavelength selective reflecting layers on both the upper reflecting surface and the lower reflecting surface are increased. Further, in COMPARATIVE EXAMPLE 2 in which the directional reflecting surface is formed by the corner cubes, the mean film thickness of the wavelength selective reflecting layer is increased on each of three triangular surfaces forming the corner cube.

Thus, when the directional reflecting surface is formed by the asymmetrical triangular pillars, the mean film thickness of the wavelength selective reflecting layer can be reduced as a whole in comparison with that when the directional reflecting surface is formed by the symmetrical triangular pillars or the corner cubes. Consequently, the optical film can be manufactured at a lower cost.

<5. Relationship of Wavelength Versus Upward Reflectance>

Test Example 8

An upward reflectance was determined with simulation that was performed as described below by using the illumination design analysis software Light Tools made by ORA.

Figure 28:
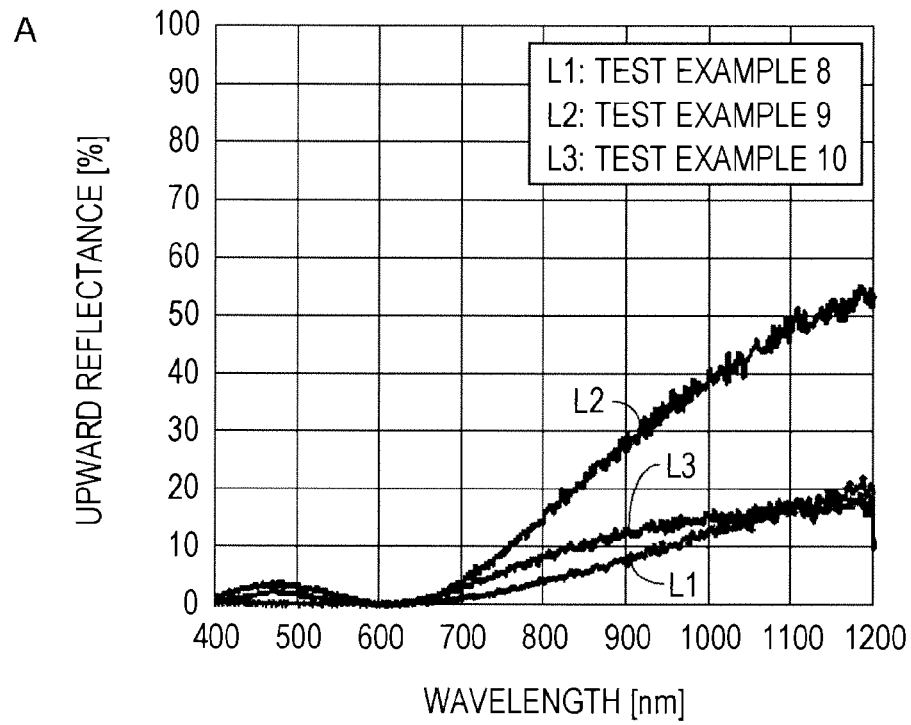
FIG. 28A is a graph illustrating the calculation results of upward reflectance with simulations in TEST EXAMPLES 8 to 10.
FIG. 28B is a graph illustrating the calculation result of upward reflectance with simulation in TEST EXAMPLE 11.
Figure 28:
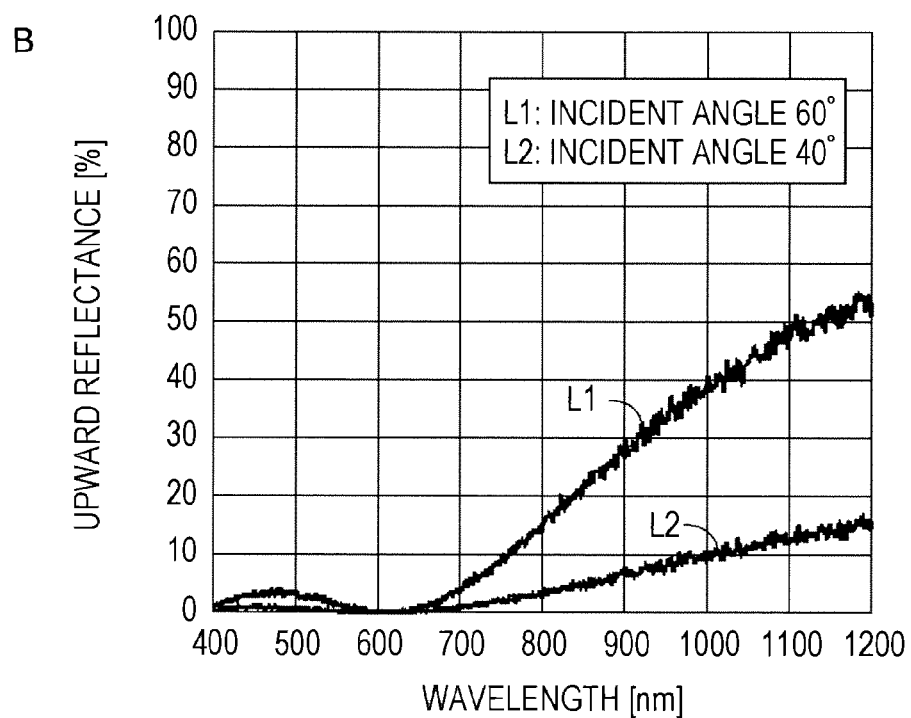

First, a directional reflecting surface having the following setting conditions was set:
Type of prism pattern: prism pattern 1
Type of reflecting layer: totally reflecting layer
Film thickness: film thickness d1 on the upper sloped surface and film thickness on the lower sloped surface d2 were constant Next, an imaginary sunlight source (color temperature of 6500K and wavelengths of 380 to 1200 nm) was set as a light source P, and an upward reflectance was determined in the above-mentioned range of wavelengths with light being incident on the directional reflecting surface from the direction of the incident angle $(\theta_0, \phi)) = (60°, 0°)$. The result is depicted in FIG. 28A.

Test Example 9

An upward reflectance was determined at each wavelength in a similar manner to that in TEST EXAMPLE 8 except for modifying the setting conditions of the directional reflecting surface as follows. The result is depicted in FIG. 28B.
Type of prism pattern: prism pattern 2
Type of reflecting layer: totally reflecting layer
Film thickness: film thickness d1 on the upper sloped surface and film thickness on the lower sloped surface d2 were constant Test Example 10

An upward reflectance was determined at each wavelength in a similar manner to that in TEST EXAMPLE 8 except for modifying the setting conditions of the directional reflecting surface as follows. The result is depicted in FIG. 28C.
Type of prism pattern: prism pattern 3
Type of reflecting layer: totally reflecting layer
Film thickness: film thickness d1 on the upper sloped surface and film thickness on the lower sloped surface d2 were constant The following points are understood from FIGS. 28A to 28C.

In TEST EXAMPLES 8 to 10 in which the direction reflecting surface is formed by the triangular pillars, the upward reflectance depends on wavelength, and it tends to increase when the wavelength exceeds about 650 nm. In particular, the increasing tendency of the upward reflectance is significantly greater in TEST EXAMPLE 9.

Test Example 11

An upward reflectance was determined at each wavelength in a similar manner to that in TEST EXAMPLE 8 except for causing light to be incident on the directional reflecting surface from the direction of the incident angle $(\theta_0, \phi) = (40°, 0°)$ or $(60°, 0°)$. The result is depicted in FIG. 28B.

The following points are understood from FIG. 28B.

The upward reflectance is lower at the incident angle $(\theta_0, \phi) = (40°, 0°)$ than at the incident angle $(\theta_0, \phi) = (60°, 0°)$. In other words, an increase in the upward reflectance in a longer wavelength band is reduced at a smaller incident angle $\theta_0$.

<6. Relationship of Incident Angle Versus Upward Reflectance>

Test Example 12

An upward reflectance was determined with simulation that was performed as described below by using the illumination design analysis software Light Tools made by ORA.

First, a directional reflecting surface having the following setting conditions was set:
Type of prism pattern: prism pattern 2
Type of reflecting layer: totally reflecting layer
Film thickness: film thickness d1 on the upper sloped surface and film thickness on the lower sloped surface d2 were constant Next, an imaginary sunlight source (color temperature of 6500K and wavelengths of 380 to 1200 nm) was set as a light source P, and an upward reflectance was determined with light being incident on the directional reflecting surface from the direction over a range of the incident angle $(\theta_0, \phi) = (0°, 0°)$ to $(80°, 0°)$. The result is depicted in FIG. 29A.

Test Example 13

An upward reflectance was determined in a similar manner to that in TEST EXAMPLE 12 except for modifying the type of the reflecting layer to the wavelength selective reflecting layer. The result is depicted in FIG. 29A.

Figure 29:
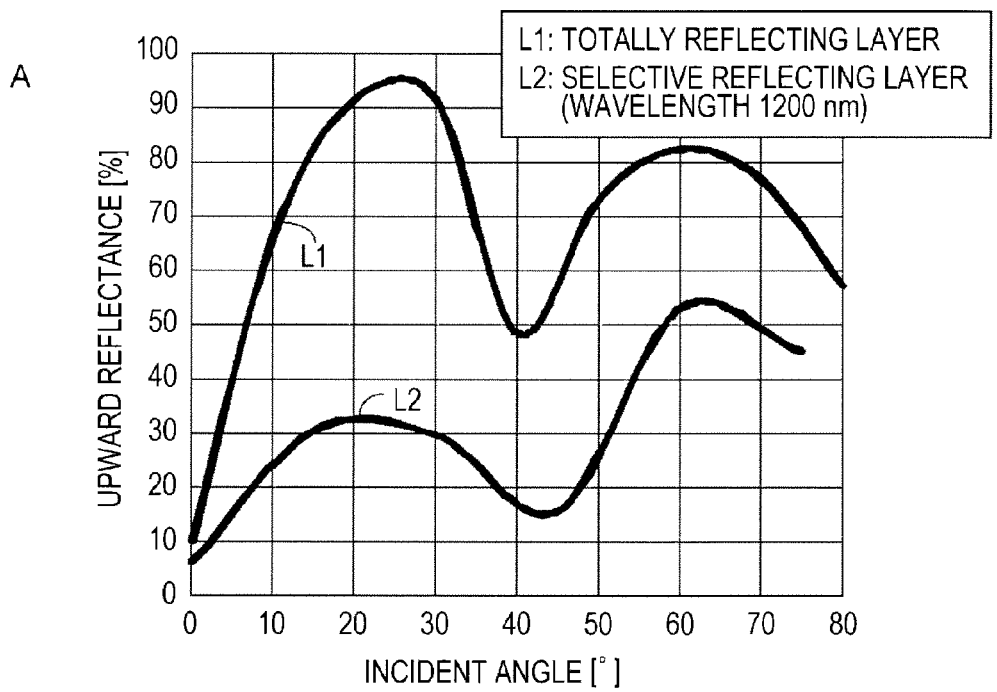
FIG. 29A is a graph illustrating the calculation results of upward reflectance with simulations in TEST EXAMPLES 12 and 13.
FIG. 29B is a graph illustrating the calculation result of upward reflectance with simulation in TEST EXAMPLE 14.
Figure 29:
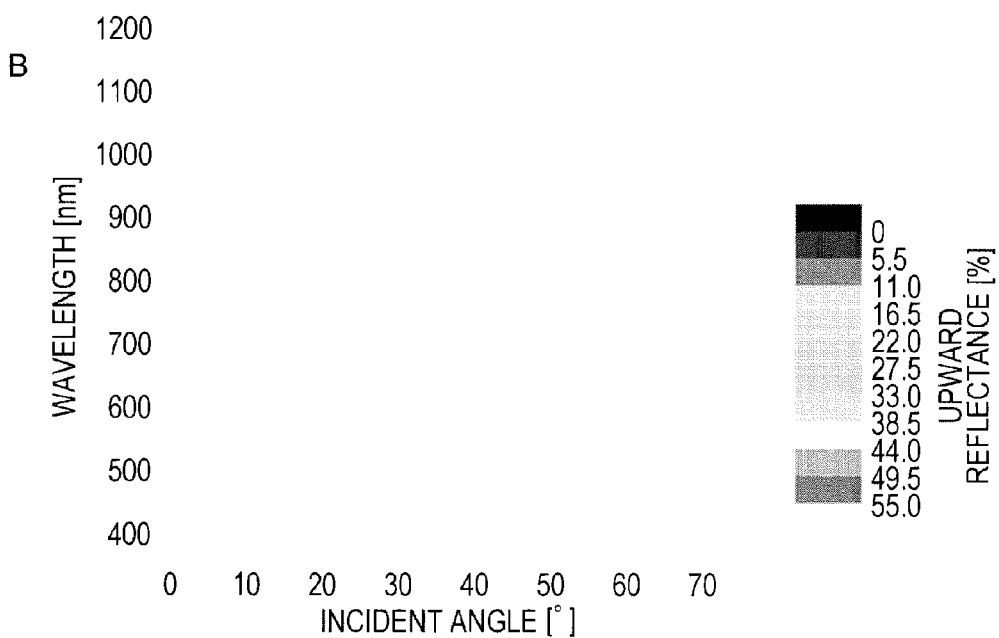

As seen from FIG. 29A, there is a similar tendency in dependence of the upward reflectance on the incident angle between when the reflecting layer is the wavelength selective reflecting layer and when the reflecting layer is the totally reflecting layer. In other words, the upward reflectance tends to transiently drop near the incident angle 40° regardless of which type of the reflecting layer is used.

<7. Relationship of Wavelength and Incident Angle Versus Upward Reflectance>

Test Example 14

An upward reflectance was determined with simulation that was performed as described below by using the illumination design analysis software Light Tools made by ORA.

First, a directional reflecting surface having the following setting conditions was set:
Type of prism pattern: prism pattern 2
Type of reflecting layer: wavelength selective reflecting layer
Film thickness: film thickness d1 on the upper sloped surface and film thickness on the lower sloped surface d2 were constant Next, an imaginary sunlight source (color temperature of 6500K and wavelengths of 380 to 1200 nm) was set as a light source P, and an upward reflectance was determined with light being incident on the directional reflecting surface from the direction over a range of the incident angle $(\theta_0, \phi))=(0°, 0°)$ to $(80°, 0°)$. The result is depicted in FIG. 29B.

As seen from FIG. 29B, there is a peak of the upward reflectance near the incident angle 60° in a wavelength band of 1100 to 1200 nm.

By considering the above-described results in a comprehensive manner, the following points are understood regarding the prism patterns 1 to 3.

Because of having the asymmetrical shape, the prism pattern 1 has a large difference in film thickness between the two sloped surfaces. The upward reflectance tends to become smaller than that obtained with the prism pattern 2. When the totally reflecting layer is used as the reflecting layer, the prism pattern 1 is preferably used as the prism pattern.

The prism pattern 1 also has the asymmetrical shape, but it has a smaller difference in film thickness between the two sloped surfaces than that in the prism pattern 1. The reflectance obtained with the prism pattern 2 can be increased to 50% or higher in the infrared range (not shorter than about 1150 nm).

Because of having the symmetrical shape, the prism pattern 3 has no difference in film thickness between the two sloped surfaces. The reflection performance with the totally reflecting layer is low, and a high upward reflectance cannot be obtained with the wavelength selective reflecting layer as well.

While the embodiments of the present invention have been described in detail above, the present invention is not limited to the above-described embodiments and can be variously modified on the basis of the technical concept of the present invention.

For example, the constructions, the methods, the shapes, the materials, the numerical values, etc. explained in the foregoing embodiments are merely mentioned for illustrative purpose, and different constructions, methods, shapes, materials, numerical values, etc. may also be used when necessary.

Also, the constructions in the above-described embodiments can be combined with each other without departing from the scope of the present invention.

Further, while the foregoing embodiments have been described, by way of example, in connection with the case where the window blind and the rolling screen device are manually operated, the window blind and the rolling screen device may be electrically operated.

Still further, the foregoing embodiments have been described, by way of example, in connection with the case where the optical film is affixed to the adherend, such as the window member. However, the adherend, such as the window member, may be constituted as the first optical layer or the second optical layer itself of the optical film. That modification enables the optical body, such as the window member, to have the directional reflection function in advance.

Still further, while the foregoing embodiments have been described, by way of example, in connection with the case where the optical body is the optical film, the shape of the optical body is not limited to a film, and the optical body may have a plate- or block-like shape.

While the foregoing embodiments have been described, by way of example, in connection with the case where the present invention is applied to the interior or exterior members, such as the window member, the fitting, the slat of the window blind, and the screen of the rolling screen device, the present invention is not limited to those applications and is further applicable to other interior and exterior members than the above-described ones.

Examples of the interior or exterior members to which the optical body according to the present invention can be applied include an interior or exterior member constituted by the optical body itself, and an interior or exterior member constituted by a transparent base to which the directional reflector is affixed. By installing such an interior or exterior member indoors near a window, it is possible, for example, to directionally reflect only an infrared ray to the outdoor and to take visible light into the indoor. Accordingly, even when the interior or exterior member is installed, necessity of indoor lighting is reduced. Further, since the interior or exterior member hardly causes scatter reflection toward the indoor side, a temperature rise in the surroundings can be suppressed. In addition, the optical body may be applied to other affixing target members than the transparent base depending on the required purpose of, for example, controlling visibility and/or increasing strength.

Still further, while the foregoing embodiments have been described, by way of example, in connection with the case where the present invention is applied to the window blind and the rolling screen device, the present invention is not limited to those applications and is further applicable to various types of solar shading devices installed in rooms or indoors.

Still further, while the foregoing embodiments have been described, by way of example, in connection with the case of applying the present invention to the solar shading device (e.g., the rolling screen device) where a degree at which the solar shading member cuts off the incident light can be adjusted by taking up or letting out the solar shading member, the present invention is not limited to those applications. For example, the present invention is further applicable to a solar shading device where a degree at which a solar shading member cuts off the incident light can be adjusted by folding the solar shading member. One example of such a solar shading device is a pleated screen device where a cutoff degree of the incident light can be adjusted by folding a screen as the solar shading member in the form of bellows.

Still further, while the foregoing embodiments have been described, by way of example, in connection with the case where the present invention is applied to a horizontal-type window blind (Venetian window blind), the present invention is further applicable to a vertically long window blind (vertical window blind).

EXPLANATION OF REFERENCE NUMERALS 1 optical film
2 optical layer
3 wavelength selective reflecting layer
4 first optical layer
4a first base
5 second optical layer
5a second base
6 affixing layer
7 peel-off layer
8 hard coat layer
9 reflecting-layer affixed optical layer
S1 incident surface
S2 emergent surface It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An optical body comprising:
    a first optical layer having a concave-convex surface;
    a wavelength selective reflecting layer formed on the concave-convex surface; and
    a second optical layer formed on the wavelength selective reflecting layer and embedding the concave-convex surface,
    wherein the wavelength selective reflecting layer selectively directionally reflects light in a particular wavelength band while transmitting light other than the particular wavelength band therethrough,
    the concave-convex surface is made up of a plurality of triangular pillars arrayed in a one-dimensional pattern, and
    the triangular pillar has an apex angle α and a slope angle β, the apex angle α and the slope angle β satisfying formula (2) given below:

$$\alpha - 30 \leq \beta \leq -\alpha + 170 \text{ (where } 90 \leq \alpha \leq 100)$$  (2).

2. An optical body comprising:
    a first optical layer having a concave-convex surface;
    a wavelength selective reflecting layer formed on the concave-convex surface; and
    a second optical layer formed on the wavelength selective reflecting layer and embedding the concave-convex surface,
    wherein the wavelength selective reflecting layer selectively directionally reflects light in a particular wavelength band while transmitting light other than the particular wavelength band therethrough,
    the concave-convex surface is made up of a plurality of triangular pillars arrayed in a one-dimensional pattern, and
    the triangular pillar has an apex angle α and a slope angle β, the apex angle α and the slope angle β satisfying a formula (3) or (4) given below:

$$30 \leq \beta \leq \alpha - 50 \text{ (where } 80 \leq \alpha \leq 90)$$  (3)

$$30 \leq \beta \leq -\alpha + 130 \text{ (where } 90 \leq \alpha \leq 100)$$  (4).

3. The optical body according to claim 1, wherein the triangular pillar has a first sloped surface and a second sloped surface on each of which the wavelength selective reflecting layer is formed, and
    film thicknesses of the wavelength selective reflecting layers formed on the first sloped surface and the second sloped surface are substantially the same.

4. The optical body according to claim 1, wherein a transmission image clarity measured for the light of transmission wavelengths in conformity with JIS K-7105 by using an optical comb of 0.5 mm is 50 or more.

5. The optical body according to claim 1, wherein a total value of transmission image clarity measured for the light of transmission wavelengths in conformity with JIS K-7105 by using optical combs of 0.125, 0.5, 1.0 and 2.0 mm is 230 or more.

6. The optical body according to claim 1, wherein the optical body directionally reflects, of light entering an incident surface at an incident angle (θ, φ), the light in the particular wavelength band in a direction ($\theta_0$, $-\phi$) ($0° < \theta_0 < 90°$) while transmitting the light other than the particular wavelength band therethrough (where θ: an angle formed by a perpendicular line with respect to the incident surface and incident light entering the incident surface or reflected light emerging from the incident surface, and φ: an angle formed by a particular linear line in the incident surface and a component resulting from projecting the incident light or the reflected light to the incident surface).

7. The optical body according to claim 1, wherein the wavelength selective reflecting layer is a transparent electro-conductive film containing, as a main component, an electro-conductive material having transparency in a visible light range, or a functional film containing, as a main component, a chromic material of which reflection performance is reversibly changed upon application of an external stimulus.

8. The optical body according to claim 1, wherein a pitch of the triangular pillars is 5 μm or larger and 5 mm or smaller.

9. The optical body according to claim 1, wherein a difference in refractive index between the first optical layer and the second optical layer is 0.010 or less.

10. The optical body according to claim 1, wherein an absolute value of difference between chromaticity coordinates x and an absolute value of difference between chromaticity coordinates y of light, which is incident on one of both surfaces of the optical body at the incident angle of 5° or larger and 60° or smaller and which is specularly reflected by the optical body, is 0.05 or smaller for each of both the surfaces.

11. The optical body according to claim 1, wherein the first optical layer and the second optical layer are made of the same resin having transparency in a visible light range, and the second optical layer contains an additive.

12. The optical body according to claim 1, wherein at least one of the first optical layer and the second optical layer absorbs light in a particular wavelength band within a visible light range.

13. The optical body according to claim 1, wherein an optical layer is formed by the first optical layer and the second optical layer, and
    the optical body further comprises a light scatterer in at least one of positions on a surface of the optical layer, inside the optical layer, and between the wavelength selective reflecting layer and the optical layer.

14. The optical body according to claim 1, further comprising a water-repellent or hydrophilic layer on an incident surface of the optical body.

15. The optical body according to claim 1, wherein the optical body directionally reflects the light in the particular wavelength band to be kept from entering a predetermined space, while transmitting the light other than the particular wavelength band therethrough to be taken into the predetermined space.

16. The optical body according to claim 1, wherein the optical body has a belt-like or rectangular shape, and
    a lengthwise direction of the optical body is orthogonal to a ridgeline direction of the triangular pillar.

17. A window member including the optical body according to claim 1.

18. The window member according to claim 17, wherein the optical body is arranged such that a ridgeline direction of the triangular pillar is substantially orthogonal to a direction of height of a building.

19. The window member according to claim 17, wherein the optical body is arranged such that, in each of the triangular pillars, the slope angle β is positioned above the apex angle α.

20. A fitting including the optical body according to claim 1 in a lighting portion thereof.

21. A solar shading device comprising one or plural solar shading members which cut off sunlight, wherein the solar shading member includes the optical body according to claim 1.

22. A building including the optical body according to claim 1,
wherein the optical body is arranged such that, in each of the triangular pillars, the slope angle β is positioned above the apex angle α.

* * * * *